US012532118B2

(12) United States Patent
Zhang et al.

(10) Patent No.: US 12,532,118 B2
(45) Date of Patent: Jan. 20, 2026

(54) SOUND PRODUCTION COMPONENTS

(71) Applicant: SHENZHEN SHOKZ CO., LTD., Guangdong (CN)

(72) Inventors: Lei Zhang, Shenzhen (CN); Peigeng Tong, Shenzhen (CN); Guolin Xie, Shenzhen (CN); Yongjian Li, Shenzhen (CN); Jiang Xu, Shenzhen (CN); Tao Zhao, Shenzhen (CN); Duoduo Wu, Shenzhen (CN); Ao Ji, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 188 days.

(21) Appl. No.: 18/492,820

(22) Filed: Oct. 24, 2023

(65) Prior Publication Data

US 2024/0147162 A1 May 2, 2024

Related U.S. Application Data

(63) Continuation of application No. PCT/CN2023/083543, filed on Mar. 24, 2023.

(30) Foreign Application Priority Data

Oct. 28, 2022 (CN) ......................... 202211336918.4
Dec. 1, 2022 (CN) ......................... 202223239628.6
(Continued)

(51) Int. Cl.
*H04R 7/16* (2006.01)
*H04R 1/10* (2006.01)
(Continued)

(52) U.S. Cl.
CPC ............. *H04R 7/16* (2013.01); *H04R 1/1016* (2013.01); *H04R 1/105* (2013.01); *H04R 1/323* (2013.01);
(Continued)

(58) Field of Classification Search
CPC .... H04R 1/1025; H04R 1/1066; H04R 1/105; H04R 1/1075; H04R 9/06; H04R 1/38;
(Continued)

(56) References Cited

U.S. PATENT DOCUMENTS 6,504,938 B1 * 1/2003 Anderson ............ H04R 1/2849 181/146
2007/0009133 A1 1/2007 Gerkinsmeyer
(Continued)

FOREIGN PATENT DOCUMENTS

CN 103209377 A 7/2013
CN 204014043 U 12/2014
(Continued)

*Primary Examiner* — Carolyn R Edwards
*Assistant Examiner* — Julie X Dang
(74) *Attorney, Agent, or Firm* — METIS IP LLC

(57) ABSTRACT

Embodiments of the present disclosure provide a sound production component including a diaphragm, a magnetic circuit assembly, a coil, and a housing. The coil is connected to the diaphragm and is at least partially disposed in a magnetic gap formed by the magnetic circuit assembly, and the coil drives the diaphragm to vibrate to produce a sound after being energized. A sound outlet is provided on an inner side surface of the housing for directing a sound generated at a front side of the diaphragm out of the housing. The diaphragm comprises a main body region and a folded ring region surrounding the main body region, the folded ring region comprising an arc-shaped segment and a connection segment connected to the main body region. A projection of
(Continued)

a center of the sound outlet along a vibration direction on the diaphragm is on an inner side of the arc-shaped segment.

20 Claims, 28 Drawing Sheets

(30) Foreign Application Priority Data

| | | |
|---|---|---|
| Dec. 30, 2022 | (WO) ................ | PCT/CN2022/144339 |
| Mar. 2, 2023 | (WO) ................ | PCT/CN2023/079410 |

(51) Int. Cl.

| | |
|---|---|
| ***H04R 1/32*** | (2006.01) |
| ***H04R 9/02*** | (2006.01) |
| ***H04R 9/04*** | (2006.01) |
| ***H04R 9/06*** | (2006.01) |

(52) U.S. Cl.
CPC ............... *H04R 9/025* (2013.01); *H04R 9/06* (2013.01); *H04R 9/045* (2013.01); *H04R 2400/11* (2013.01)

(58) Field of Classification Search
CPC ...... H04R 2460/09; H04R 9/046; H04R 7/18; H04R 7/04; H04R 1/06; H04R 2400/11; H04R 2209/022; H04R 1/1016
See application file for complete search history.

(56) References Cited

U.S. PATENT DOCUMENTS

| | | | | |
|---|---|---|---|---|
| 2016/0057543 | A1* | 2/2016 | Salvatti .................... | H04R 9/04 381/398 |
| 2016/0119718 | A1 | 4/2016 | Yang et al. | |
| 2017/0134847 | A1* | 5/2017 | Miyata ................. | H04R 1/2826 |
| 2020/0137500 | A1* | 4/2020 | Moenke ................... | H04R 7/04 |
| 2020/0196062 | A1 | 6/2020 | Zhang | |
| 2021/0067857 | A1 | 3/2021 | Struzik | |
| 2021/0099783 | A1* | 4/2021 | Lin .......................... | H04R 1/02 |
| 2021/0099790 | A1* | 4/2021 | Lin .......................... | H04R 7/18 |
| 2022/0095029 | A1* | 3/2022 | Zheng .................. | H04R 1/1008 |
| 2022/0124428 | A1 | 4/2022 | Zheng et al. | |
| 2023/0130211 | A1 | 4/2023 | Li et al. | |
| 2023/0179907 | A1 | 6/2023 | Zhang et al. | |

FOREIGN PATENT DOCUMENTS

| | | | | |
|---|---|---|---|---|
| CN | 111654789 | A | | 9/2020 |
| CN | 212850985 | U | * | 3/2021 |
| CN | 212909891 | U | | 4/2021 |
| CN | 113573215 | A | | 10/2021 |
| CN | 114286228 | A | | 4/2022 |
| CN | 216357224 | U | | 4/2022 |
| CN | 115175069 | A | | 10/2022 |
| JP | 2001326986 | A | | 11/2001 |

* cited by examiner

SOUND PRODUCTION COMPONENTS

CROSS REFERENCE TO RELATED APPLICATIONS

This application is a continuation of International Patent Application No. PCT/CN2023/083543, filed on Mar. 24, 2023, which claims priority to Chinese Patent Application No. 202211336918.4, filed on Oct. 28, 2022, Chinese Patent Application No. 202223239628.6, filed on Dec. 1, 2022, International Patent Application No. PCT/CN2022/144339, filed on Dec. 30, 2022, and International Patent Application No. PCT/CN2023/079410, filed on Mar. 2, 2023, the entire contents of each of which are incorporated herein by reference.

TECHNICAL FIELD

The present disclosure relates to the field of acoustic technology, and in particular, to a sound production component.

BACKGROUND

With the development of acoustic output technology, acoustic devices (e.g., earphones) have been widely used in people's daily lives, and can be used in conjunction with electronic devices such as cell phones and computers to provide users with better service. In a sound production component, a structure of a diaphragm and a support structure cooperated with the diaphragm usually affect an output performance of the spekaer.

Therefore, it is necessary to provide a sound production component with a high output performance.

SUMMARY

Embodiments of the present disclosure provide a sound production component comprising a diaphragm, a magnetic circuit assembly, a coil, and a housing. The coil is connected to the diaphragm and is at least partially disposed in a magnetic gap formed by the magnetic circuit assembly, and the coil is energized to drive the diaphragm to vibrate in order to produce a sound. The housing is provided with a sound outlet on an inner side surface of the housing for directing a sound generated at a front side of the diaphragm out of the housing. The diaphragm comprises a main body region and a folded ring region surrounding the main body region, the folded ring region comprising an arc-shaped segment and a connection segment connected to the main body region, a projection of a center of the sound outlet on the diaphragm along a vibration direction of the diaphragm is located in an inner side of the arc-shaped segment.

In some embodiments, a span of the arc-shaped segment is in a range of 1.2 mm-1.7 mm and/or a distance from the center of the sound outlet to a lower side surface of the housing is in a range of 4.05 mm-6.05 mm.

In some embodiments, a ratio of the span of the arc-shaped segment to a short-axis dimension of the diaphragm is in a range of 0.1-0.3, and/or a ratio of the distance from the center of the sound outlet to the lower side surface of the housing to the short-axis dimension of the diaphragm is in a range of 0.3-0.5.

In some embodiments, there is a first difference between the distance from the center of the sound outlet to the lower side surface of the housing and a span of the first difference is in a range of 2.75 mm-4.15 mm.

In some embodiments, a ratio of the first difference to the short-axis dimension of the diaphragm is in a range of 0.3-0.7.

In some embodiments, the span of the arc-shaped segment is in a range of 1.2 mm-1.7 mm and/or a distance from the center of the sound outlet to a rear side surface of the housing is in a range of 8.15 mm-12.25 mm.

In some embodiments, a ratio of the span of the arc-shaped segment to the long-axis dimension of the diaphragm is in a range of 0.065-0.1 and/or a ratio of the distance from the center of the sound outlet to the rear side surface of the housing to the long-axis dimension of the diaphragm is in a range of 0.45-0.65.

In some embodiments, there is a second difference between the distance from the center of the sound outlet to the rear side surface of the housing and the span of the arc-shaped segment, the second difference is in a range of 6.8 mm-10.3 mm.

In some embodiments, a ratio of the second difference to the long-axis dimension of the diaphragm is in a range of 0.40-0.55.

In some embodiments, the long-axis dimension of the diaphragm is in a range of 13 mm-25 mm, and/or the short-axis dimension of the diaphragm is in a range of 4 mm-13 mm.

In some embodiments, a ratio of a height of the arc-shaped segment to the span of the arc-shaped segment is in a range of 0.35-0.4.

In some embodiments, a ratio of a projection area of the sound outlet to a projection area of the diaphragm along the vibration direction is in a range of 0.08-0.32.

In some embodiments, the projection area of the diaphragm along the vibration direction is in a range of 90 mm 2-560 $mm^2$, and/or an area of the sound outlet is in a range of 2.87 mm 2-46.10 $mm^2$.

In some embodiments, a ratio of the area of the sound outlet to a square of a depth of the sound outlet is in a range of 0.31-512.2.

In some embodiments, a front cavity is formed between the sound outlet and the front side of the diaphragm, and a pressure relief hole is provided on another side surface of the housing, and a rear cavity is formed between the pressure relief hole and a rear side of the diaphragm, the front cavity having a resonance frequency of not less than 3 kHz, and/or the rear cavity having a resonance frequency of not less than 3.3 kHz.

In some embodiments, a difference in resonance frequency between the rear cavity and the front cavity is less than 300 Hz.

In some embodiments, the sound production component further comprises a bracket disposed around the magnetic circuit assembly, the bracket being coupled to a part of the folded ring region away from the main body region. The bracket is provided with a plurality of air holes through which the sound from the rear side of the diaphragm is transmitted to the pressure relief hole, and a ratio of a total area of the plurality of air holes to the area of the sound outlet is in a range of 0.25-1.60.

In some embodiments, the total area of the plurality of air holes is in a range of 4.54 $mm^2$-12.96 $mm^2$.

In some embodiments, the plurality of air holes at least comprises a first air hole and a second air hole, a distance from a center of the first air hole to a center of the pressure relief hole is greater than a distance from a center of the second air hole to the center of the pressure relief hole, and an area of the first air hole is greater than an area of the second air hole.

In some embodiments, a distance from a bottom of the coil to a bottom surface of the magnetic circuit assembly along the vibration direction of the diaphragm is in a range of 0.2 mm-4 mm, and/or a distance from the center of the sound outlet to the bottom surface of the magnetic circuit assembly is in a range of 5.65 mm-8.35 mm.

BRIEF DESCRIPTION OF THE DRAWINGS

The present disclosure is further illustrated in terms of exemplary embodiments. These exemplary embodiments are described in detail with reference to the drawings. These embodiments are not limited. In these embodiments, the same number represents the same structure, wherein.

DETAILED DESCRIPTION

Figure 1:
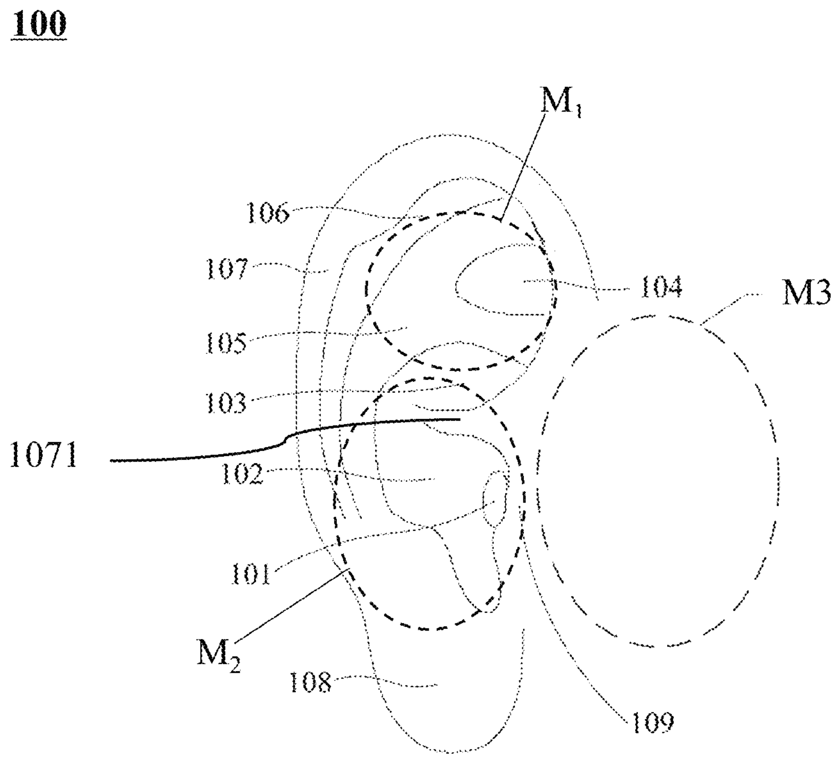
FIG. 1 is a schematic diagram illustrating an exemplary ear according to some embodiments of the present disclosure.

The technical schemes of embodiments of the present disclosure will be more clearly described below, and the accompanying drawings that need to be configured in the description of the embodiments will be briefly described below. Obviously, the drawings in the following description are merely some examples or embodiments of the present disclosure, and will be applied to other similar scenarios according to these accompanying drawings without paying creative labor. Unless obviously obtained from the context or the context illustrates otherwise, the same numeral in the drawings refers to the same structure or operation.

It should be understood that the "system," "device," "unit" and/or "module" used herein is a method for distinguishing different components, elements, components, parts, or assemblies of different levels. However, if other words may achieve the same purpose, the words may be replaced by other expressions.

As shown in the present disclosure and claims, unless the context clearly prompts the exception, "a," "one," and/or "the" is not specifically singular, and the plural may be included. It will be further understood that the terms "comprise," "comprises," and/or "comprising," "include," "includes," and/or "including," when used in the present disclosure, specify the presence of stated features, integers, steps, operations, elements, and/or components, but do not preclude the presence or addition of one or more other features, integers, steps, operations, elements, components, and/or groups thereof.

In the description of the present disclosure, it should be understood that the terms "first," "second," "third," and "fourth" are used for descriptive purposes only and are not to be understood as indicating or implying relative importance or implicitly specifying the number of technical features indicated. Thus, the features qualified with "first," "second," "third," and "fourth" may expressly or implicitly include at least one such feature. In the description of the present disclosure, "multiple" means at least two, such as two, three, etc., unless otherwise expressly and specifically limited.

In the present disclosure, unless otherwise expressly specified and limited, the terms "connected," "fixed," etc., shall be understood in a broad sense. For example, the term "connection" may refer to a fixed connection, a detachable connection, or an integral part; a mechanical connection, or an electrical connection; a direct connection, or an indirect connection through an intermediate medium; a connection within two components or an interaction between two components, unless otherwise expressly limited. For those skilled in the art, the specific meaning of the above terms in the present disclosure can be understood on a case-by-case basis.

FIG. 1 is a schematic diagram illustrating an exemplary ear according to some embodiments of the present disclosure. Referring to FIG. 1, the ear 100 (which may also be referred to as an auricle) may include an external ear canal 101, a cavum concha 102, a cymba concha 103, a triangular fossa 104, an antihelix 105, a scapha 106, a helix 107, an earlobe 108, a tragus 109, and a helix foot 1071. In some embodiments, one or more parts of the ear 100 may be used to support an acoustic device to achieve stable wearing of the acoustic device. In some embodiments, the external ear canal 101, the cavum concha 102, the cymba concha 103, the triangular fossa 104, and other parts have a certain depth and volume in a three-dimensional (3D) space, which may be used to meet a wearing requirement of the acoustic device. For example, the acoustic device (e.g., an in-ear earphone) may be worn in the external ear canal 101. In some embodiments, the wearing of the acoustic device may be achieved by utilizing other parts of the ear 100 other than the external ear canal 101. For example, the wearing of the acoustic device may be achieved with the aid of the cymba concha 103, the triangular fossa 104, the antihelix 105, the scapha 106, the helix 107, and other parts of the ear, or combinations thereof. In some embodiments, the earlobe 108 and other parts of a user's ear may also be used to improve the comfort and reliability of the acoustic device in wearing. By utilizing parts of the ear 100 other than the external ear canal 101 for wearing the acoustic device and transmitting sound, the external ear canal 101 of the user may be "liberated." When the user wears the acoustic device, the acoustic device does not block the external ear canal 101 (or an ear canal or an ear canal opening) of the user, and the user may receive both sounds from the acoustic device and sound from the environment (e.g., horn sounds, car bells, surrounding voices, traffic commands, etc.), thereby reducing the probability of traffic accidents. In the context of the present disclosure, an acoustic device that does not block the user's external ear canal 101 (or the ear canal or the ear canal opening) when worn by the user may be referred to as an open earphone. In some embodiments, the acoustic device may be designed to adapt to the ear 100 according to the construction of the ear 100 to enable a sound production component of the acoustic device to be worn at various positions of the ear. For example, when the acoustic device is an open earphone, the open earphone may include a suspension structure (e.g., an ear hook) and a sound production component. The sound production component is physically connected to the suspension structure, which may be adapted to the shape of the ear to place the whole or part of the structure of the sound production component at a front side of the tragus 109 (e.g., the region M3 enclosed by the dotted line in FIG. 1). As another example, the whole or part of the structure of the sound production component may be in contact with an upper portion of the external ear canal 101 (e.g., where one or more parts such as the cymba concha 103, the triangular fossa 104, the antihelix 105, the scapha 106, the helix 107, the helix foot 1071, etc., are located) while the user is wearing the open earphone. As another example, when the user wears the open earphone, the whole or part of the structure of the sound production component may be located within a cavity formed by one or more parts of the ear 100 (e.g., the cavum concha 102, the cymba concha 103, the triangular fossa 104, etc.) (e.g., the region M1 enclosed by the dotted line in FIG. 1 containing at least the cymba concha 103, the triangular fossa 104 and the region M2 containing at least the cavum concha 102).

Different users may have individual differences, resulting in different shapes, dimensions, etc., of ears. For ease of description and understanding, if not otherwise specified, the present disclosure primarily uses a "standard" shape and dimension ear model as a reference and further describes the wearing manners of the acoustic device in different embodiments on the ear model. For example, a simulator (e.g., GRAS 45BC KEMAR) containing a head and (left and right) ears produced based on standards of ANSI: 53.36, 53.25 and IEC: 60318-7, may be used as a reference for wearing the acoustic device to present a scenario in which most users wear the acoustic device normally. Merely by way of example, the reference ear may have the following relevant features: a projection of an auricle on a sagittal plane in a vertical axis direction may be in a range of 49.5 mm-74.3 mm, and a projection of the auricle on the sagittal plane in a sagittal axis direction may be in a range of 36.6 mm-55 mm. Thus, in the present disclosure, the descriptions such as "worn by the user," "in the wearing state," and "in the wearing state" may refer to the acoustic device described in the present disclosure being worn on the ear of the aforementioned simulator. Of course, considering the individual differences of different users, structures, shapes, dimensions, thicknesses, etc., of one or more parts of the ear 100 may be somewhat different. In order to meet the needs of different users, the acoustic device may be designed differently, and these differential designs may be manifested as feature parameters of one or more parts of the acoustic device (e.g., a sound production component, an ear hook, etc., in the following descriptions) may have different ranges of values, thus adapting to different ears.

It should be noted that in the fields of medicine, anatomy, or the like, three basic sections including a sagittal plane, a coronal plane, and a horizontal plane of the human body may be defined, respectively, and three basic axes including a sagittal axis, a coronal axis, and a vertical axis may also be defined. As used herein, the sagittal plane may refer to a section perpendicular to the ground along a front and rear direction of the body, which divides the human body into left and right parts. The coronal plane may refer to a section perpendicular to the ground along a left and right direction of the body, which divides the human body into front and rear parts. The horizontal plane may refer to a section parallel to the ground along an up-and-down direction of the body, which divides the human body into upper and lower parts. Correspondingly, the sagittal axis may refer to an axis along the front-and-rear direction of the body and perpendicular to the coronal plane. The coronal axis may refer to an axis along the left-and-right direction of the body and perpendicular to the sagittal plane. The vertical axis may refer to an axis along the up-and-down direction of the body and perpendicular to the horizontal plane. Further, the "front side of the ear" as described in the present disclosure is a concept relative to the "rear side of the ear," where the former refers to a side of the ear away from the head and the latter refers to a side of the ear facing the head. In this case, observing the ear of the above simulator in a direction along the coronal axis of the human body, a schematic diagram illustrating the front side of the ear as shown in FIG. 1 is obtained FIG. 2 is a structural diagram illustrating an exemplary open earphone according to some embodiments of the present disclosure.

In some embodiments, the open earphone 10 may include, but is not limited to, an air conduction earphone, a bone-air conduction earphone, etc. In some embodiments, the open earphone 10 may be combined with products such as glasses, a headset, a head-mounted display device, an AR/VR headset, etc.

Figure 2:
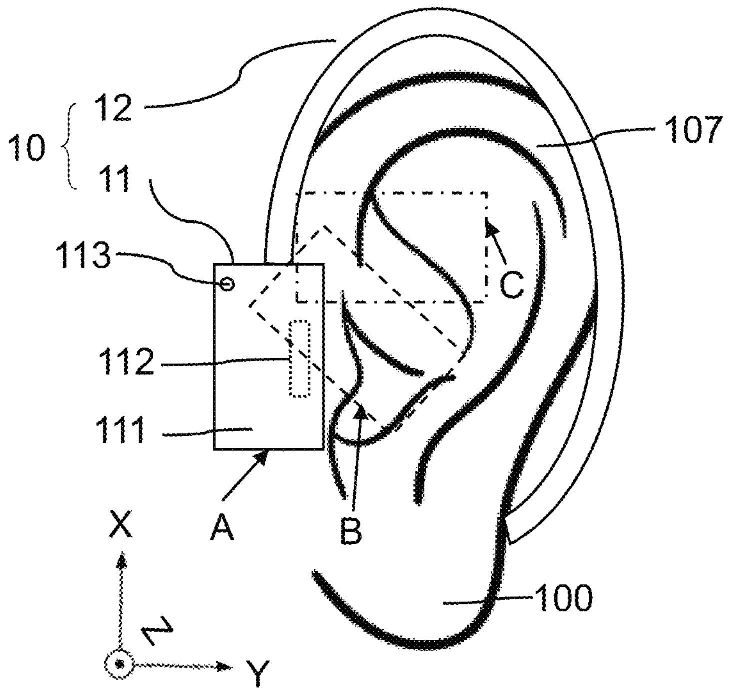
FIG. 2 is a structural diagram illustrating an exemplary open earphone according to some embodiments of the present disclosure.

As shown in FIG. 2, the open earphone 10 may include a sound production component 11 and an ear hook 12.

The sound production component 11 may be worn on a user's body, and the sound production component 11 may generate a sound that is input into an ear canal of the user. In some embodiments, the sound production component 11 may include a transducer (e.g., a transducer 116 shown in FIG. 16) and a housing 111 for accommodating the transducer. The housing 111 may be connected to the ear hook 12. The transducer is used to convert an electrical signal into a corresponding mechanical vibration to produce a sound. In some embodiments, a sound outlet 112 is provided on a side of the housing toward the ear, and the sound outlet 112 is used to transmit a sound generated by the transducer out of the housing 111 and into the ear canal so that the user can hear the sound. In some embodiments, the sound outlet 112 may be located on a side wall of the housing of the sound production component toward or proximate to the user's external ear canal 101, and the transducer may output the sound to the user's the external ear canal 101 through the sound outlet 112. The transducer is a component that can receive an electrical signal and convert the electrical signal into a sound signal for output. In some embodiments, differentiated by frequency, a type of transducer may include a low frequency (e.g., 30 Hz-150 Hz) speaker, a mid-low frequency (e.g., 150 Hz-500 Hz) speaker, a mid-high frequency (e.g., 500 Hz-5 kHz) speaker, a high frequency (e.g., 5 kHz-16 kHz) speaker, or a full frequency (e.g., 30 Hz-16 kHz) speaker, or any combination thereof. The low frequency, high frequency, etc., mentioned here only indicate an approximate range of frequency, which may have different divisions in different application scenarios. For example, a frequency division point may be determined, with the low frequency indicating a range of frequency below the frequency division point, and the high frequency indicating a range of frequency above the frequency division point. The frequency division point may be any value within an audible range of a human ear, for example, 500 Hz, 600 Hz, 700 Hz, 800 Hz, 1000 Hz, or the like.

In some embodiments, the transducer may include a diaphragm (e.g., a diaphragm 1121). The diaphragm may separate the housing 111 of the earphone to form a front cavity (e.g., a front cavity 114 shown in FIG. 16) and a rear cavity (e.g., a rear cavity 115 shown in FIG. 16), and the sound outlet 112 may communicate with the front cavity and transmit the sound generated by the front cavity out of the housing 111 and into the ear canal. In some embodiments, a portion of the sound exported through the sound outlet 112 may be transmitted to the ear canal thereby allowing the user to hear the sound, and another portion thereof may be transmitted with the sound reflected by the ear canal through a gap between the sound production component 11 and the ear (e.g., a portion of the cavum concha that is not covered by the sound production component 11) to the exterior side of the open earphone 10 and the ear, thereby creating a first leakage sound in a far field. Meanwhile, one or more pressure relief holes 113 (e.g., a first pressure relief hole 1131 and a second pressure relief hole 1132) are generally provided on another side surface of the housing 111 (e.g., sides facing away from or back away from the user's ear canal). The pressure relief hole 113 is acoustically coupled with the rear cavity, and while the diaphragm vibrates, air in the rear cavity may also be driven to vibrate to produce an air-conducted sound. The air-conducted sound produced in the rear cavity may be transmitted to the outside world through the pressure relief hole. The pressure relief hole 113 is farther away from the ear canal compared to the sound outlet 112, and a sound propagated by the pressure relief hole 113 generally forms a second leakage sound in the far field. An intensity of the aforementioned first leakage sound is similar to an intensity of the aforementioned second leakage sound, and a phase of the aforementioned first leakage sound and a phase of the aforementioned second leakage sound are opposite (or substantially opposite) to each other so that the aforementioned first leakage sound and the aforementioned second leakage sound can cancel each other out in the far-field, which is conducive to reducing the leakage of the open earphone 10 in the far-field. For more descriptions about the sound production component 11, please refer to other places of the present disclosure, such as FIG. 7, FIG. 13, FIG. 16, or FIG. 18, etc., and their descriptions.

In some embodiments, one end of the ear hook 12 may be connected to the sound production component 11 and the other end of the ear hook 12 extends along a junction between the user's ear and head. In some embodiments, the ear hook 12 may be an arc-shaped structure that is adapted to the user's auricle, so that the ear hook 12 can be hung on the user's auricle. For example, the ear hook 12 may have an arc-shaped structure adapted to the junction of the user's head and ear, so that the ear hook 12 can be hung between the user's ear and head. In some embodiments, the ear hook 12 may also be a clamping structure adapted to the user's auricle, so that the ear hook 12 can be clamped at the user's auricle. Exemplarily, the ear hook 12 may include a hook portion (e.g., the first portion 121 shown in FIG. 7) and a connection portion (e.g., the second portion 122 shown in FIG. 7) that are connected in sequence. The connection portion connects the hook portion to the sound production component 11 so that the open earphone 10 is curved in the three-dimensional space when it is in a non-wearing state (i.e., in a natural state). In other words, in the three-dimensional space, the hook portion, the connection portion, and the sound production component 11 are not co-planar. In such cases, when the open earphone 10 is in the wearing state, the hook portion may be primarily for hanging between a rear side of the user's ear and the head, and the sound production component 11 may be primarily for contacting a front side of the user's ear, thereby allowing the sound production component 11 and the hook portion to cooperate to clamp the ear. Exemplarily, the connection portion may extend from the head toward an outside of the head and cooperate with the hook portion to provide a compression force on the front side of the ear for the sound production component 11. The sound production component 11 may specifically be pressed against an area where a part such as the cavum concha 102, the cymba concha 103, the triangular fossa 104, the antihelix 105, etc., is located under the compression force so that the outer ear canal 101 of the ear is not obscured when the open earphone 10 is in the wearing state.

In some embodiments, in order to improve the stability of the open earphone 10 in the wearing state, the open earphone 10 may be provided in any one of the following ways or a combination thereof. First, at least a portion of the ear hook 12 is provided as a mimic structure that fits against at least one of the rear side of the ear 100 and the head to increase a contact area of the ear hook 12 with the ear 100 and/or the head, thereby increasing the resistance of the open earphone 10 to fall off from the ear 100. Second, at least a portion of the ear hook 12 is provided with an elastic structure so that it has a certain degree of deformation in the wearing state to increase a positive pressure of the ear hook 12 on the ear and/or the head, thereby increasing the resistance of the open earphone 10 to fall off from the ear. Third, the ear hook 12 is at least partially set to lean against the head in the wearing state, so that it forms a reaction force to press the ear to enable the sound production component 11 to be pressed on the front side of the ear, thereby increasing the resistance of the open earphone 10 to fall off from the ear. Fourth, the sound production component 11 and the ear hook 12 are set to clamp a region where the helix is located, a region where the cavum concha is located, etc., from the front and rear sides of the ear in the wearing state, so as to increase the resistance of the open earphone 10 to fall off from the ear. Fifth, the sound production component 11 or an auxiliary structure connected thereto is set to extend at least partially into cavities such as the inferior concha, the cymba concha, the triangular fossa, and the scapha, so as to increase the resistance of the open earphone 10 to falling off from the ear.

In some embodiments, the ear hook 12 may include, but is not limited to, an ear hook, an elastic band, or the like, enabling the open earphone 10 to be better worn by the user and preventing the user from dropping the open earphone 10 during use. In some embodiments, the open earphone 10 may not include the ear hook 12, and the sound production component 11 may be worn around the user's ear 100 by hanging or clamping.

In some embodiments, the sound production component 11 may be, for example, circular, elliptical, runway-shaped, polygonal, U-shaped, V-shaped, semi-circular, or other regular or irregular shapes so that the sound production component 11 may be hung directly at the user's ear 100. In some embodiments, the sound production component 11 may have a long-axis direction X and a short-axis direction Y that are perpendicular to the thickness direction Z and orthogonal to each other. The long-axis direction X may be defined as a direction having the largest extension dimension in a shape of a two-dimensional projection plane (e.g., a projection of the sound production component 11 in a plane on which its outer side surface is located, or a projection on a sagittal plane) of the sound production component 11. For example, when the projection shape is rectangular or approximately rectangular, the long-axis direction is a length direction of the rectangle or approximately rectangle. The short-axis direction Y may be defined as a direction perpendicular to the long-axis direction X in the shape of the projection of the sound production component 11 on the sagittal plane. For example, when the projection shape is rectangular or approximately rectangular, the short-axis direction is a width direction of the rectangle or approximately rectangle. The thickness direction Z may be defined as a direction perpendicular to the two-dimensional projection plane, for example, in the same direction as a coronal axis, both pointing to the left-and-right side of the body.

In some embodiments, when the user wears the open earphone 10, the sound production component 11 may be worn at a location near the user's external ear canal 101 but not blocking the ear canal. In some embodiments, the projection of the open earphone 10 on the sagittal plane may not cover the user's ear canal while in the wearing state. For example, the projection of the sound production component 11 on the sagittal plane may fall on the left and right sides of the head and be located at the front side of the tragus in the sagittal axis of the body (e.g., at the position shown in dashed box A in FIG. 2). In this case, the sound production component 11 is located at the front side of the tragus of the user, the long-axis of the sound production component 11 may be in a vertical or approximately vertical position, the projection of the short-axis direction Y on the sagittal plane is in the same direction as the sagittal axis, the projection of the long-axis direction X on the sagittal plane is in the same direction as a vertical axis, and the thickness direction Z is perpendicular to the sagittal plane. As another example, the projection of the sound production component 11 on the sagittal plane may fall on the antihelix 105 (e.g., at the position shown in the dashed box C in FIG. 2). In this case, the sound production component 11 is at least partially located at the antihelix 105, the long-axis of the sound production component 11 is horizontal or approximately horizontal, the projection of the long-axis direction X of the sound production component 11 on the sagittal plane is in the same direction as the sagittal axis, the projection of the short-axis direction Y on the sagittal plane is in the same direction as the vertical axis and the thickness direction Z is perpendicular to the sagittal plane. In this way, it is possible to avoid the sound production component 11 from blocking the ear canal, thereby freeing the user's ears. It is also possible to increase the contact area between the sound production component 11 and the ear 100, thus improving the wearing comfort of the open earphone 10.

In some embodiments, in the wearing state, the projection of the open earphone 10 on the sagittal plane may also cover or at least partially cover the user's ear canal, for example, the projection of the sound production component 11 on the sagittal plane may fall within the cavum concha 102 (e.g., at the position shown in the dashed box B in FIG. 2) and be in contact with the helix foot 1071 and/or the helix 107. At this point, the sound production component 11 is at least partially located in the cavum concha 102; the sound production component 11 is in an inclined state; the projection of the short-axis direction Y of the sound production component 11 on the sagittal plane may have an angle with the direction of the sagittal axis, i.e., the short-axis direction Y is also set at a corresponding inclination; the projection of the long-axis direction X on the sagittal plane may have an angle with the direction of the sagittal axis, i.e., the long-axis direction X is also set at an inclination; and the thickness direction Z is perpendicular to the sagittal plane. At this point, since the cavum concha 102 has a certain volume and depth, the open earphone 10 has a certain distance between the inner side surface IS and the inferior concha. The ear canal may be communicated with the outside world through the gap between the inner side surface IS and the inferior concha, thus freeing both ears of the user. At the same time, the sound production component 11 and the cavum concha may cooperate to form an auxiliary cavity (e.g., a cavity structure as mentioned later) that is communicated with the ear canal. In some embodiments, the sound outlet 112 may be at least partially located in the aforementioned auxiliary cavity, and the sound exported from the sound outlet 112 is limited by the aforementioned auxiliary cavity, i.e., the aforementioned auxiliary cavity is able to gather the sound, allowing the sound to propagate more into the ear canal, thereby improving the volume and quality of the sound heard by the user in the near-field, and improving the acoustic effect of the open earphone 10.

The description of the above-mentioned open earphone 10 is for the purpose of illustration only, and is not intended to limit the scope of the present disclosure. Those skilled in the art can make various changes and modifications based on the description of this present disclosure. For example, the open earphone 10 may also include a battery assembly, a Bluetooth assembly, etc., or a combination thereof. The battery assembly may be used to power the open earphone 10. The Bluetooth assembly may be used to wirelessly connect the open earphone 10 to other devices (e.g., a cell phone, a computer, etc.). These variations and modifications remain within the scope of protection of the present disclosure.

Figure 3:
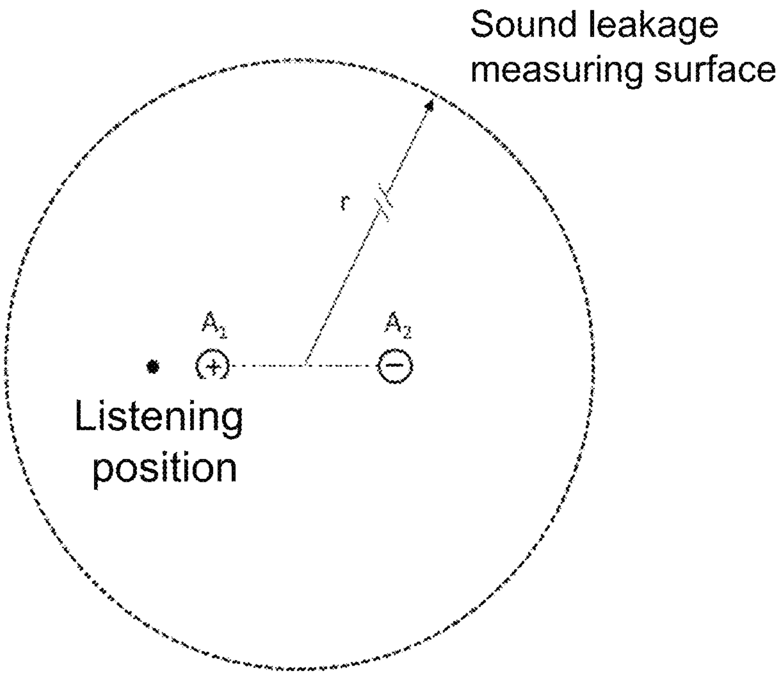
FIG. 3 is a schematic diagram illustrating two exemplary point sound sources and one listening position according to some embodiments of the present disclosure.

FIG. 3 is a schematic diagram illustrating two exemplary point sound sources and one listening position according to some embodiments of the present disclosure.

In some embodiments, referring to FIG. 3, a sound may be transmitted to the outside of the open earphone 10 via the sound outlet 112, which may be treated as a monopole sound source (or a point sound source) A1, and it can produce a first sound. A sound may be transmitted to the outside of the open earphone 10 via the pressure relief hole 113, which may be treated as a monopole sound source (or a point sound source) A2, and it can produce a second sound. The second sound may be in opposite or approximately opposite phase to the first sound, so that the first sound and the second sound can cancel each other out in the far-field, i.e., forming an "acoustic dipole" to reduce sound leakage. In some embodiments, in the wearing state, a line connecting the two monopole sound sources may be pointed toward the ear canal (noted as a "listening position") so that the user can hear a sufficiently loud sound. In this case, a sound pressure level at the listening position (denoted as Pear) may be used to characterize the intensity of the sound heard by the user (i.e., a near-field listening sound pressure). Further, the magnitude of the sound pressure (denoted as Pfar) on a sphere centered at the user's listening position (or on a sphere with a center of the dipole sound source (e.g., A1 and A2 as shown in FIG. 3) and a radius of r) may be counted and may be used to characterize the intensity of sound leakage radiated to the far-field by the open earphone 10 (i.e., a far-field leakage sound pressure). Pfar may be obtained in various statistical ways, for example, by taking an average value of the sound pressure at each point of the sphere, or by taking the sound pressure distribution at each point of the sphere for area integration, etc.

It should be known that the measurement method for sound leakage in the present disclosure is only an exemplary illustration of the principle and effect, and is not limited. The method for measuring and calculating sound leakage may also be reasonably adjusted according to actual conditions. For example, a center of the dipole sound source may be used as a center of a circle, and sound pressure amplitudes of two or more points evenly sampled according to a certain spatial angle in the far-field may be averaged. In some embodiments, the measurement method for listening sound may be to select a position near the point sound source as the listening position, and the sound pressure amplitude measured at that listening position is used as a value of the listening sound. In some embodiments, the listening position may or may not be on the connection line between the two point sound sources. The measurement and calculation of the listening sound may also be reasonably adjusted according to actual conditions, for example, taking the sound pressure amplitude of other points or more than one point in the near-field for averaging. As another example, with a point sound source may be used as a center of a circle, and sound pressure amplitudes of two or more points evenly sampled according to a certain spatial angle in the near-field may be averaged. In some embodiments, a distance between the near-field listening position and a point sound source is much smaller than a distance between the point sound source and the far-field leakage measurement sphere.

Obviously, the sound pressure Pear transmitted by the open earphone 10 to the user's ear should be large enough to increase the listening effect; and the sound pressure Pfar in the far-field should be small enough to increase the sound leakage reduction effect. Therefore, a sound leakage index a may be taken as an index for evaluating the sound leakage reduction capability of the open earphone 10:

$$\alpha = \frac{|P_{far}|^2}{|P_{ear}|^2}. \tag{1}$$

According to equation (1), it can be seen that the smaller the leakage index is, the stronger the sound leakage reduction ability of the open earphone is, and in the case of the same near-field listening volume at the listening position, the smaller the far-field leakage is.

Figure 4:
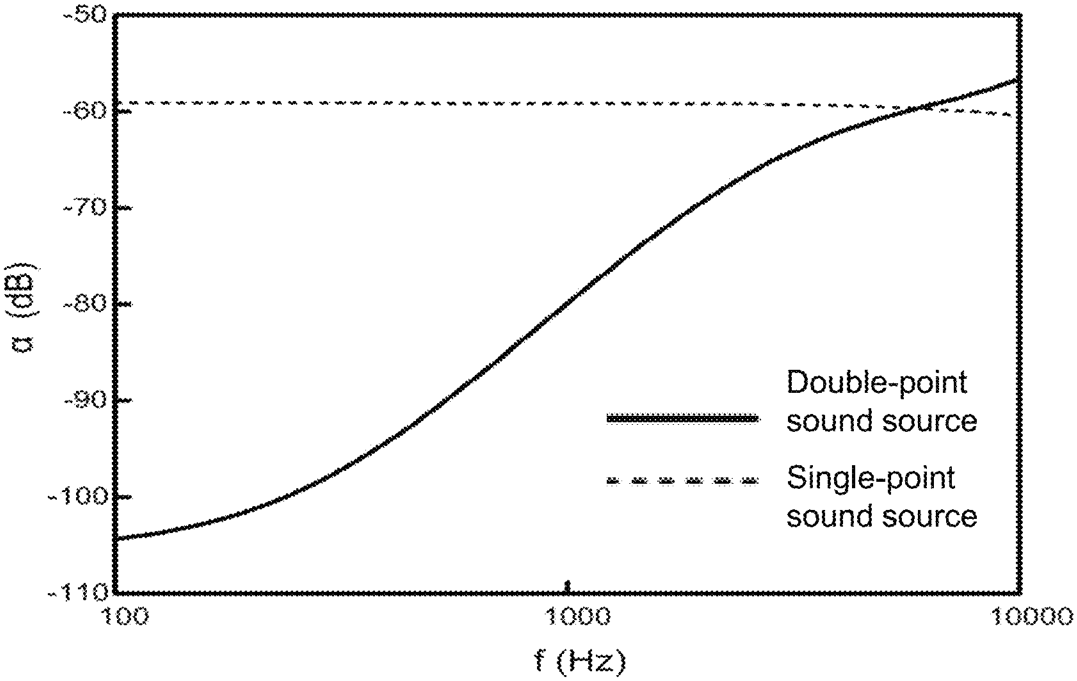
FIG. 4 is a comparison diagram of sound leakage indexes at different frequencies of a single-point sound source and a double-point sound source according to some embodiments of the present disclosure.

FIG. 4 is a comparison diagram of sound leakage indexes at different frequencies of a single-point sound source and a double-point sound source according to some embodiments of the present disclosure. The double-point sound source (also known as a dipole sound source) in FIG. 4 may be a typical double-point sound source, i.e., a distance between two point sound sources is fixed, and the two point sound sources have the same amplitude and the opposite phases. It should be understood that the typical double-point sound source is only for the principle and effect description, and parameters of each point sound source can be adjusted according to the actual needs to make it different from the typical double-point sound source. As shown in FIG. 4, when the distance is fixed, the sound leakage generated by the double-point sound source increases with the increase of frequency, and the sound leakage reduction ability decreases with the increase of frequency. When the frequency is greater than a certain frequency value (for example, about 8000 Hz as shown in FIG. 4), the sound leakage is greater than that of a single-point sound source, and this frequency (for example, 8000 Hz) is an upper frequency at which the double-point sound source can reduce the sound leakage.

In some embodiments, to improve the acoustic output of the open earphone, i.e., to increase the sound intensity in the near-field listening position while reducing the volume of the far-field sound leakage, a baffle may be provided between the sound outlet 112 and the pressure relief hole 113.

Figure 5:
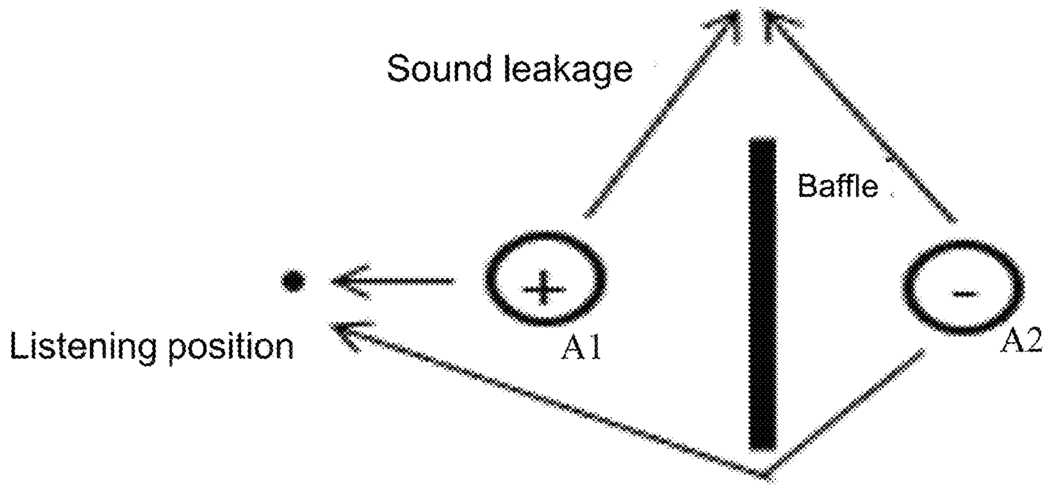
FIG. 5 is a schematic diagram illustrating an exemplary distribution of a baffle provided between two sound sources of a dipole sound source according to some embodiments of the present disclosure.

FIG. 5 is a schematic diagram illustrating an exemplary distribution of a baffle provided between two sound sources of a dipole sound source according to some embodiments of the present disclosure. As shown in FIG. 5, when a baffle is provided between a point sound source A1 and a point sound source A2, in the near-field, a sound wave of the point sound source A2 needs to bypass the baffle to interfere with a sound wave of the point sound source A1 at the listening position, which is equivalent to an increase in a sound path from the point sound source A2 to the listening position. Therefore, assuming that the point sound source A1 and the point sound source A2 have the same amplitude, the amplitude difference between the sound waves of the point sound source A1 and the point sound source A2 at the listening position increases compared to the case without the baffle, thus reducing the degree of cancellation of the two sounds at the listening position and making the volume at the listening position increase. In the far-field, since the sound waves generated by the point sound source A1 and the point sound source A2 can interfere without bypassing the baffle in a large spatial area (similar to the case without the baffle), the sound leakage in the far-field does not increase significantly compared to the case without the baffle. Therefore, a baffle structure around one of the point sound sources A1 and A2 may significantly increase the volume of the near-field listening position without significantly increasing the volume of the far-field sound leakage.

Figure 6:
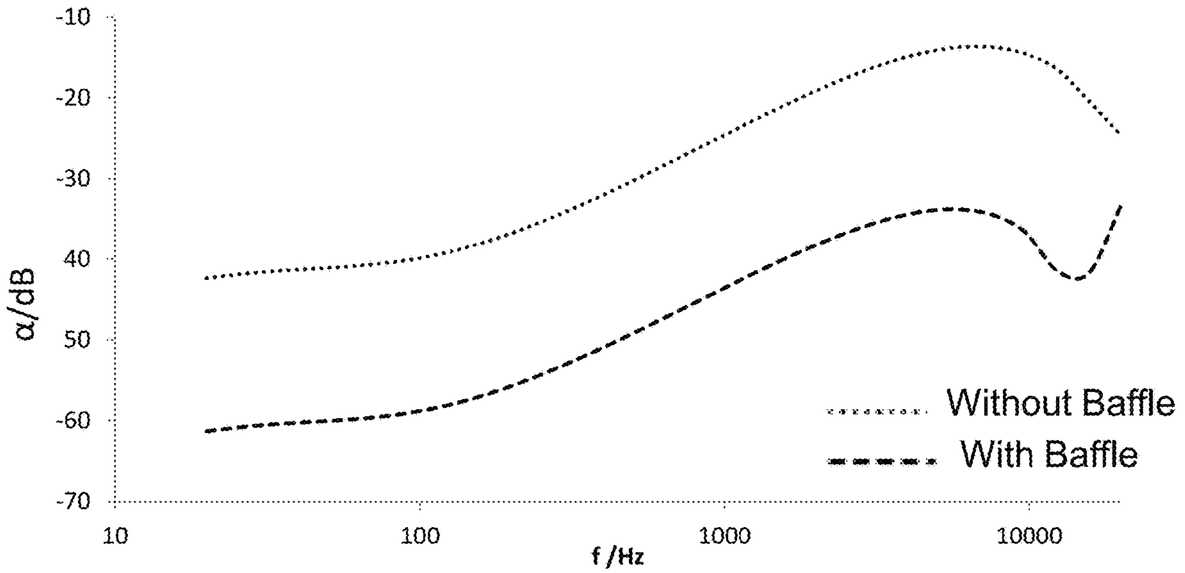
FIG. 6 is a diagram illustrating sound leakage indexes with and without a baffle between two sound sources of a dipole sound source according to some embodiments of the present disclosure.

FIG. 6 is a diagram illustrating sound leakage indexes with and without a baffle between two sound sources of a dipole sound source according to some embodiments of the present disclosure. After adding the baffle between the two point sound sources, in the near-field, it is equivalent to increasing the distance between the two point sound sources, the volume of the listening position in the near-field is equivalent to being generated by the double-point sound source at a greater distance, the listening volume in the near-field is significantly increased compared to the case without the baffle; in the far-field, a sound field of the double-point sound source is less affected by the baffle, and the resulting sound leakage is equivalent to being generated by the double-point sound source at a smaller distance. Therefore, as shown in FIG. 6, after adding the baffle, the leakage index is much smaller than that without the baffle, i.e., at the same listening volume, the sound leakage in the far-field is smaller than that in the case without the baffle, and the sound leakage reduction ability is obviously enhanced.

Figure 7:
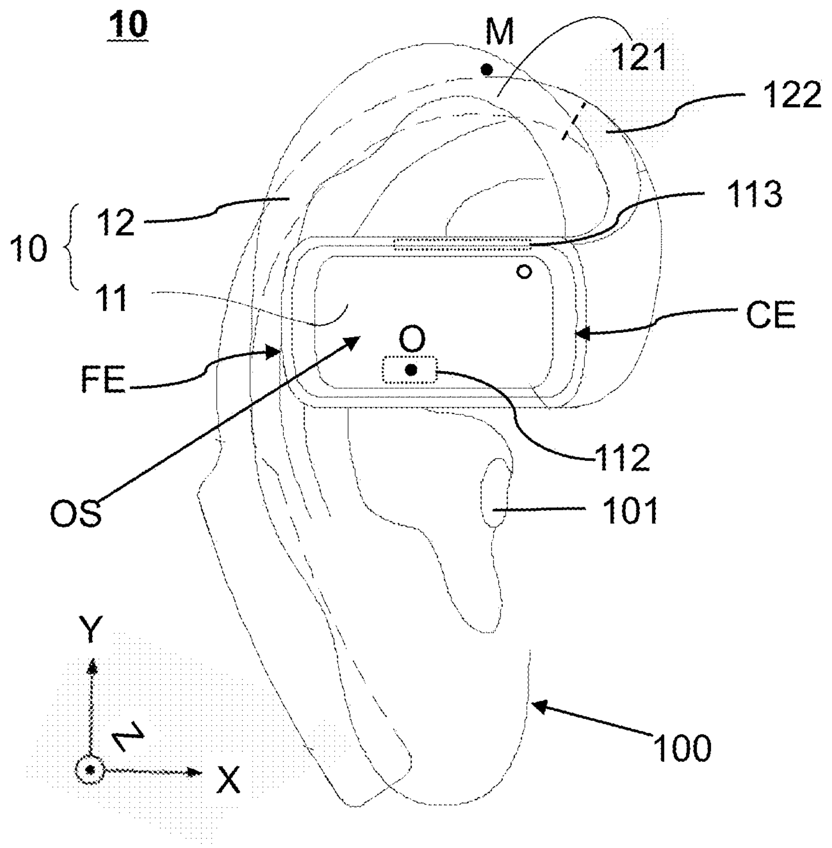
FIG. 7 is a schematic diagram illustrating an exemplary wearing state of an open earphone according to some embodiments of the present disclosure.
Figure 8:
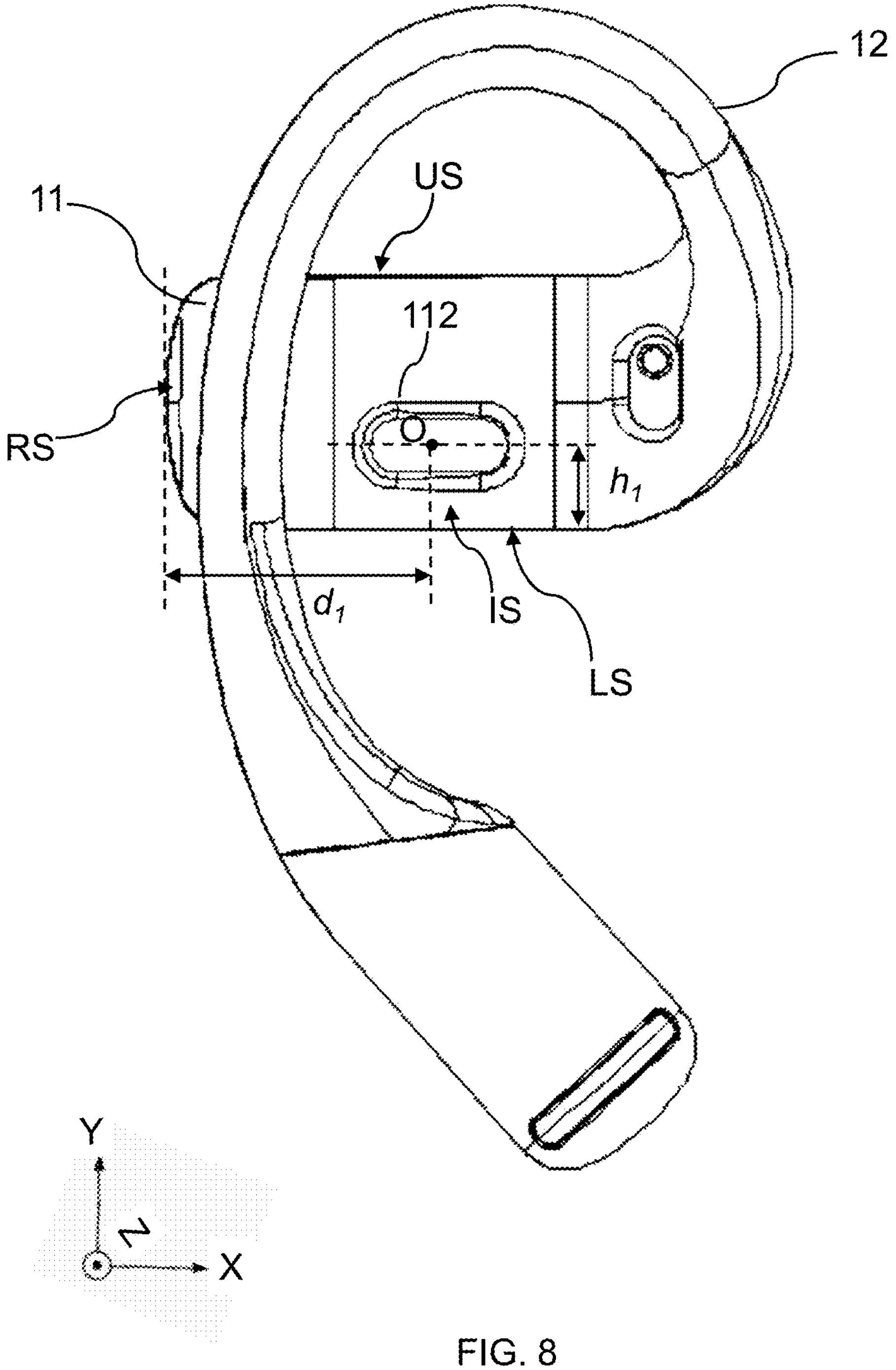
FIG. 8 is a schematic diagram illustrating a structure of a side of the open earphone shown in FIG. 7 facing an ear.

FIG. 7 is a schematic diagram illustrating an exemplary wearing state of an open earphone according to some embodiments of the present disclosure. FIG. 8 is a schematic diagram illustrating a structure of a side of the open earphone shown in FIG. 7 facing an ear.

As shown in FIG. 7, the ear hook 12 is an arc-shaped structure that fits at a junction of a user's head and the ear 100. The sound production component 11 (or the housing 111 of the sound production component 11) may have a connection end CE that is connected to the ear hook 12 and a free end FE that is not connected to the ear hook 12. The free end FE of the sound production component 11 refers to an end part of the sound production component 11 that is provided opposite to the connection end CE connected to the ear hook 12. The sound production component 11 may be a regular or irregular structural, and an exemplary illustration is provided herein to further illustrate the free end FE of the sound production component 11. For example, when the sound production component 11 is a rectangular cuboid structure, a surface of an end wall of the sound production component 11 is a plane, and in this case, the free end FE of the sound production component 11 is an end sidewall of the sound production component 11 provided opposite to the connection end CE to which the ear hook 12 is connected. As another example, if the sound production component 11 is a sphere, an ellipsoid, or an irregular structural, the free end FE of the sound production component 11 refers to a specific region away from the connection end CE determined by cutting the sound production component 11 along a Y-Z plane (a plane formed by the short-axis direction Y and the thickness direction Z), and a ratio of a dimension of the specific region along the long-axis direction X to a dimension of the sound production component along the long-axis direction X may be in a range of 0.05-0.2. When the open earphone 10 is in the wearing state, a first portion 121 of the ear hook 12 (e.g., the hook portion of the ear hook 12) is positioned between the user's ear (e.g., the helix 107) and the head, and a second portion 122 of the ear hook 12 (e.g., the connection portion of the ear hook) extends toward a side of the auricle away from the head and connects to the connection end CE of the sound production component 11 to place the sound production component 11 at a position near the ear canal but without blocking the ear canal.

Referring to FIG. 7 and FIG. 8, the sound production component 11 may have an inner side surface IS (also called an inner side surface of the housing 111) facing the ear along the thickness direction Z in the wearing state, an outer side surface OS (also called an outer side surface of the housing 111) away from the ear, and a connection surface connecting the inner side surface IS and the outer side surface OS. It should be noted that in the wearing state, when viewed along a direction in which the coronal axis (i.e., the thickness direction Z), the sound production component 11 may be provided in a shape of a circle, an oval, a rounded square, a rounded rectangle, etc. When the sound production component 11 is provided in the shape of a circle, an ellipse, etc., the above-mentioned connection surface may refer to an arc-shaped side surface of the sound production component 11; and when the sound production component 11 is set in the shape of a rounded square, a rounded rectangle, etc., the above-mentioned connection surface may include a lower side surface LS (also referred to as a lower side surface of the housing 111), an upper side surface US (also referred to as an upper side surface of the housing 111), and a rear side surface RS (also referred to as a rear side surface of the housing 111) as mentioned later. The upper side surface US and the lower side surface LS may refer to a side of the sound production component 11 in the wearing state along the short-axis direction Y away from the external ear canal 101 and a side of the sound production component 11 in the wearing state along the short-axis direction Y facing to the external ear canal 101, respectively; and the rear side surface RS may refer to a side of the sound production component 11 in the wearing state along the length direction Y toward the back of the head. For the sake of description, this embodiment is exemplarily illustrated with the sound production component 11 set in a rounded rectangle. The length of the sound production component 11 in the long-axis direction X may be greater than the width of the sound production component 11 in the short-axis direction Y. In some embodiments, the rear side surface RS of the earphone may be curved in order to improve the aesthetics and wearing comfort of the earphone.

The sound production component 11 may be provided with a transducer that can convert an electrical signal into a corresponding mechanical vibration to produce sound. The transducer (e.g., a diaphragm) may divide the housing 111 to form a front cavity and a rear cavity of the earphone. The sound produced in the front and rear cavities is in opposite phase. The inner side surface IS is provided with a sound outlet 112 communicated with the front cavity to transmit the sound generated in the front cavity out of the housing 111 and into the ear canal so that the user can hear the sound. Other sides of the housing 111 (e.g., the outer side surface OS, the upper side surface US, or the lower side surface LS, etc.) may be provided with one or more pressure relief holes 113 communicated with the rear cavity for guiding the sound generated in the rear cavity output of the housing 111 to interfere with the sound output from the sound outlet 112 in the far-field. In some embodiments, the pressure relief holes 113 are further away from the ear canal than the sound outlet 112 so as to weaken the inverse phase cancellation between the sound output via the pressure relief holes 113 and the sound output via the sound outlet 112 at the listening position.

In some embodiments, as shown in FIG. 7, when the open earphone 10 is in the wearing state, the long-axis direction X of the sound production component 11 may be set horizontally or approximately horizontally (similar to position C shown in FIG. 2). In such cases, the sound production component 11 is located at least partially at the antihelix 105, and the free end FE of the sound production component 11 may be oriented toward the back of the head. With the sound production component 11 in a horizontal or approximately horizontal state, the projection of the long-axis direction X of the sound production component 11 on the sagittal plane may be in the same direction as the sagittal axis, the projection of the short-axis direction Y on the sagittal plane may be in the same direction as the vertical axis, and the thickness direction Z is perpendicular to the sagittal plane.

In some embodiments, in order to improve the fit between the open earphone 10 and the ear 100 and improve the stability of the open earphone 10 in the wearing state, the inner side surface IS of the housing 111 may be pressed onto the surface of the ear 100 (e.g., the antihelix 105) to increase the resistance of the open earphone 10 falling off the ear 100.

In some embodiments, referring to FIG. 7 and FIG. 8, when the open earphone 10 is pressed onto the ear 100, in order to keep the sound outlet 112 on the inner side surface IS from being obstructed by ear tissues, the projection of the sound outlet 112 on the sagittal plane may partially or fully coincide with the projection of an inner concave structure (e.g., the cymba concha 103) of the ear on the sagittal plane. In some embodiments, since the cymba concha 103 is communicated with the cavum concha 102 and the ear canal is located in the cavum concha 102, when at least a portion of the projection of the sound outlet 112 on the sagittal plane is located within the cymba concha 103, the sound output from the sound outlet 112 may reach the ear canal unobstructed, resulting in a higher volume received by the ear canal. In some embodiments, a long-axis dimension of the sound production component 11 may not be too long. If the long-axis dimension of the sound production component 11 is too long, the projection of the free end FE on the sagittal plane may exceed the projection of the ear on the sagittal plane, thereby affecting the fitting effect of the sound production component 11 to the ear. Therefore, the long-axis dimension of the sound production component 11 may be designed so that the projection of the free end FE on the sagittal plane does not exceed the projection of the helix 107 on the sagittal plane. In some embodiments, when the projection of the free end FE on the sagittal plane does not exceed the projection of the helix 107 on the sagittal plane, in order to make at least part of the projection of the sound outlet 112 on the sagittal plane located within the cymba concha 103, i.e., the sound outlet 112 is at least partially facing the cymba concha 103 when actually worn, a distance d1 from a center O of the sound outlet 112 to the rear side surface RS of the sound production component 11 along the X-direction is in a range of 9.5 mm to 15.0 mm. In some embodiments, the distance d1 from the center O of the sound outlet 112 to the rear side surface RS of the sound production component 11 along the X-direction is in a range of 10.5 mm to 14.0 mm. In some embodiments, the distance d1 from the center O of the sound outlet 112 to the rear side surface RS of the sound production component 11 along the X-direction is in a range of 11.0 mm to 13.5 mm. In some embodiments, the distance d1 from the center O of the sound outlet 112 to the rear side surface RS of the sound production component 11 along the X-direction is in a range of 11.5 mm to 13.0 mm. In some embodiments, the distance d1 from the center O of the sound outlet 112 to the rear side surface RS of the sound production component 11 along the X-direction is in a range of 12.0 mm to 12.5 mm.

It should be known that since the sound outlet 112 and the pressure relief hole 113 are provided on the housing 111 and each side wall of the housing 111 has a certain thickness, the sound outlet 112 and the pressure relief hole 113 are both holes with a certain depth. At this time, the sound outlet 112 and the pressure relief hole 113 may both have an inner opening and an outer opening. For ease of description, in the present disclosure, the center O of the sound outlet 112 described above and below may refer to the centroid of the outer opening of the sound outlet 112. In some embodiments, in order to enhance the aesthetics and the wearing comfort of the earphone, one or more sidewalls (e.g., the lower side surface LS, the rear side surface RS, the inner side surface IS, the outer side surface OS, etc.) of the housing 111 may be planar or curved. When one of the sidewalls of the housing 111 is planar or curved, a distance from a certain location (e.g., the center O of the sound outlet 112) to that sidewall (e.g., the rear side surface RS) may be determined by following exemplary manners. For example, a tangent plane of that sidewall parallel to the short-axis direction Y or the long-axis direction X of the sound production component 11 may be determined, and a shortest distance from that position to the tangent plane may be determined as a distance from that position to the sidewall. Exemplarily, when the rear side surface RS is a curved surface, a tangent plane of the rear side surface RS parallel to a Y-Z plane (a plane formed by the short-axis direction Y and the thickness direction Z) may be determined, and a distance from the center O of the sound outlet 112 to the rear side surface RS may be a shortest distance from the center O of the sound outlet 112 to the tangent plane. As another example, when the lower side surface LS is a curved surface, a tangent plane of the lower side surface LS parallel to an X-Z plane (a plane formed by the long-axis direction X and the thickness direction Z) may be determined, then a distance from the center O of the sound outlet 112 to the lower side surface LS may be a shortest distance from the center O of the sound outlet 112 to the tangent plane.

In the present disclosure, the sound outlet 112 and the pressure relief hole 113 communicating with the front and rear cavities, respectively, may be regarded as the point sound source A1 and the point sound source A2, respectively, shown in FIG. 5. The ear canal may be regarded as the listening position shown in FIG. 5. At least part of the housing of the sound production component 11 and/or at least part of the auricle may be regarded as the baffle shown in FIG. 5 to increase a difference between sound paths from the sound outlet 112 and the pressure relief hole 113 to the ear canal so as to increase the sound intensity at the ear canal while maintaining the far-field sound leakage reduction effect. When the open earphone 10 adopts the structure shown in FIG. 7, i.e., when at least a portion of the housing 111 is located at the antihelix 105, in terms of the listening effect, a sound wave of the sound outlet 112 may reach the ear canal directly. In this case, the sound outlet 112 may be provided at a position on the inner side surface IS near the lower side surface LS, and the pressure relief hole 113 may be provided at a position away from the sound outlet 112, for example, the pressure relief hole 113 may be provided at a position on the outer side OS or the upper side surface US away from the sound outlet 112. A sound wave of the pressure relief hole 113 needs to bypass the exterior of the sound production component 11 to interfere with the sound wave of the sound outlet 112 at the ear canal. In addition, an upper convex and lower concave structure on the auricle (e.g., an antihelix in its propagation path) increases the sound path of the sound transmitted from the pressure relief hole 113 to the ear canal. Thus, the sound production component 11 itself and/or the auricle is equivalent to a baffle between the sound outlet 112 and the pressure relief hole 113. The baffle increases the sound path from the pressure relief hole 113 to the ear canal and reduces the intensity of the sound waves from the pressure relief hole 113 in the ear canal, thereby reducing the cancellation degree between the two sounds emitted from the sound outlet 112 and the pressure relief hole 113 in the ear canal, resulting in an increase in the volume in the ear canal. In terms of the sound leakage reduction effect, since the sound waves generated by both the sound outlet 112 and the pressure relief hole 113 can interfere without bypassing the sound production component 11 itself in a relatively large spatial area (similar to the case without a baffle), the sound leakage is not increased significantly. Therefore, by setting the sound outlet 112 and pressure relief hole 113 at suitable positions, it is possible to significantly increase the volume in the ear canal without a significant increase in the leakage sound volume.

In some embodiments, referring to FIG. 8, in order to enhance the sound intensity of the sound outlet 112 in the ear canal (i.e., the listening position), the sound outlet 112 may be provided closer to the ear canal, i.e., the sound outlet 112 may be located closer to the lower side surface LS of the sound production component 11 in the Y-direction. In some embodiments, a distance h1 from the center O of the sound outlet 112 along the Y-direction to the lower side surface LS of the sound production component 11 is in a range of 2.3 mm to 3.6 mm. In some embodiments, the distance h1 from the center O of the sound outlet 112 along the Y-direction to the lower side surface LS of the sound production component 11 is in a range of 2.5 mm to 3.4 mm. In some embodiments, the distance h1 from the center O of the sound outlet 112 along the Y-direction to the lower side surface LS of the sound production component 11 is in a range of 2.7 mm to 3.2 mm. In some embodiments, the distance h1 from the center O of the sound outlet 112 along the Y-direction to the lower side surface LS of the sound production component 11 is in a range of 2.8 mm to 3.1 mm. In some embodiments, the distance h1 from the center O of the sound outlet 112 along the Y-direction to the lower side surface LS of the sound production component 11 is in a range of 2.9 mm to 3.0 mm.

In some embodiments, referring to FIG. 7, in order to ensure that the projection of the sound outlet 112 on the sagittal plane when the open earphone 10 is worn can be partially or fully located within the cymba concha region, when the user wears the open earphone 10, a distance from the center O of the sound outlet 112 to an upper vertex M of the ear hook 12 is in a range of 17.5 mm to 27.0 mm, where the upper vertex of the ear hook 12 refers to a point closest to the head on the ear hook 12 along the vertical axis. In some embodiments, when the user wears the open earphone 10, the distance from the center O of the sound outlet 112 to the upper vertex M of the ear hook 12 is in a range of 20.0 mm to 25.5 mm. In some embodiments, when the user wears the open earphone 10, the distance from the center O of the sound outlet 112 to the upper vertex M of the ear hook 12 is in a range of 21.0 mm to 24.5 mm. In some embodiments, when the user wears the open earphone 10, the distance from the center O of the sound outlet 112 to the upper vertex M of the ear hook 12 is in a range of 22.0 mm to 23.5 mm. In some embodiments, when the user wears the open earphone 10, the distance from the center O of the sound outlet 112 to the upper vertex M of the ear hook 12 is in a range of 22.5 mm to 23.0 mm.

In some embodiments, a ratio of the distance between the center O of the sound outlet 112 and the upper vertex M of the ear hook 12 to a distance between the upper and lower boundaries of the inner side surface IS (i.e., a distance between the upper side surface US and the lower side surface LS of the sound production component 11 or housing 111) cannot be too large or too small. In some embodiments, when the upper side surface US and/or the lower side surface LS is curved, the distance between the upper side surface US and the lower side surface LS may refer to a distance between a tangent plane of the upper side surface US that is farthest from the center of the sound production component and parallel to the long-axis of the sound production component and a tangent plane of the lower side surface LS that is farthest from the center of the sound production component and parallel to the long-axis of the sound production component. In the case where the distance between the center O of the sound outlet 112 and the upper vertex M of the ear hook 12 is a constant, if the above ratio is too small, a width dimension of the inner side surface IS may be too large, which may result in a larger overall weight of the sound production component and a small distance between the housing and the ear hook, thereby causing uncomfortable for the user to wear. If the above ratio is too large, the width dimension of the inner side surface IS may be too small, which may result in a small area for the transducer of the sound production component 11 to push the air, thereby causing the low sound production efficiency of the sound production component. Thus, in order to ensure that the sound production efficiency of the sound production component is sufficiently high and to improve the user's wearing comfort, and cause the projection of the sound outlet 112 on the sagittal plane can be located at least partially within the cymba concha region, when the user wears the open earphone 10, a ratio of the distance between the center O of the sound outlet 112 and the upper vertex M of the ear hook 12 to the distance between the upper and lower boundaries of the inner side surface IS is between 0.95 and 1.55. In some embodiments, a ratio of the distance between the center O of the sound outlet 112 and the upper vertex M of the ear hook 12 to the width dimension of the housing 111 is between 1.05 and 1.45. In some embodiments, the ratio of the distance between the center O of the sound outlet 112 and the upper vertex M of the ear hook 12 to the width dimension of the housing 111 is between 1.15 and 1.35. In some embodiments, the ratio of the distance between the center O of the sound outlet 112 and the upper vertex M of the ear hook 12 to the width dimension of the housing 111 is between 1.20 and 1.30.

In the wearing manner shown in FIG. 7, since the sound outlet 112 is located at a position on the inner side surface IS that is relatively close to the ear canal, a ratio of the distance between the center O of the sound outlet 112 and the upper vertex M of the ear hook 12 to a distance between the center O of the sound outlet 112 and the upper side surface US of the sound production component 11 cannot be too large. In addition, in order to ensure that there is sufficient distance between the sound production component 11 and the upper vertex M of the ear hook 12 (to prevent the sound production component 11 and the ear hook 12 from exerting too much pressure on the ear), the ratio of the distance between the center O of the sound outlet 112 and the upper vertex M of the ear hook 12 to the distance between the center O of the sound outlet 112 and the upper side surface US of the sound production component 11 cannot be too small. In some embodiments, when the user wears the open earphone 10, the ratio of the distance between the center O of the sound outlet 112 and the upper vertex M of the ear hook 12 to the distance between the center O of the sound outlet 112 and the upper side surface US of the sound production component 11 is between 1.19 and 2.5. Preferably, the ratio of the distance between the center O of the sound outlet 112 and the upper vertex M of the ear hook 12 to the distance between the center O of the sound outlet 112 and the upper side surface US of the sound production component 11 is between 1.5 and 1.8.

In the wearing manner shown in FIG. 7, since the sound outlet 112 is located at a position on the inner side surface IS that is relatively close to the ear canal, the ratio of the distance between the center O of the sound outlet 112 and the upper vertex M of the ear hook 12 to a distance between the center O of the sound outlet 112 and the lower side surface IS of the sound production component 11 cannot be too small. In addition, in order to ensure that the sound outlet has a sufficient area (to prevent excessive acoustic impedance caused by too small area of the sound outlet), a width of the sound outlet 112 cannot be too small, and the ratio of the distance between the center O of the sound outlet 112 and the upper vertex M of the ear hook 12 to the distance between the center O of the sound outlet 112 and the lower side surface IS of the sound production component 11 cannot be too large. In some embodiments, when the user wears the open earphone 10, the ratio of the distance between the center O of the sound outlet 112 and the upper vertex M of the ear hook 12 to the distance h3 between the center O of the sound outlet 112 and the lower side surface IS of the sound production component 11 is between 6.03 and 9.05. Preferably, the ratio of the distance between the center O of the sound outlet 112 and the upper vertex M of the ear hook 12 to the distance between the center O of the sound outlet 112 and the lower side surface IS of the sound production component 11 is between 7 and 8.

Figure 9:
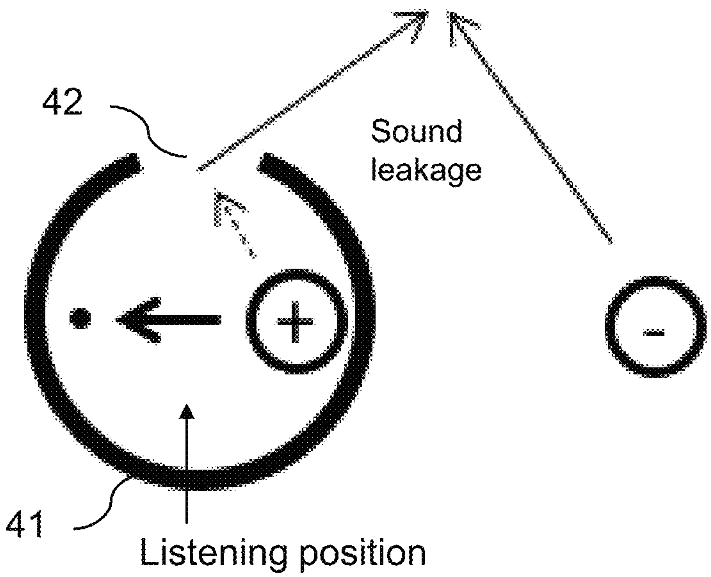
FIG. 9 is a distribution schematic diagram of a cavity structure arranged around one sound source of a dipole sound source according to some embodiments of the present disclosure.

In some embodiments, in order to increase the listening volume, particularly at low and middle frequencies, while still retaining the effect of far-field leakage cancellation, a cavity structure may be constructed around one of the sources of the double-point sound source. FIG. 9 is a distribution schematic diagram of a cavity structure arranged around one sound source of a dipole sound source according to some embodiments of the present disclosure.

As shown in FIG. 9, the cavity structure 41 is provided between the dipole sound source such that one sound source of the dipole sound source and the listening position is inside the cavity structure 41 and the other sound source is outside the cavity structure 41. A sound derived from the sound source inside the cavity structure 41 is limited by the cavity structure 41, i.e., the cavity structure 41 is able to gather the sound so that the sound can propagate more to the listening position, thereby improving the volume and quality of the sound at the listening position. In the present disclosure, the "cavity structure" can be understood as a semi-enclosed structure enclosed by a side wall of the sound production component 11 together with the cavum concha structure, which is such that the interior is not completely sealed off from the external environment, but has a leaking structure 42 (e.g., an opening, a slit, a pipe, etc.) that is acoustically communicated with the external environment. Exemplary leaking structures may include, but are not limited to, an opening, a slit, a pipe, etc., or any combination thereof.

In some embodiments, the cavity structure 41 may contain a listening position and at least one sound source. Here, "contain" may mean that at least one of the listening position and the sound source is inside the cavity, or it may mean that at least one of the listening position and the sound source is at an edge inside the cavity. In some embodiments, the listening position may be an opening of the ear canal or an acoustic reference point of the ear.

Figure 10A:
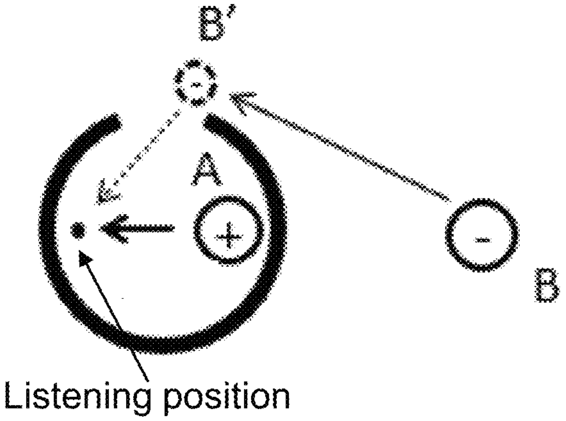
FIG. 10A is a schematic diagram illustrating a listening principle of a dipole sound source structure and a cavity structure constructed around one sound source of the dipole sound source according to some embodiments of the present disclosure.
Figure 10B:
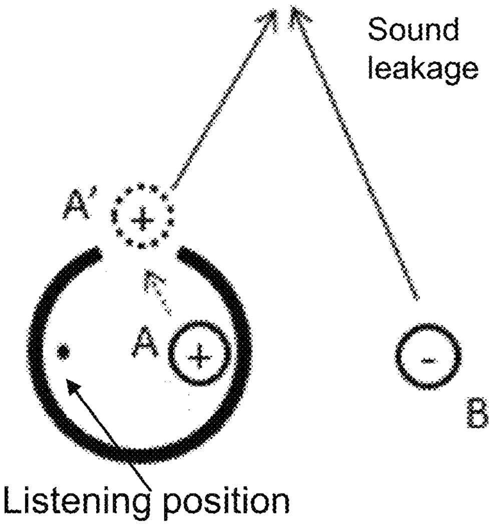
FIG. 10B is a schematic diagram illustrating a sound leakage principle of a dipole sound source structure and a cavity structure constructed around one sound source of the dipole sound source according to some embodiments of the present disclosure.

FIG. 10A is a schematic diagram illustrating a listening principle of a dipole sound source structure and a cavity structure constructed around one sound source of the dipole sound source according to some embodiments of the present disclosure. FIG. 10B is a schematic diagram illustrating a sound leakage principle of a dipole sound source structure and a cavity structure constructed around one sound source of the dipole sound source according to some embodiments of the present disclosure.

For the near-field listening sound, as a dipole with a cavity structure is constructed around one of the sound sources shown in FIG. 10A, and since one sound source A of the sound sources is wrapped by the cavity structure, most of the sound radiated from the sound source A may reach the listening position by a direct emission or reflection manner. In contrast, in the absence of the cavity structure, most of the sound radiated from the sound source does not reach the listening position. Therefore, the cavity structure makes it possible to significantly increase the volume of sound reaching the listening position. At the same time, only a small portion of an inversion sound radiated from an inversion source B outside the cavity structure enters the cavity structure through a leaking structure of the cavity structure. This is equivalent to the creation of a secondary sound source B' at the leaking structure, whose intensity is significantly smaller than that of the sound source B and also significantly smaller than that of the sound source A. The sound generated by the secondary sound source B' has a weak inversion cancellation effect on the sound source A in the cavity, so that the listening volume at the listening position is significantly increased.

For the sound leakage, as shown in FIG. 10B, the sound source A radiates a sound to the outside through the leaking structure of the cavity is equivalent to generating a secondary sound source A' at the leaking structure. Since almost all the sound radiated by the sound source A is output from the leaking structure, and a structural scale of the cavity is much smaller than a spatial scale for evaluating the sound leakage (the difference is at least one order of magnitude), therefore the intensity of the secondary sound source A' can be considered as comparable to that of the sound source A. For the external space, the cancellation effect between sounds produced by the secondary sound source A' and the sound source B is comparable to the cancellation effect between sounds produced by the sound source A and the sound source B. That is, the cavity structure still maintains a comparable sound leakage reduction effect.

In specific application scenarios, an outer wall surface of the housing of the sound production component 11 is usually a plane or curved surface, while a contour of the user's cavum concha 102 is a concave-convex structure. By extending the sound production component 11 partially or integrally into the cavum concha, a cavity structure communicated with the outside world is formed between the sound production component 11 and the contour of the cavum concha. Further, an acoustic model shown in FIG. 9 may be constructed by setting the sound outlet at a position where the housing of the sound production component 11 faces the user's ear canal opening and close to an edge of the cavum concha 102, and setting a pressure relief hole at a position where the sound production component 11 is backwardly or distantly away from the ear canal opening, so as to increase the listening volume of the user at the ear canal opening when wearing the open earphone 10, and to reduce the far-field sound leakage effect.

It should be understood that the above leaking structure with one opening is only an example, and the leaking structure of the cavity structure may contain one or more openings, which may also achieve a superior listening index, wherein the listening index may refer to the reciprocal of the leakage index $\alpha$ by $1/\alpha$. Taking the structure with two openings as an example, the cases of equal opening and equal opening ratio are analyzed separately below. Taking the structure with only one opening as a comparison, the "equal opening" here means setting two openings each with the same dimension as the opening in the structure with only one opening, and the "equal opening ratio" means setting two openings, a total area of which is the same area as that of the structure with only one opening. The equal opening is equivalent to doubling the opening dimension corresponding to the structure with only one opening (i.e., a ratio of an opening area S of the leaking structure on the cavity structure to an area S0 of the cavity structure subject to a direct action of the contained sound source), and the overall listening index is reduced as described before. In the case of the equal opening ratio, even though S/S0 is the same as that of the structure with only one opening, the distances from the two openings to the external sound source are different, thus resulting in different listening indexes.

Figure 11A:
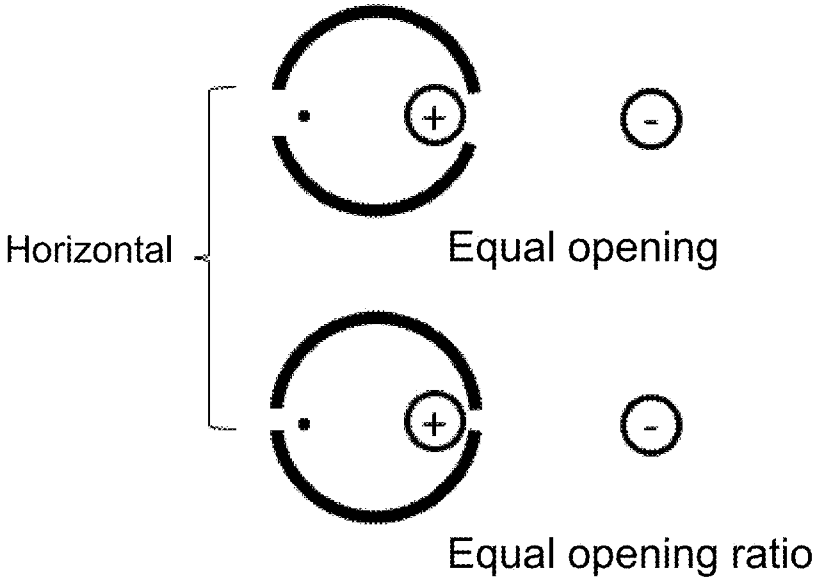
FIG. 11A is a schematic diagram illustrating a cavity structure with two horizontal openings according to some embodiments of the present disclosure.
Figure 11B:
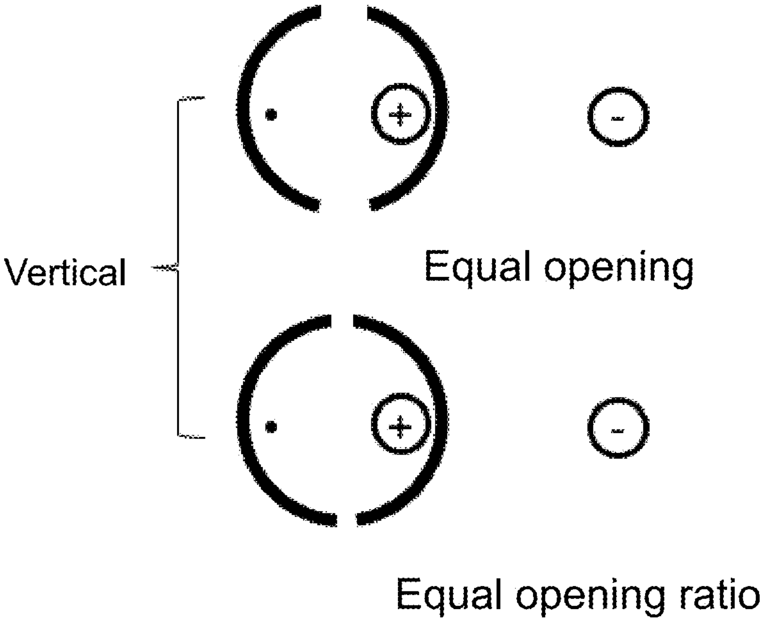
FIG. 11B is a schematic diagram illustrating a cavity structure with two vertical openings according to some embodiments of the present disclosure.

FIG. 11A is a schematic diagram illustrating a cavity structure with two horizontal openings according to some embodiments of the present disclosure. FIG. 11B is a schematic diagram illustrating a cavity structure with two vertical openings according to some embodiments of the present disclosure. As shown in FIG. 11A, when the two openings are parallel to a connection line of the two sound sources (i.e., two horizontal openings), the distances from the two openings to the external sound sources are the maximum and minimum, respectively; as shown in FIG. 11B, when the connection line is perpendicular (i.e., two vertical openings), the distances from the two openings to the external sound sources are equal and a middle value is obtained.

Figure 12:
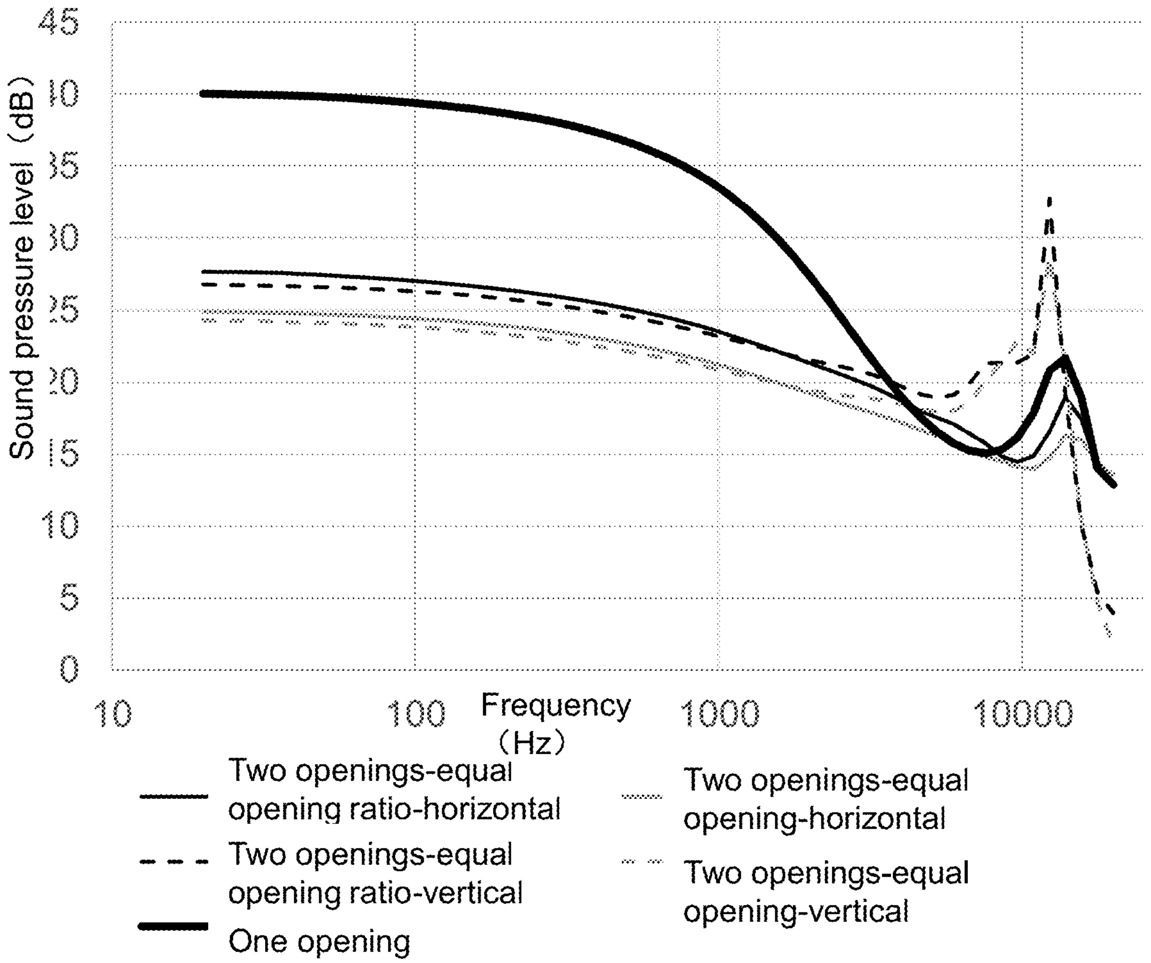
FIG. 12 is a listening index curve comparison diagram of a cavity structure with two openings and a cavity structure with one opening according to some embodiments of the present disclosure.

FIG. 12 is a listening index curve comparison diagram of a cavity structure with two openings and a cavity structure with one opening according to some embodiments of the present disclosure. As shown in FIG. 12, compared to the cavity structure with one opening, the overall listening index of the cavity structure with the equal opening decreases. For the cavity structure with the equal opening ratio, the distances from the two openings to the external sound source are different, thus also resulting in different listening indexes. Referring to FIG. 11A, FIG. 11B, and FIG. 12, it can be seen that regardless of whether the opening is horizontal or vertical, the listening index of the leaking structure with the equal opening ratio is higher than that of the leaking structure with the equal opening. This is because the relative opening dimension S/S0 of the leaking structure with the equal opening ratio is twice smaller compared to that of the leaking structure with the equal opening, so the listening index is larger. Referring to FIG. 11A, FIG. 11B, and FIG. 12, it can also be seen that regardless of the leaking structure with the equal opening or the leaking structure with the equal opening ratio, the listening index of the leaking structure with horizontal openings is larger. This is because a distance from one of the openings in the leaking structure with horizontal openings to an external sound source is smaller than a distance between the two sound sources, so that the formed secondary sound source and the external sound source are closer to each other than the original two sound sources, and therefore the listening index is higher, thereby improving the sound leakage reduction effect. Therefore, in order to improve the sound leakage reduction effect, it is possible to make a distance from at least one of the openings to the external sound source smaller than the distance between the two sound sources.

In addition, as shown in FIG. 12, the cavity structure with two openings can better increase the resonance frequency of the air sound within the cavity structure compared to the cavity structure with one opening, resulting in a better listening index for the entire device in a high frequency band (e.g., sounds with frequencies near 10,000 Hz) compared to a cavity structure with only one opening. The high frequency band is a more sensitive frequency band for the human ear and therefore has a greater need for sound leakage reduction. Therefore, in order to improve the sound leakage reduction effect in the high frequency band, a cavity structure with more than one opening may be chosen.

Figure 13:
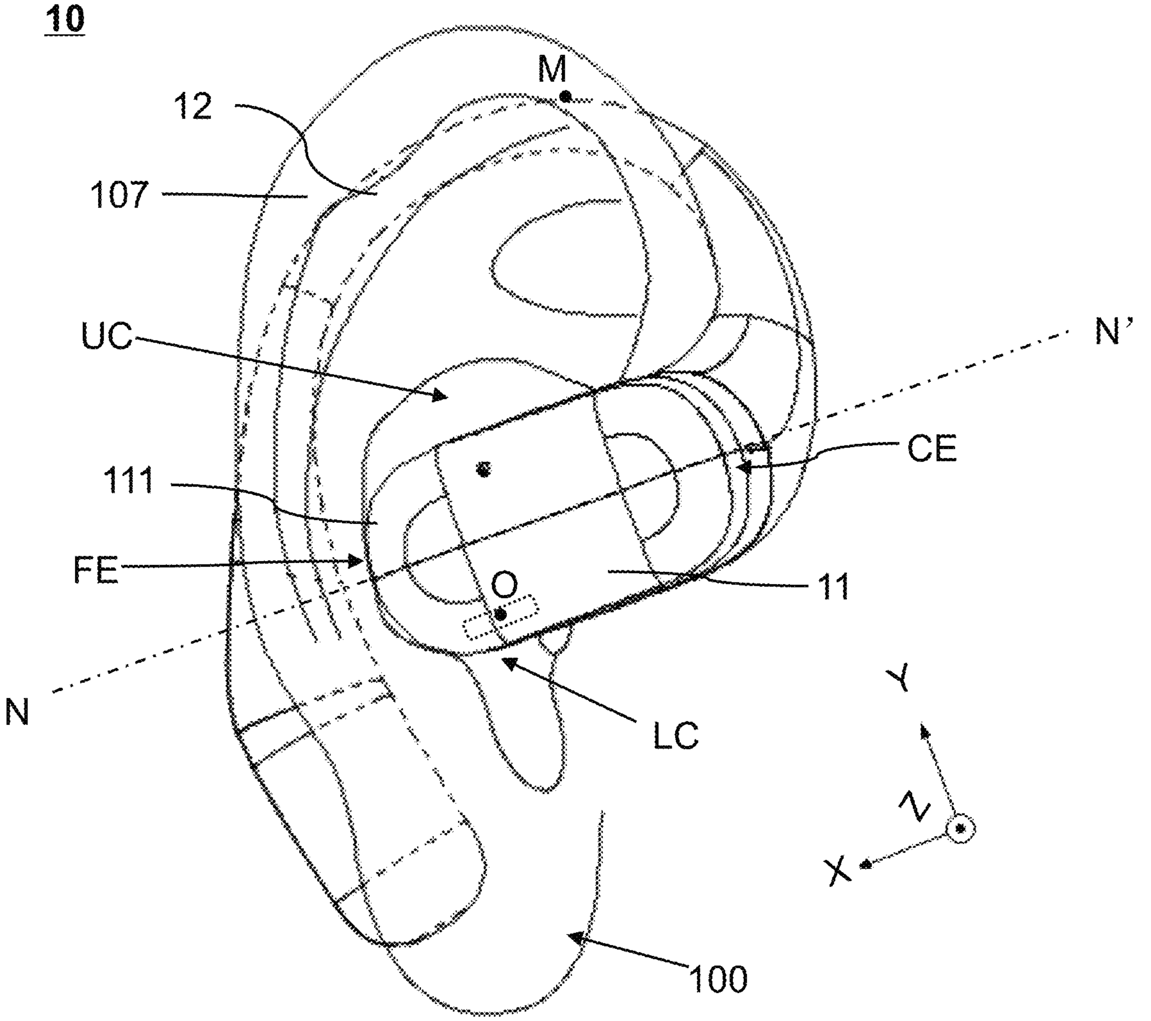
FIG. 13 is a schematic diagram illustrating an exemplary wearing state of an open earphone according to some embodiments of the present disclosure.
Figure 14:
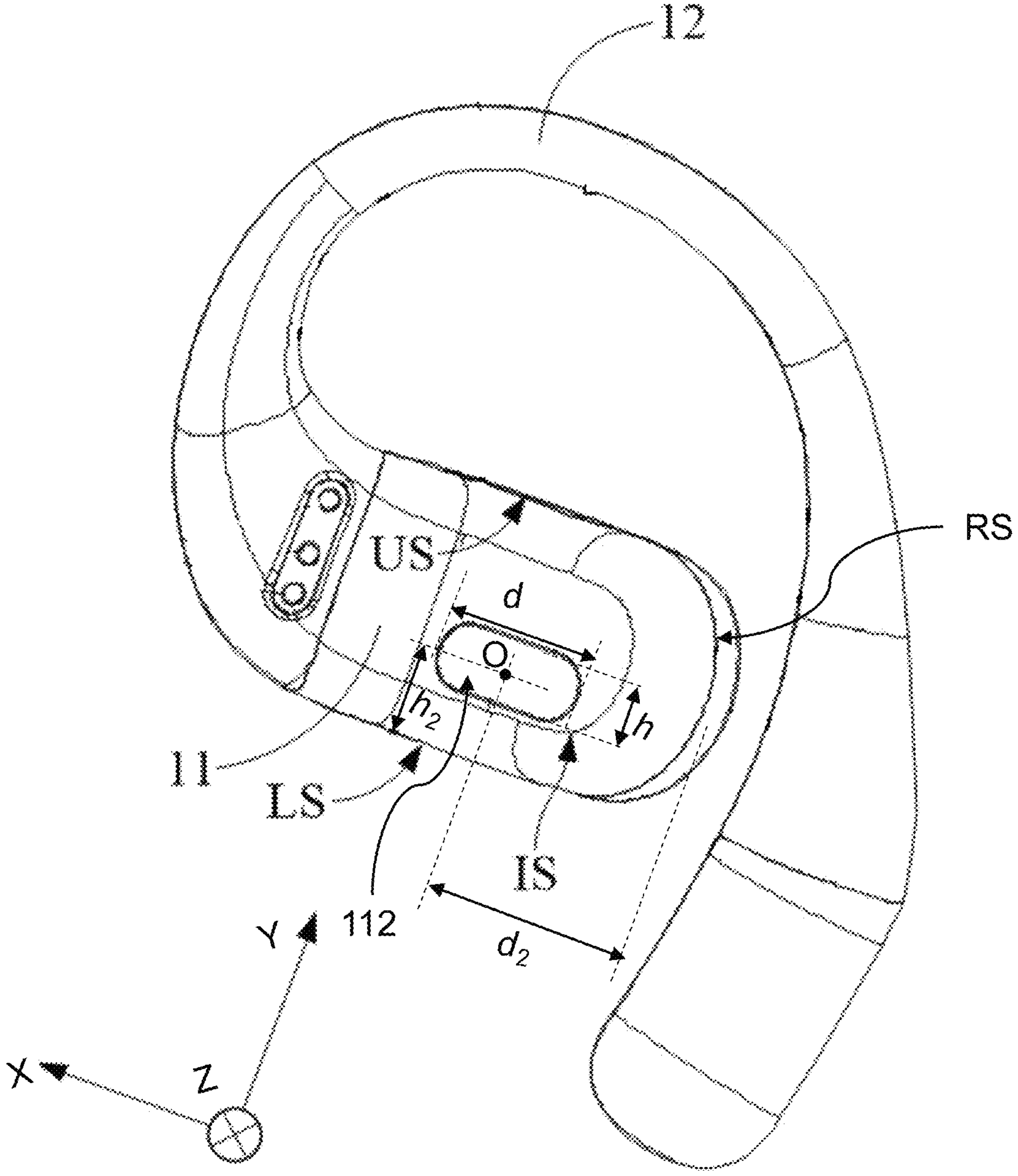
FIG. 14 is a schematic diagram illustrating a structure of a side of the open earphone shown in FIG. 13 facing the ear.

FIG. 13 is a schematic diagram illustrating an exemplary wearing state of an open earphone according to some embodiments of the present disclosure. FIG. 14 is a schematic diagram illustrating a structure of a side of the open earphone shown in FIG. 13 facing the ear.

The open earphone 10 shown in FIG. 13 has a similar structure to the open earphone 10 shown in FIG. 7, and its main difference is that the sound production component 11 is inclined, and the housing 111 of the sound production component 11 is at least partially inserted into the cavum concha 102, for example, the free end FE of the sound production component 11 may extend into the cavum concha 102. The ear hook 12 and the sound production component 11 of such a structure are better adapted to the ear 100 of the user, and can increase the resistance of the open earphone 10 to fall off from the ear 100, thus increasing the wearing stability of the open earphone 10.

In some embodiments, in the wearing state, when viewed along the thickness direction Z, the connection end CE of the sound production component 11 is closer to the top of the head compared to the free end FE, so as to facilitate the free end FE to extend into the inferior concha. Based on this, an angle between the long-axis direction X and a direction where the sagittal axis of the human body is located may be between 15° and 60°. If the aforementioned angle is too small, it is easy to cause the free end FE to be unable to extend into the inferior concha, and make the sound outlet 112 on the sound production component 11 too far away from the ear canal; if the aforementioned angle is too large, it is also easy to cause the sound production component 11 to fail to extend into the inferior concha, and make the ear canal be blocked by the sound production component 11. In other words, such setting not only allows the sound production component 11 to extend into the inferior concha, but also allows the sound outlet 112 on the sound production component 11 to have a suitable distance from the ear canal, so that the user can hear more sounds produced by the sound production component 11 under the condition that the ear canal is not blocked.

In some embodiments, the sound production component 11 and the ear hook 12 may jointly clamp the aforementioned ear region from both front and rear sides of the ear region corresponding to the inferior concha, thereby increasing the resistance of the open earphone 10 to dropping from the ear and improving the stability of the open earphone 10 in the wearing state. For example, the free end FE of the sound production component 11 is pressed and held in the cavum concha in the thickness direction Z. As another example, the free end FE is pressed against the cavum concha in the long-axis direction X and in the short-axis direction Y (e.g., abut against an inner wall of the cavum concha corresponding to the free end FE).

In some embodiments, since the ear hook itself is elastic, a distance between the sound production component and the ear hook may change between the wearing state and the non-wearing state (a distance in the non-wearing state is less than a distance in the wearing state). In addition, due to the physiological structure of the ear 100, in the wearing state, a plane where the sound production component 11 is located may have a certain distance along the coronal axis direction from a plane where the ear hook 12 is located, so that the sound production component 11 can exert a proper pressure on the ear 100. In some embodiments, in order to improve the wearing comfort of the open earphone 10, and to make the sound production component 11 cooperate with the ear hook 12 to press and hold the sound production component 11 on the ear, in the non-wearing state, a distance from the center O of the sound outlet 112 to the plane where the ear hook 12 is located is between 3 mm and 6 mm. Since the ear hook 12 has a non-regular shape, for example, the ear hook 12 may be a curved structure, the plane where the ear hook 12 is located (also referred to as an ear hook plane) may be considered to be that: in the non-wearing state, when the ear hook is placed flat on a plane, the plane is tangent to at least three points on the ear hook that constitute the ear hook plane. In some embodiments, in the wearing state, the ear hook may be approximated as fitting to the head, in this case, the deflection of the ear hook plane with respect to the sagittal plane may be negligible. In some embodiments, in the non-wearing state, the distance from the center O of the sound outlet 112 to the plane where the ear hook 12 is located is between 3.5 mm and 5.5 mm. In some embodiments, in the non-wearing state, the distance from the center O of the sound outlet 112 to the plane where the ear hook 12 is located is between 4.0 mm and 5.0 mm. In some embodiments, in the non-wearing state, the distance from the center O of the sound outlet 112 to the plane where the ear hook 12 is located is between 4.3 mm and 4.7 mm.

As shown in FIG. 13, when the user wears the open earphone 10, by setting the housing 111 of the sound production component 11 to be at least partially inserted into the cavum concha 103, a cavity enclosed by the inner side surface IS of the sound production component 11 and the cavum concha 103 together may be regarded as the cavity structure 41 as shown in FIG. 9. A gap formed between the inner side surface IS and the cavum concha (e.g., a first leaking structure UC formed between the inner side surface IS and the cavum concha close to the top of the head, and a second leaking structure LC formed between the inner side surface IS and the ear close to the ear canal) may be regarded as the leaking structure 42 as shown in FIG. 9. The sound outlet 112 provided on the inner side surface IS may be regarded as a point sound source inside the cavity structure 41 as shown in FIG. 9, and the pressure relief hole 113 provided on another side surface of the sound production component 11 (e.g., a side away from or back from the user's ear canal) may be regarded as a point sound source outside the cavity structure 41 as shown in FIG. 9. Thus, according to the relevant depictions of FIG. 9-FIG. 12, when the open earphone 10 is worn in a manner in which it is at least partially inserted into the inferior concha, i.e., when it is worn in the manner shown in FIG. 13, in terms of the listening effect, most of the sound radiated from the sound outlet 112 may reach the ear canal by the direct emission or reflection manner, which may result in a significant increase in the volume of the sound reaching the ear canal, especially the listening volume of the low and middle frequencies. At the same time, only a relatively small portion of the inversion sound radiated from the pressure relief hole 113 may enter the cavum concha through the slit (the first leaking structure UC and the second leaking structure LC), which has a weak inversion cancellation effect with the sound outlet 112, thereby making the listening volume of the ear canal significantly improved. In terms of the sound leakage effect, the sound outlet 112 may output sound to the outside world through the slit and the sound may cancel out the sound generated by the pressure relief hole 113 in the far-field, thus ensuring the sound leakage reduction effect.

In some embodiments, referring to FIG. 13 and FIG. 14, in order to enable the projection of the sound outlet 112 on the sagittal plane when the open earphone 10 is worn to be partially or fully located within the cavum concha region, while enhancing the sound intensity of the sound outlet 112 in the ear canal (i.e., the listening position), the sound outlet 112 may be set as close to the ear canal as possible. In some embodiments, a distance h2 from the center O of the sound outlet 112 along the Y-direction to the lower side surface LS of the sound production component 11 is in a range of 4.05 mm to 6.05 mm. In some embodiments, the distance h2 from the center O of the sound outlet 112 along the Y-direction to the lower side surface LS of the sound production component 11 is in a range of 4.50 mm to 5.85 mm. In some embodiments, the distance h2 from the center O of the sound outlet 112 along the Y-direction to the lower side surface LS of the sound production component 11 is in a range of 4.80 mm to 5.50 mm. In some embodiments, the distance h2 from the center O of the sound outlet 112 along the Y-direction to the lower side surface LS of the sound production component 11 is in a range of 5.20 mm to 5.55 mm.

In some embodiments, in order to cause the sound production component 11 to be at least partially inserted into the inferior concha, the long-axis dimension of the sound production component 11 cannot be too long. Under the premise of ensuring that the sound production component 11 is at least partially inserted into the inferior concha, a distance from the center O of the sound outlet 112 along the X-direction to the rear side surface RS of the sound production component 11 cannot be too small, otherwise, all or part of the area of the sound outlet may be blocked due to the abutment of the free end FE against a wall surface of the inferior concha, thereby reducing the effective area of the sound outlet. Thus, in some embodiments, a distance d2 from the center O of the sound outlet 112 along the X-direction to the rear side surface RS of the sound production component 11 is in a range of 8.15 mm to 12.25 mm. In some embodiments, the distance d2 from the center O of the sound outlet 112 along the X-direction to the rear side surface RS of the sound production component 11 is in a range of 8.50 mm to 12.00 mm. In some embodiments, the distance d2 from the center O of the sound outlet 112 along the X-direction to the rear side surface RS of the sound production component 11 is in a range of 8.85 mm to 11.65 mm. In some embodiments, the distance d2 from the center O of the sound outlet 112 along the X-direction to the rear side surface RS of the sound production component 11 is in a range of 9.25 mm to 11.15 mm. In some embodiments, the distance d2 from the center O of the sound outlet 112 along the X-direction to the rear side surface RS of the sound production component 11 is in a range of 9.60 mm to 10.80 mm.

Referring to FIG. 13, in some embodiments, under the premise of ensuring that the sound production component 11 is at least partially inserted into the inferior concha, in order to ensure that the projection of the sound outlet 112 on the sagittal plane can be partially or fully located in the cavum concha region, when the user wears the open earphone 10, the distance between the center O of the sound outlet 112 and the upper vertex M of the ear hook 12 is in a range of 22.5 mm to 34.5 mm. In some embodiments, when the user wears the open earphone 10, the distance between the center O of the sound outlet 112 and the upper vertex M of the ear hook 12 is in a range of 25 mm to 32 mm. In some embodiments, when the user wears the open earphone 10, the distance between the center O of the sound outlet 112 and the upper vertex M of the ear hook 12 is in a range of 27.5 mm to 29.5 mm. In some embodiments, when the user wears the open earphone 10, the distance between the center O of the sound outlet 112 and the upper vertex M of the ear hook 12 is in a range of 28 mm to 29 mm. In some embodiments, when the user wears the open earphone 10, the distance between the projection point of the center of the sound outlet 112 on the sagittal plane and the projection of the upper vertex of the ear hook 12 on the sagittal plane is in a range of 18 mm to 30 mm. In some embodiments, when the user wears the open earphone 10, the distance between the projection point of the center of the sound outlet 112 on the sagittal plane and the projection of the upper vertex of the ear hook 12 on the sagittal plane is in a range of 20 mm to 25 mm. It should be noted that in the present disclosure, in the wearing state, a distance between the center O of the sound outlet 112 and a particular point (e.g., the upper vertex M of the ear hook) may be determined by the following exemplary manner. A plurality of components (e.g., the sound production component 11, the first portion 121 of the ear hook, and the second portion 122 of the ear hook) of the open earphone 10 in the wearing state may be secured to a stabilizing member by employing a fixing member or glue. Then the human head model and an ear structure are removed, at which point the open earphone 10 stabilized on the stabilizing member is shown with the side facing the ear and in the same posture as the posture in the wearing state. At this point, the distance from the center O of the sound outlet 112 to the particular point (e.g., the upper vertex M on the ear hook) may be directly measured.

In some embodiments, a ratio of the distance between the center O of the sound outlet 112 and the upper vertex M of the ear hook 12 to the distance between the upper and lower boundaries of the inner side surface IS (i.e., the distance between the upper side surface US and the lower side surface LS of the sound production component 11 or housing 111) cannot be too large or too small. In the case where the distance between the center O of the sound outlet 112 and the upper vertex M of the ear hook 12 is a constant, if the above ratio is too small, a width dimension of the inner side surface IS may be too large, which may result in a larger overall weight of the sound production component and a small distance between the housing and the ear hook, thereby causing uncomfortable for the user to wear. If the above ratio is too large, the width dimension of the inner side surface IS may be too small, which may result in a small area for the transducer of the sound production component 11 to push the air, thereby causing the low sound production efficiency of the sound production component. Therefore, in order to ensure that the sound production efficiency of the sound production component is sufficiently high and to improve the user's wearing comfort, and cause the projection of the sound outlet 112 on the sagittal plane can be located at least partially within the cymba concha region, and cause the sound outlet 112 as close as possible to the ear canal, when the user wears the open earphone 10, the ratio of the distance between the center O of the sound outlet 112 and the upper vertex M of the ear hook 12 to the width dimension of the housing 111 along the Y-direction is between 1.2 and 2.2. In some embodiments, when the user wears the open earphone 10, the ratio of the distance between the center O of the sound outlet 112 and the upper vertex M of the ear hook 12 to the width dimension of the housing 111 is between 1.4 and 2.0. In some embodiments, with the assurance that the sound production component is at least partially inserted into the cavum concha, in order to keep the sound outlet 112 close to the ear canal and to make the sound production component 11 a smaller overall size for easy portability, when the user wears the open earphone 10, the ratio of the distance between the center P of the sound outlet 112 and the upper vertex M of the ear hook 12 to the width dimension of the housing 111 is between 1.5 and 1.8. In some embodiments, when the user wears the open earphone 10, the ratio of the distance between the center O of the sound outlet 112 and the upper vertex M of the ear hook 12 to the width dimension of the housing 111 is between 1.6 and 1.7. In some embodiments, a positional relationship between the center O of the sound outlet 112 and the upper vertex M of the ear hook may also be characterized by a distance from a projection point O' of the center O of the sound outlet 112 on the sagittal plane to a projection point of the upper vertex M of the ear hook on the sagittal plane. For example, in some embodiments, a ratio of a distance between the projection point O' of the center O of the sound outlet 112 on the sagittal plane and the projection point of the upper vertex M of the ear hook on the sagittal plane to a short-axis dimension of the projection of the sound production component 11 on the sagittal plane is in a range of 1.7-2.6. In some embodiments, the ratio of the distance between the projection point O' of the center O of the sound outlet 112 on the sagittal plane and the projection point of the upper vertex M of the ear hook on the sagittal plane to the short-axis dimension of the projection of the sound production component 11 on the sagittal plane is in a range of 1.9-2.5.

In the wearing manner shown in FIG. 13, since the sound outlet 112 is located at a position on the inner side surface IS that is relatively close to the ear canal, a ratio of the distance between the center O of the sound outlet 112 and the upper vertex M of the ear hook 12 to the distance between the center O of the sound outlet 112 and the upper side surface US of the sound production component 11 cannot be too large. In addition, in order to ensure that there is sufficient distance between the sound production component 11 and the upper vertex M of the ear hook 12 to enable the sound production component 11 to extend into the inferior concha, the ratio of the distance between the center O of the sound outlet 112 and the upper vertex M of the ear hook 12 to the distance between the center O of the sound outlet 112 and the upper side surface US of the sound production component 11 cannot be too small. In some embodiments, when the user wears the open earphone 10, the ratio of the distance between the center O of the sound outlet 112 and the upper vertex M of the ear hook 12 to the distance between the center O of the sound outlet 112 and the upper side surface US of the sound production component 11 is in a range of 1.94 to 2.93. Preferably, in the case of ensuring that the sound production component is at least partially inserted into the cavum concha, in order to keep the sound outlet 112 close to the ear canal and to make the sound production component 11 a smaller overall size for easy portability, when the user wears the open earphone 10, the ratio of the distance between the center O of the sound outlet 112 and the upper vertex M of the ear hook 12 to the distance from the center O of the sound outlet 112 to the upper side surface US of the sound production component 11 is in a range of 2.2-2.6. In some embodiments, a ratio of the distance between the projection point O' of the center O of the sound outlet 112 on the sagittal plane and the projection point of the upper vertex M of the ear hook on the sagittal plane to a distance from the projection point O' of the center O of the sound outlet 112 on the sagittal plane to the projection of the upper side surface US of the sound production component 11 on the sagittal plane is in a range of 2.8-4.3. In some embodiments, the ratio of the distance between the projection point O' of the center O of the sound outlet 112 on the sagittal plane and the projection point of the upper vertex M of the ear hook on the sagittal plane to the distance from the projection point O' of the center O of the sound outlet 112 on the sagittal plane to the projection of the upper side surface US of the sound production component 11 on the sagittal plane is in a range of 3.2-3.8.

In the wearing manner shown in FIG. 13, since the sound outlet 112 is located at a position on the inner side surface IS that is relatively close to the ear canal, the ratio of the distance between the center O of the sound outlet 112 and the upper vertex M of the ear hook 12 to the distance between the center O of the sound outlet 112 and the lower side surface IS of the sound production component 11 cannot be too small. In addition, in order to ensure that the sound outlet has a sufficient area (to prevent excessive acoustic impedance caused by the too small area of the sound outlet), the width of the sound outlet 112 cannot be too small, and the ratio of the distance between the center O of the sound outlet 112 and the upper vertex M of the ear hook 12 to the distance between the center O of the sound outlet 112 and the lower side surface IS of the sound production component 11 cannot be too large. In some embodiments, when the user wears the open earphone 10, the ratio of the distance between the center O of the sound outlet 112 and the upper vertex M of the ear hook 12 to the distance between the center O of the sound outlet 112 and the lower side surface IS of the sound production component 11 is in a range of 4.50 to 6.76.

Figure 15:
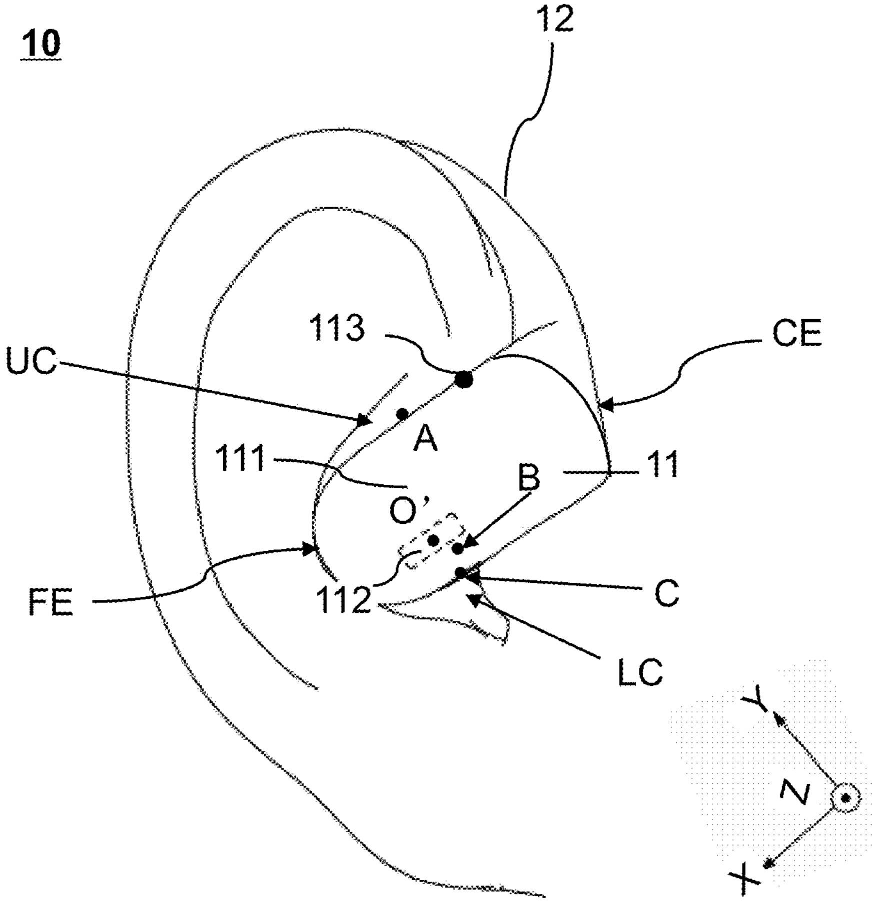
FIG. 15 is a schematic diagram illustrating a projection of an open earphone on a sagittal plane when the open earphone is in a wearing state according to some embodiments of the present disclosure.

FIG. 15 is a schematic diagram illustrating a projection of an open earphone on a sagittal plane when the open earphone is in a wearing state according to some embodiments of the present disclosure.

In some embodiments, referring to FIG. 13 and FIG. 15, in order to make the sound production component 11 stably worn on the user's ear, and to facilitate the construction of the cavity structure as shown in FIG. 9, and to make the cavity structure have at least two leaking structures, the free end FE may be pressed against the cavum concha in the long-axis direction X and the short-axis direction Y. At this time, the inner side surface IS of the sound production component 11 is inclined with respect to the sagittal plane, and at this time at least a first leaking structure UC close to the top of the head (i.e., a gap between the cavum concha and the upper boundary of the inner side surface IS) and a second leaking structure LC close to the ear canal (i.e., a gap between the cavum concha and the lower boundary of the inner side surface IS) exist between the inner side surface IS of the sound production component and the inferior concha. As a result, the listening volume, especially in the low and middle frequencies, can be increased, while still retaining the far-field sound leakage cancellation effect, thus enhancing the acoustic output performance of the open earphone 10.

In some embodiments, when the open earphone 10 is worn in the manner shown in FIG. 13, the first leaking structure UC and the second leaking structure LC formed between the inner side surface IS of the sound production component and the cavum concha have a certain scale in the long-axis direction X and in the thickness direction Z. In some embodiments, in order to facilitate understanding of the position of the first leaking structure UC and the second leaking structure LC, when the open earphone 10 is in the wearing state, a midpoint of two points formed by intersecting the upper/lower boundary of the inner side surface IS with the ear (e.g., a side wall of the inferior concha, a helix foot), respectively, may be taken as a position reference point of the first leaking structure UC/the second leaking structure LC, and a center of the ear canal opening of the ear canal may be taken as a position reference point of the ear canal. In some embodiments, in order to facilitate understanding of the position of the first leaking structure UC and the second leaking structure LC, when the open earphone 10 is in the wearing state, the midpoint of the upper boundary of the inner side surface IS may be taken as a position reference point of the first leaking structure UC, and a trisection point of the lower boundary of the inner side surface IS close to the free end FE (hereinafter referred to as a ⅓ point of the lower boundary of the inner side surface IS) as a position reference point of the second leaking structure LC. It should be noted that the midpoint of the upper boundary of the inner side surface IS of the sound production component 11 may be selected by the following exemplary manner. A projection profile of the sound production component 11 along the thickness direction Z may be determined; two first locating points on the sound production component 11 that have a largest perpendicular distance along the long-axis direction X from a short axis center plane of a magnetic circuit assembly (e.g., a magnetic circuit assembly 1125 described below) of a transducer and are closest to the upper side surface US may be determined; a projection profile of the sound production component 11 between the two first locating points may be determined to be a projection line of the upper boundary of the inner side surface IS; and a line segment of the sound production component 11 that is closest to the inner side surface IS and whose projection coincides with the projection line of the upper boundary of the inner side surface IS may be determined as the upper boundary of the inner side surface IS. In some alternative embodiments, when one or more side surfaces of the sound production component 11 (e.g., the inner side surface IS, the upper side surface US, and/or the lower side surface LS) are curved surfaces, an intersection line between a tangent plane of the inner side surface IS which is parallel to the Y-X plane (a plane formed by the short-axis direction Y and the long-axis direction X) and a tangent plane of the upper side surface US which is parallel to the Z-X plane (a plane formed by the thickness direction Z and the long-axis direction X) is the upper boundary of the inner side surface IS. A midpoint of the upper boundary of the inner side surface IS may be an intersection point between the upper boundary of the inner side surface IS and the short axis center plane of the magnetic circuit assembly. The short axis center plane of the magnetic circuit assembly refers to a plane parallel to the short-axis direction Y and the thickness direction Z of the sound production component 11 and passing through a center axis of the magnetic circuit assembly.

Similarly, the ⅓ point of the lower boundary of the inner side surface IS of the sound production component 11 may be selected by the following exemplary manner. The projection profile of the sound production component 11 along the thickness direction Z may be determined; two second locating points on the sound production component 11 that have a largest perpendicular distance along the long-axis direction X from the short axis center plane of the magnetic circuit assembly and are closest to the lower side surface LS may be determined; a projection profile of the sound production component 11 between the two second locating points may be determined as a projection line of the lower boundary of the inner side surface IS; a line segment on the sound production component 11 that is closest to the inner side surface IS and whose projection coincides with the projection line of the lower boundary of the inner side surface IS may be determined as the lower boundary of the inner side surface IS. In some alternative embodiments, when one or more of the side surfaces of the sound production component 11 (e.g., the inner side surface IS, the upper side surface US, and/or the lower side surface LS) are curved surfaces, an intersection line between a tangent plane of the inner side surface IS which is parallel to the Y-X plane (a plane formed by the short-axis direction Y and the long-axis direction X) and a tangent plane of the lower side surface LS which is parallel to the Z-X plane (the plane formed by the thickness direction Z and the long-axis direction X) is the lower boundary of the inner side surface IS. The ⅓ point of the lower boundary of the inner side surface IS may be an intersection point between the lower boundary of the inner side surface IS and a trisection plane of the magnetic circuit assembly proximate to the free end FE. The trisection plane of the magnetic circuit assembly proximate to the free end FE refers to a plane parallel to the short-axis direction Y and the thickness direction Z of the sound production component 11 and passing through the ⅓ point of a long axis of the magnetic circuit assembly which is proximate to the free end FE.

Merely by way of example, the present disclosure uses the midpoint of the upper boundary of the inner side surface IS and the ⅓ point of the lower boundary of the inner side surface IS as position reference points of the first leaking structure UC and the second leaking structure LC, respectively. It should be known that the selected midpoint of the upper boundary of the inner side surface IS and the ⅓ point of the lower boundary of the inner side surface IS are only used as exemplary reference points to describe the positions of the first leaking structure UC and the second leaking structure LC. In some embodiments, other reference points may also be selected to describe the positions of the first leaking structure UC and the second leaking structure LC. For example, due to the variability of different users' ears, the first leaking structure UC/the second leaking structure LC formed when the open earphone 10 is worn is a gap with a gradually changing width, in this case, the reference position of the first leaking structure UC/the second leaking structure LC may be a position on the upper boundary/the lower boundary of the inner side surface IS near a region with the largest gap width. For example, the ⅓ point of the upper boundary of the inner side surface IS near the free end FE may be used as the position of the first leaking structure UC, and the midpoint of the lower boundary of the inner side surface IS may be used as the position of the second leaking structure LC.

In some embodiments, as shown in FIG. 15, the projection of the upper boundary of the inner side surface IS on the sagittal plane may coincide with the projection of the upper side surface US on the sagittal plane, and the projection of the lower boundary of the inner side surface IS on the sagittal plane may coincide with the projection of the lower side surface LS on the sagittal plane. The projection of the position reference point of the first leaking structure UC (e.g., the midpoint of the upper boundary of the inner side surface IS) on the sagittal plane is point A. The projection of the position reference point of the second leaking structure LC (e.g., the ⅓ point of the lower boundary of the inner side surface IS) on the sagittal plane is point C. It should be noted that, in the present disclosure, relative position relationships among the center O of the sound outlet 112, the upper vertex M of the ear hook, the reference position point of the first leaking structure UC (e.g., the midpoint of the upper boundary of the inner side surface IS), the reference position point of the second leaking structure LC (e.g., the ⅓ point of the lower boundary of the inner side surface IS), the center of the ear canal opening, or the like, may also be characterized by position relationships among a projection point of the center O of the sound outlet 112, a projection point of the upper vertex M of the ear hook, a projection point of the reference position point of the first leaking structure UC (e.g., the midpoint of the upper boundary of the inner side surface IS), a projection point of the reference position point of the second leaking structure LC (e.g., the ⅓ point of the lower boundary of the inner side surface IS), etc., on the sagittal plane, and a centroid of a projection of the ear canal opening on the sagittal plane.

As shown in FIG. 15, in some embodiments, in the wearing state, the projection of the sound production component 11 of the open earphone 10 on the sagittal plane may at least partially cover the ear canal of the user, but the ear canal can communicate with the outside world through the cavum concha to achieve the liberation of both ears of the user. In some embodiments, since the sound from the pressure relief hole 113 can be transmitted into the cavity structure through the leaking structure (e.g., the first leaking structure UC or the second leaking structure LC) and cancel each other out with the sound from the sound outlet 112, the pressure relief hole 113 cannot be too close to the leaking structure. Under the premise that the sound production component 11 is at least partially inserted in the inferior concha, a distance between the pressure relief hole 113 and the sound outlet 112 is limited by a dimension of the sound production component 11, thus, in order to make the open earphone 10 have a high listening index in the whole frequency range, the pressure relief hole 113 should be located as far away as possible from the sound outlet 112, for example, the pressure relief hole 113 is set on the upper side surface US of the sound production component 11. In this case, a ratio of a distance between a projection point O' of the center O of the sound outlet 112 on the sagittal plane and a projection point A of the midpoint of the upper boundary of the inner side surface IS on the sagittal plane to a distance between the projection point O' of the center O of the sound outlet 112 on the sagittal plane and a projection point of the center of the pressure relief hole 113 on the sagittal plane is in a range of 0.7 to 1.3.

When the relative positions of the sound outlet 112 and the pressure relief hole 113 remain constant (i.e., a distance between the sound outlet 112 and the pressure relief hole 113 remains constant), the larger the volume V of the cavity structure is, the smaller the overall (full frequency range) listening index of the open earphone 10 is. This is because of the influence of the air-acoustic resonance in the cavity structure, at the resonance frequency of the cavity structure, the air-acoustic resonance can occur within the cavity structure and radiate outward the sound that is much larger than the sound of the pressure relief hole 113, resulting in a great increase in the sound leakage, and further making the listening index significantly smaller near the resonance frequency.

The greater the distance between the projection point O' of the center O of the sound outlet 112 on the sagittal plane and the projection point A of the midpoint of the upper boundary of the inner side surface IS on the sagittal plane is, the greater the volume V of the cavity structure is. Thus, in some embodiments, under the premise that the sound production component 11 is at least partially inserted into the inferior concha, in order to enable the sound outlet 112 to be set close to the ear canal, and to make the cavity structure have a suitable volume V, so that the sound collection effect in the ear canal is relatively good, the distance between the projection point O' of the center O of the sound outlet 112 on the sagittal plane and the projection point A of the midpoint of the upper boundary of the inner side surface IS on the sagittal plane is in a range of 10.0 mm to 15.2 mm. In some embodiments, the distance between the projection point O' of the center O of the sound outlet 112 on the sagittal plane and the projection point A of the midpoint of the upper boundary of the inner side surface IS on the sagittal plane is in a range of 11.0 mm to 14.2 mm. In some embodiments, the distance between the projection point O' of the center O of the sound outlet 112 on the sagittal plane and the projection point A of the midpoint of the upper boundary of the inner side surface IS on the sagittal plane is in a range of 12.0 mm to 14.7 mm. In some embodiments, the distance between the projection point O' of the center O of the sound outlet 112 on the sagittal plane and the projection point A of the midpoint of the upper boundary of the inner side surface IS on the sagittal plane is in a range of 12.5 mm to 14.2 mm. In some embodiments, the distance between the projection point O' of the center O of the sound outlet 112 on the sagittal plane and the projection point A of the midpoint of the upper boundary of the inner side surface IS on the sagittal plane is in a range of 13.0 mm to 13.7 mm. It should be noted that in the present disclosure, in the wearing state, a distance from the projection point O' of the center O of the sound outlet 112 on the sagittal plane to a particular point (for example, a projection point A of the midpoint of the upper boundary of the inner side surface IS on the sagittal plane) may be determined by the following exemplary manner. A plurality of components (e.g., the sound production component 11, the first portion 121 of the ear hook, and the second portion 122 of the ear hook) of the open earphone 10 in the wearing state may be secured to a stabilizing member by employing a fixing member or glue. Then the human head model and an ear structure are removed, at which point the open earphone 10 stabilized on the stabilizing member is shown with the side facing the ear and in the same posture as the posture in the wearing state. At this point, a position of the projection point O' of the center O of the sound outlet 112 on the sagittal plane may be determined. Further, a distance from the projection point O' of the center O of the sound outlet 112 on the sagittal plane to the particular point may be determined.

In some embodiments, due to the presence of the tragus near the ear canal opening, the sound outlet 112 is easily obscured by the tragus. In this case, in order to keep the sound outlet 112 as close to the ear canal as possible and not be obscured, a distance from the projection point O' of the center O of the sound outlet 112 on the sagittal plane to a centroid B of the projection of the ear canal opening on the sagittal plane is a range of 2.2 mm to 3.8 mm. In some embodiments, the distance from the projection point O' of the center O of the sound outlet 112 on the sagittal plane to the centroid B of the projection of the ear canal opening on the sagittal plane is a range of 2.4 mm to 3.6 mm. In some embodiments, the distance from the projection point O' of the center O of the sound outlet 112 on the sagittal plane to the centroid B of the projection of the ear canal opening on the sagittal plane is a range of 2.6 mm to 3.4 mm. In some embodiments, the distance from the projection point O' of the center O of the sound outlet 112 on the sagittal plane to the centroid B of the projection of the ear canal opening on the sagittal plane is a range of 2.8 mm to 3.2 mm. It should be noted that the projection of the ear canal opening on the sagittal plane may be approximately considered as an ellipse in shape, and correspondingly, the centroid of the projection of the ear canal opening on the sagittal plane may be a geometric center of the ellipse.

In some embodiments, in order to ensure that the sound production component 11 extends into the cavum concha and that there is a suitable gap (forming a leaking structure of the cavity state) between the upper boundary of the inner side surface IS and the cavum concha, a distance from the projection point A of the midpoint of the upper boundary of the inner side surface IS on the sagittal plane to the centroid B of the projection of the ear canal opening on the sagittal plane ranges from 12 mm to 18 mm. In some embodiments, the distance from the projection point A of the midpoint of the upper boundary of the inner side surface IS on the sagittal plane to the centroid B of the projection of the ear canal opening on the sagittal plane ranges from 13 mm to 17 mm. In some embodiments, the distance from the projection point A of the midpoint of the upper boundary of the inner side surface IS on the sagittal plane to the centroid B of the projection of the ear canal opening on the sagittal plane ranges from 14 mm to 16 mm. In some embodiments, the distance from the projection point A of the midpoint of the upper boundary of the inner side surface IS on the sagittal plane to the centroid B of the projection of the ear canal opening on the sagittal plane ranges from 14.5 mm to 15.5 mm.

In some embodiments, in order to ensure that the sound production component 11 extends into the cavum concha and that there is a suitable gap (forming a leaking structure of the cavity state) between the lower boundary of the inner side surface IS and the cavum concha, a distance from a projection point C of the ⅓ point of the lower boundary of the inner side surface IS on the sagittal plane to the centroid B of the projection of the ear canal opening on the sagittal plane is in a range of 1.7 mm-2.7 mm. In some embodiments, the distance from the projection point C of the ⅓ point of the lower boundary of the inner side surface IS on the sagittal plane to the centroid B of the projection of the ear canal opening on the sagittal plane is in a range of 1.8 mm-2.6 mm. In some embodiments, the distance from the projection point C of the ⅓ point of the lower boundary of the inner side surface IS on the sagittal plane to the centroid B of the projection of the ear canal opening on the sagittal plane is in a range of 1.9 mm-2.5 mm. In some embodiments, the distance from the projection point C of the ⅓ point of the lower boundary of the inner side surface IS on the sagittal plane to the centroid B of the projection of the ear canal opening on the sagittal plane is in a range of 2.0 mm-2.4 mm. In some embodiments, the distance from the projection point C of the ⅓ point of the lower boundary of the inner side surface IS on the sagittal plane to the centroid B of the projection of the ear canal opening on the sagittal plane is in a range from 2.1 mm to 2.3 mm.

In some embodiments, the greater the distance between the projection point O' of the center O of the sound outlet 112 on the sagittal plane and the projection point C of the ⅓ point of the lower boundary of the inner side surface IS on the sagittal plane is, the larger the volume V of the cavity structure is. Therefore, under the premise that the sound production component 11 is at least partially inserted into the inferior concha, in order to enable the sound outlet 112 to be set close to the ear canal, and to make the cavity structure have a suitable volume V, so that the sound collection effect in the ear canal is relatively good, in some embodiments, the distance between the projection point O' of the center O of the sound outlet 112 on the sagittal plane and the projection point C of the ⅓ point of the lower boundary of the inner side surface IS on the sagittal plane is in a range of 3.5 mm to 5.6 mm. In some embodiments, the distance between the projection point O' of the center O of the sound outlet 112 on the sagittal plane and the projection point C of the ⅓ point of the lower boundary of the inner side surface IS on the sagittal plane is in a range of 3.9 mm to 5.2 mm. In some embodiments, the distance between the projection point O' of the center O of the sound outlet 112 on the sagittal plane and the projection point C of the ⅓ point of the lower boundary of the inner side surface IS on the sagittal plane is in a range of 4.3 mm to 4.8 mm. In some embodiments, the distance between the projection point O' of the center O of the sound outlet 112 on the sagittal plane and the projection point C of the ⅓ point of the lower boundary of the inner side surface IS on the sagittal plane is in a range of 4.5 mm to 4.6 mm.

Figure 16:
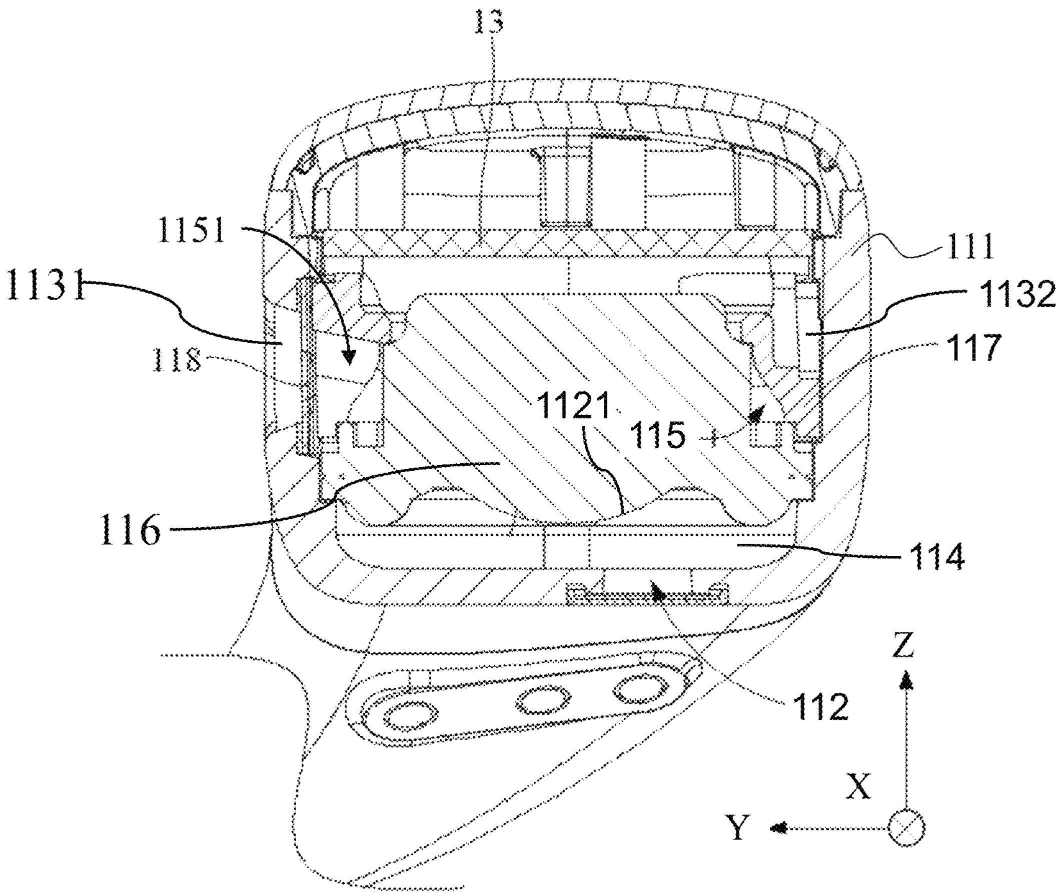
FIG. 16 is a structural diagram illustrating an exemplary internal structure of a sound production component according to some embodiments of the present disclosure.

FIG. 16 is a structural diagram illustrating an exemplary internal structure of a sound production component according to some embodiments of the present disclosure.

As shown in FIG. 16A, the sound production component 11 may include a master control circuit board 13 provided within the housing 111 and a battery (not shown) provided at one end of the ear hook 12 away from the sound production component 11. The battery and the transducer 116 are electrically connected to the master control circuit board 13, respectively, to allow the battery to power the transducer 116 under the control of the master control circuit board 13. Of course, both the battery and the transducer 116 may also be provided within the sound production component 11, and the battery may be closer to the connection end CE while the transducer 116 may be closer to the free end FE.

In some embodiments, the open earphone 10 may include an adjustment mechanism connecting the sound production component 11 and the ear hook 12. Different users are able to adjust the relative position of the sound production component 11 on the ear through the adjustment mechanism in the wearing state so that the sound production component 11 is located at a suitable position, thus making the sound production component 11 form a cavity structure with the inferior concha. In addition, due to the presence of the adjustment mechanism, the user is also able to adjust the earphone 10 to wear to a more stable and comfortable position.

Since the cavum concha has a certain volume and depth, after the free end FE is inserted into the inferior concha, there may be a certain distance between the inner side surface IS and the cavum concha of the sound production component 11. In other words, the sound production component 11 and the cavum concha may cooperate to form a cavity structure communicated with the external ear canal in the wearing state, and the sound outlet 112 may be at least partially located in the aforementioned cavity structure. In this way, in the wearing state, the sound waves transmitted by the sound outlet 112 are limited by the aforementioned cavity structure, i.e., the aforementioned cavity structure can gather sound waves, so that the sound waves can be better transmitted to the external ear canal, thus improving the volume and sound quality of the sound heard by the user in the near-field, which is beneficial to improve the acoustic effect of the earphone 10. Further, since the sound production component 11 may be set so as not to block the external ear canal in the wearing state, the aforementioned cavity structure may be in a semi-open setting. In this way, a portion of the sound waves transmitted by the sound outlet 112 may be transmitted to the ear canal thereby allowing the user to hear the sound, and another portion thereof may be transmitted with the sound reflected by the ear canal through a gap between the sound production component 11 and the ear (e.g., a portion of the cavum concha not covered by the sound production component 11) to the outside of the open earphone 10 and the ear, thereby creating a first leakage in the far-field. At the same time, the sound waves transmitted through the pressure relief hole 113 opened on the sound production component 11 generally forms a second leakage sound in the far-field. An intensity of the aforementioned first leakage sound is similar to an intensity of the aforementioned second leakage sound, and a phase of the aforementioned first leakage sound and a phase of the aforementioned second leakage sound are opposite (or substantially opposite) to each other, so that the aforementioned first leakage sound and the aforementioned second leakage sound can cancel each other out in the far-field, which is conducive to reducing the leakage of the open earphone 10 in the far-field.

In some embodiments, the sound production component 11 mainly includes a housing 111 connected to the ear hook 12 and a transducer 116 inside the housing 111, wherein the inner side surface IS of the housing 111 facing the ear in the wearing state is provided with the sound outlet 112, through which the sound waves generated by the transducer 116 are transmitted for transmission into the external ear canal 101. It should be noted that: the sound outlet 112 may also be provided on the lower side surface LS of the housing 111 and may also be provided at a corner between the aforementioned inner side surface IS and the lower side surface LS.

In some embodiments, the transducer 116 may include a diaphragm 1121. A front cavity 114 disposed on a front side of the diaphragm 1121 may be formed between the diaphragm 1121 and the housing 1111, and a rear cavity 115 disposed on a rear side of the diaphragm 1121 may be formed between the diaphragm 1121 and the housing 111. The housing 111 is provided with the sound outlet 112 acoustically coupled to the front cavity 114 and the pressure relief hole (e.g., the first pressure relief hole 1131 and the second pressure relief hole 1132) acoustically coupled to the rear cavity 115. A connecting bracket 117 may be provided within the housing 111. The connecting bracket 117 is provided with an acoustic channel 1151 for connecting the first pressure relief hole 1131 and the rear cavity 115, so as to facilitate a connection between the rear cavity 115 and the external environment, i.e., air is able to move freely in and out of the rear cavity 115, which is conducive to lowering a resistance of the diaphragm of the transducer 116 in the vibration process.

In some embodiments, the front cavity 114 is provided between the diaphragm 1121 of the transducer 116 and the housing 111. In order to ensure that the diaphragm has a sufficient vibration space, the front cavity 114 may have a large depth dimension (i.e., a distance dimension between the diaphragm of the transducer 116 and the housing 111 directly opposite to it). In some embodiments, as shown in FIG. 16, the sound outlet 112 is set on the inner side surface IS in the thickness direction Z. At this point, the depth of the front cavity 114 may refer to a dimension of the front cavity 114 in the Z-direction. However, too large the depth of the front cavity 114 may lead to an increase in the dimension of the sound production component 11 and affect the wearing comfort of the open earphone 10. In some embodiments, the depth of the front cavity 114 may be in a range of 0.55 mm-1.00 mm. In some embodiments, the depth of the front cavity 114 may be in a range of 0.66 mm-0.99 mm. In some embodiments, the depth of the front cavity 114 may be in a range of 0.76 mm-0.99 mm. In some embodiments, the depth of the front cavity 114 may be in a range of 0.96 mm-0.99 mm. In some embodiments, the depth of the front cavity 114 may be 0.97 mm.

In order to enhance the sound production effect of the open earphone 10, a resonance frequency of a structure similar to a Helmholtz resonator constituted by the front cavity 114 and the sound outlet 112 and/or a resonance frequency of a structure similar to a Helmholtz resonator constituted by the rear cavity 115 and the pressure relief hole 113 should be as high as possible, so that an overall frequency response curve of the sound production component has a wide flat region. In some embodiments, a resonance frequency $f_1$ of the front cavity 114 may be no less than 3 kHz. In some embodiments, the resonance frequency $f_1$ of the front cavity 114 may be no less than 4 kHz. In some embodiments, the resonance frequency $f_1$ of the front cavity 114 may be no less than 6 kHz. In some embodiments, the resonance frequency $f_1$ of the front cavity 114 may be no less than 7 kHz. In some embodiments, the resonance frequency $f_1$ of the front cavity 114 may be no less than 8 kHz. In some embodiments. in order to increase a range of the flat region in the frequency response curve and improve the sound quality of the sound production component 11, a resonance frequency f2 of the rear cavity 115 may be no less than 3.3 kHz. In some embodiments, in order to further improve the sound quality of the sound production component 11, the resonance frequency f2 of the rear cavity 115 may be no less than 3.5 kHz. In some embodiments, in order to further improve the sound quality of the sound production component 11, the resonance frequency f2 of the rear cavity 115 may be no less than 4 kHz. In some embodiments, in order to further improve the sound quality of the sound production component 11, the resonance frequency f2 of the rear cavity 115 may be not less than 6 kHz.

In some embodiments, the front cavity 114 and the sound outlet 112 may be approximately regarded as a Helmholtz resonator model. The front cavity 114 may be the cavity of the Helmholtz resonator model and the sound outlet 112 may be the neck of the Helmholtz resonator model. At this time, the resonance frequency of the Helmholtz resonator model is the resonance frequency f1 of the front cavity 114. Similarly, the rear cavity 115 and the pressure relief hole 113 (e.g., the first pressure relief hole 1131 and/or the second pressure relief hole 1132) may be approximately regarded as a Helmholtz resonator model, wherein the rear cavity 115 is a cavity of the Helmholtz resonator model, and the pressure relief hole 113 is a neck of the Helmholtz resonator model. At this time, a resonance frequency of the Helmholtz resonator model is the resonance frequency f2 of the rear cavity 115.

In the Helmholtz resonator model, a dimension of the neck (e.g., the sound outlet 112 or the pressure relief hole 113) may affect a resonance frequency f of the cavity, and the specific relationship is shown in equation (2):

$$f = \frac{c}{2\pi}\sqrt{\frac{S}{VL}}, \tag{2}$$

wherein c denotes the speed of sound, S denotes a cross-sectional area of the neck (e.g., the sound outlet 112 or the pressure relief hole 113), V denotes a volume of the cavity (e.g., the front cavity 114 or the rear cavity 115), and L denotes a depth of the neck (e.g., the sound outlet 112 or the rear cavity 115).

From equation (2), it can be seen that when the cross-sectional area S of the sound outlet 112 is increased and the depth L of the sound outlet 112 is reduced, the resonance frequency f1 of the front cavity 114 increases and moves toward high frequency. Similarly, when a cross-sectional area of the pressure relief hole 113 (e.g., the first pressure relief hole 1131 and/or the second pressure relief hole 1132), and a depth of the pressure relief hole 113 remain unchanged, a volume of the rear cavity 115 increases and the resonance frequency f2 of the rear cavity 115 decreases i.e., moves to a lower frequency.

In some embodiments, a total air volume of the sound outlet 112 forms a sound mass that can resonate with a system (e.g., the Helmholtz resonator) to produce a low-frequency output. Thus, a relatively small sound mass may affect the low-frequency output of the Helmholtz resonator model. In turn, the dimension of the sound outlet 112 also affects the sound mass Ma of the sound outlet 112, and the specific relationship is shown in equation (3):

$$M_a = \frac{\rho L}{S}, \quad (3)$$

where ρ denotes an air density, S denotes the cross-sectional area of the sound outlet 112, and L denotes the depth of the sound outlet 112.

From equation (3), it can be seen that when the cross-sectional area S of the sound outlet 112 is increased and the depth L is reduced, the sound mass Ma of the sound outlet 112 decreases.

Combining equation (2) and equation (3), it can be seen that the larger a value of a ratio S/L of the cross-sectional area S to the depth L of the sound outlet 112 is, the larger the resonance frequency f1 of the front cavity 114 is, and the smaller the sound mass Ma of the sound outlet 112 is. Therefore, the ratio S/L of the cross-sectional area S to the depth L of the sound outlet 112 needs to be in a suitable range, specific descriptions can be seen, for example, in FIG. 27A, FIG. 27B, and FIG. 28B.

Figure 17A:
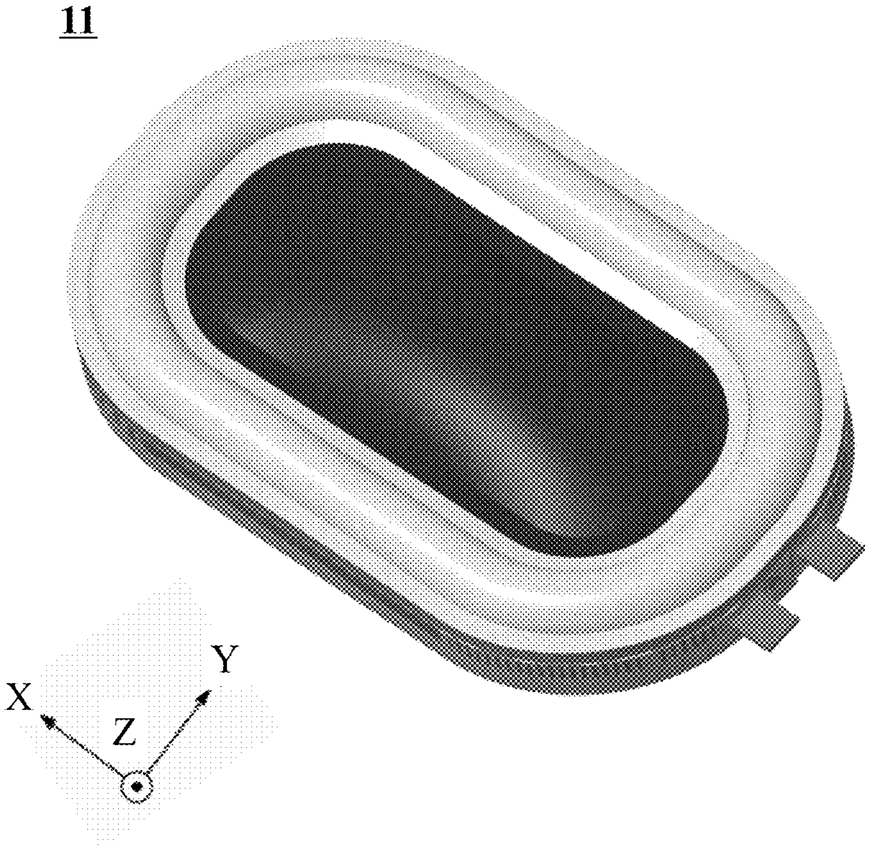
FIG. 17A is a diagram illustrating an exemplary view of a transducer according to some embodiments of the present disclosure.
Figure 17B:
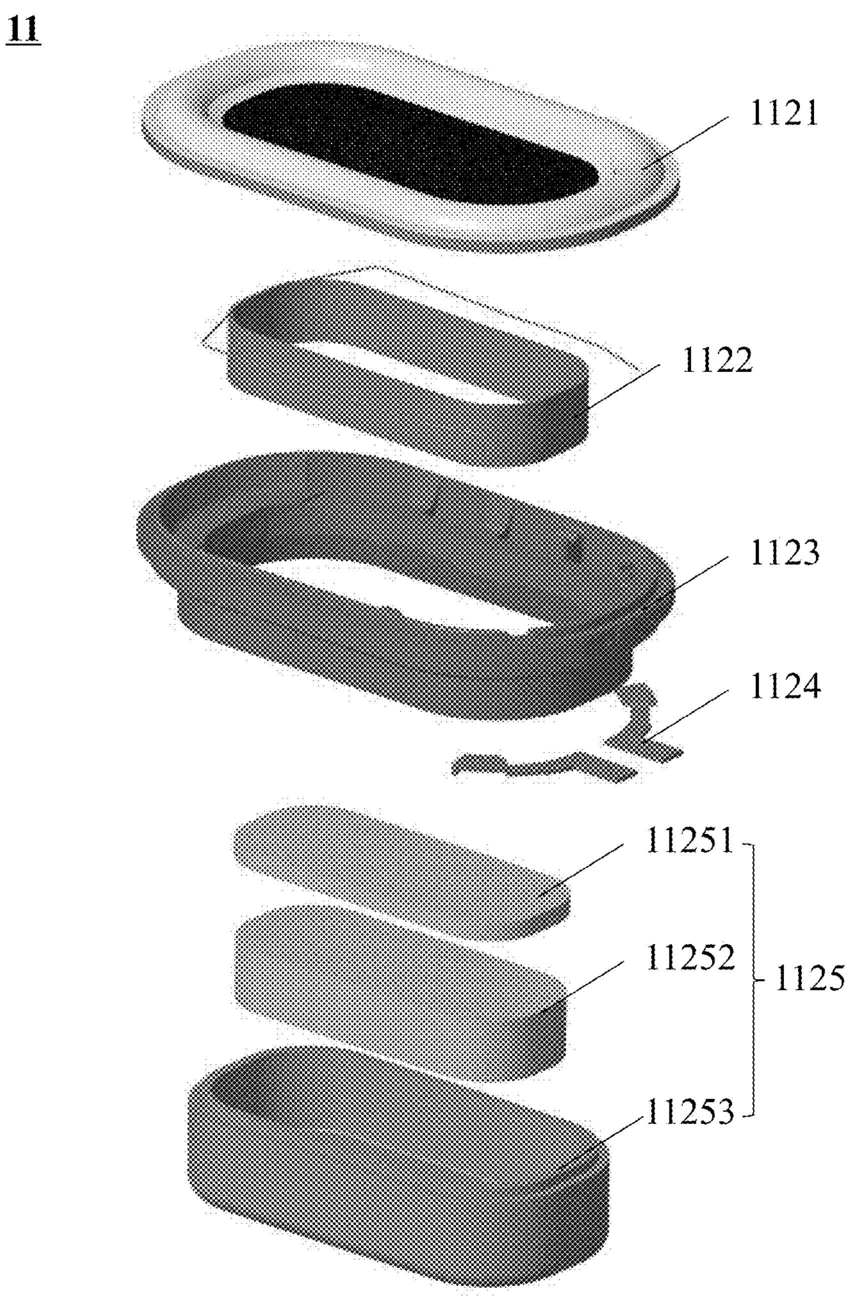
FIG. 17B is a diagram illustrating an exemplary exploded view of the transducer according to some embodiments of the present disclosure.

FIG. 17A is a diagram illustrating an exemplary view of a transducer according to some embodiments of the present disclosure. FIG. 17B is a diagram illustrating an exemplary exploded view of a transducer according to some embodiments of the present disclosure. Referring to FIG. 17A and FIG. 17B, in some embodiments, the sound production component 11 may include a diaphragm 1121, a coil 1122, a bracket 1123, a terminal 1124, and a magnetic circuit assembly 1125. The bracket 1123 provides a mounting and fixing platform, the transducer 116 may be coupled to the housing 111 via the bracket 1123, and the terminal 1124 is fixed to the bracket 1123. The terminal 1124 may be used for circuit connections (e.g., connecting leads). The coil 1122 is connected to the diaphragm 1121 and is at least partially disposed in a magnetic gap formed by the magnetic circuit assembly 1125. The magnetic circuit assembly 1125 exerts a force on the energized coil 1122, thereby driving the diaphragm 1121 to generate mechanical vibration, which in turn generates a sound by propagation through a medium such as air. The magnetic circuit assembly 1125 may include a magnetic conductive plate 11251, a magnet 11252, and an accommodation member 11253. The magnetic conductive plate 11251 may be arranged between the magnet 11252 and the diaphragm 1121 and may be attached to a surface of the magnet 11252.

Figure 18:
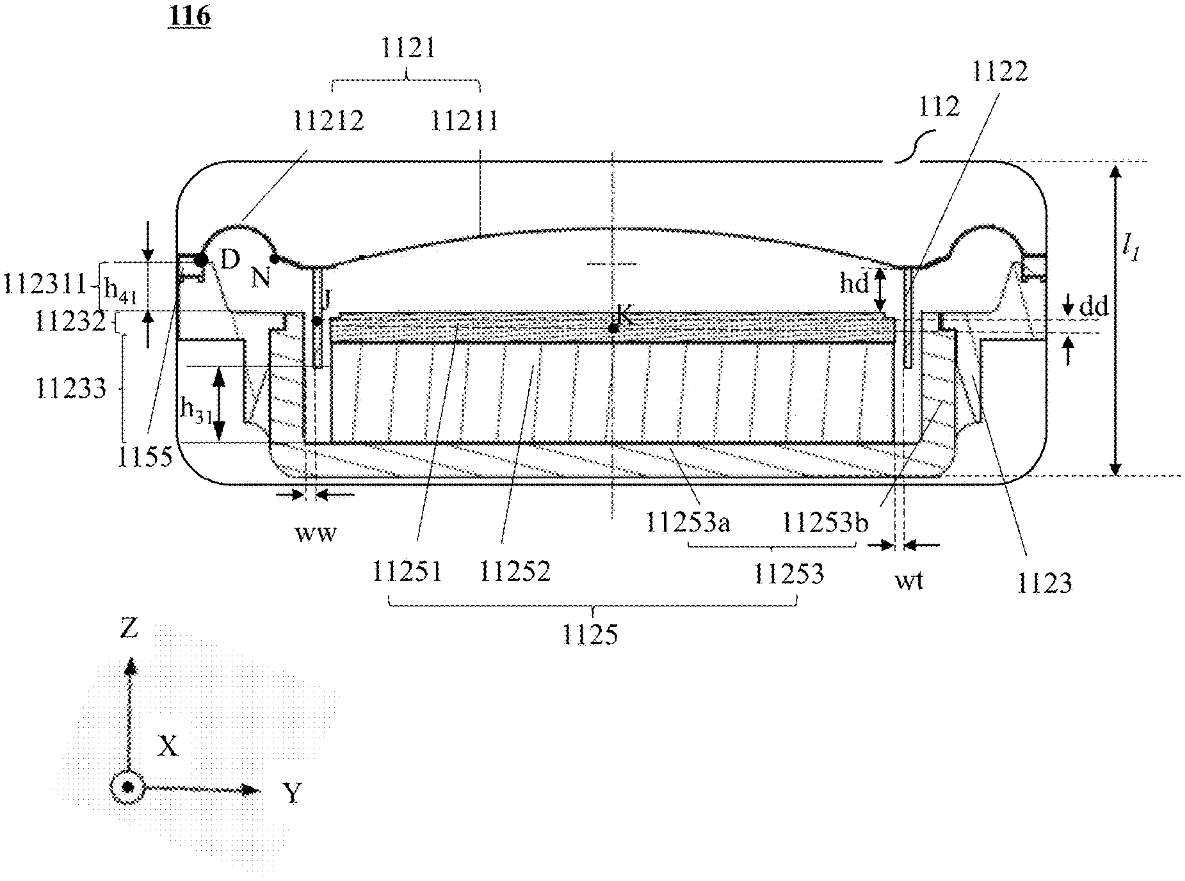
FIG. 18 is a structural diagram illustrating an exemplary internal structure of a sound production component according to some embodiments of the present disclosure.
Figure 19:
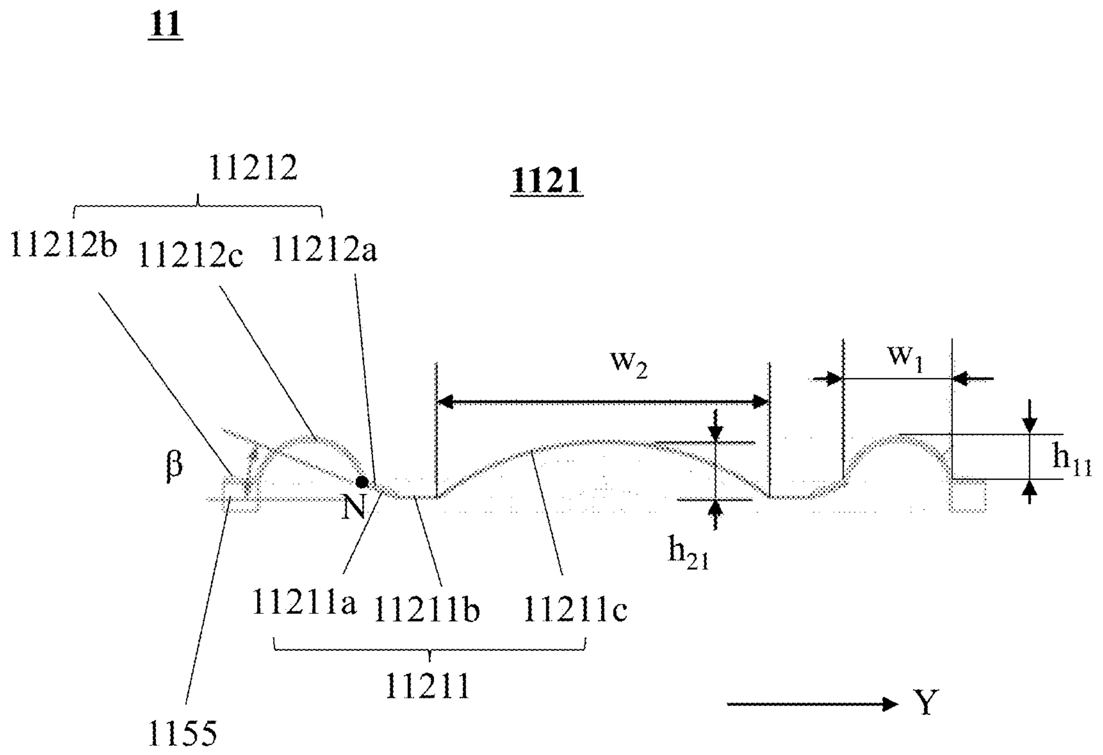
FIG. 19 is a schematic diagram illustrating an exemplary structure of a diaphragm according to some embodiments of the present disclosure.

FIG. 18 is a structural diagram illustrating an exemplary internal structure of a sound production component according to some embodiments of the present disclosure. FIG. 19 is a schematic diagram illustrating an exemplary structure of a diaphragm according to some embodiments of the present disclosure.

As shown in FIG. 18, the housing 111 accommodates the transducer 116, and the transducer 116 includes the diaphragm 1121, the coil 1122, the bracket 1123, and the magnetic circuit assembly 1125. The bracket 1123 is provided around the diaphragm 1121, the coil 1122, and the magnetic circuit assembly 1125 to provide a fixing platform for mounting. The transducer 116 may be coupled to the housing 111 via the bracket 1123, and the diaphragm 1121 covers the coil 1122 and the magnetic circuit assembly 1125 along the Z-direction. The coil 1122 extends into the magnetic circuit assembly 1125 and is connected to the diaphragm 1121. A magnetic field generated by the coil 1122 after being energized interacts with a magnetic field formed by the magnetic circuit assembly 1125 to drive the diaphragm 1121 to generate mechanical vibration, which in turn generates a sound through the propagation of a medium, such as air, and the sound is output through the sound outlet 112.

In some embodiments, the magnetic circuit assembly 1125 includes the magnetic conductive plate 11251, the magnet 11252, and the accommodation member 11253. The magnetic conductive plate 11251 and the magnet 11252 are interconnected. The magnet 11252 is mounted on a bottom wall of the accommodation member 11253 on a side away from the magnetic conductive plate 11251, and there is a gap between a peripheral side of the magnet 11252 and a peripheral inner side wall of the accommodation member 11253. In some embodiments, a peripheral outer sidewall of the accommodation member 11253 is connected and secured to the bracket 1123. In some embodiments, both the accommodation member 11253 and the magnetic conductive plate 11251 may be made of a magnetically conductive material (e.g., iron, etc.). In some embodiments, a peripheral side of the diaphragm 1121 may be connected to the bracket 1123 via a fixing ring 1155. In some embodiments, a material of the fixing ring 1155 may include a stainless steel material or other metal materials to adapt to a manufacturing process of the diaphragm 1121. In some embodiments, the accommodation member 11253 may include a bottom 11253*a* of the accommodation member and a side wall 11253*b* on a surrounding side of the accommodation member. The bottom 11253*a* of the accommodation member and the side wall 11253*b* may form an accommodation space, and the magnetic conductive plate 11251 and magnet 11252 may be accommodated within the accommodation space. The magnetic conductive plate 11251 may be connected to the magnet 11252, and a side of the magnet 11252 away from the magnetic conductive plate 11251 may be arranged at the bottom 11253*a* of the accommodation member. There may be a gap between a peripheral side of the magnet 11252 and a side wall 11253*b* of the accommodation member 11253. In some embodiments, the coil 1122 may extend into the gap between the magnet 11252 and the side wall 11253*b*.

In some embodiments, in order to improve the utilization efficiency of a magnetic field generated by the magnetic circuit component 1125 by arranging at least a portion of the coil 1122 to be located in a region with high magnetic flux density during a vibration process of the diaphragm 1121, a distance dd between a center point J of the coil 1122 and a center point K of the magnetic conductive plate 11251 in a vibration direction of the diaphragm 1121 may be less than 0.3 mm. For example, the center point J of the coil 1122 and the center point K of the magnetic conductive plate 11251 may be basically arranged on the same horizontal line, so that the magnetic circuit component 1125 may generate a great force on the coil 1122, thus providing power for the vibration of the diaphragm 1121.

Referring to FIG. 18 and FIG. 19, in some embodiments, the diaphragm 1121 may include a main-body region 11211 and a folded-ring region 11212 surrounding the main-body region 11211. In some embodiments, the main-body region 11211 may include a first inclined section 11211*a* and a first connecting section 11211*b* connected to the coil 1122. As shown in FIG. 18, the first connection section 11211*b* may be used to connect the coil 1122, and the first connection section 11211*b* may be parallel to the short-axis direction Y and perpendicular to the vibration direction of the diaphragm. The first inclined section 11211*a* may be attached to a portion of the folded-ring region 11212. In some embodiments, the first inclined section 11211*a* may be tilted in a direction away from the coil 1122 with respect to the first connecting section 11211*b*. As shown in FIG. 18 and FIG. 19, the coil 1122 may be arranged on a lower side of the first connecting section 11211*b*, and the first inclined section 11211*a* may be tilted upwards (i.e., the direction away from the coil 1122) with respect to the first connecting section 11211*b*. Through the above arrangement, a situation that an adhesive used for bonding the coil 1122 to the diaphragm 1121 overflows into the folded-ring region 11212, thus causing the adhesive to corrode the folded-ring region 11212 and affecting the vibration performance of the diaphragm 1121 may be avoided.

In some embodiments, the coil 1122 may extend into the gap between the magnet 11252 and the accommodation member 11253. When a distance between the coil 1122 and a side wall of the accommodation member 11253 is too long, the coil may not be located in a region with a high magnetic flux density of the magnetic circuit component 1125, thus weakening power provided by the magnetic circuit component 1125 to the diaphragm 1121. When the distance is too short, there may be a risk of the coil 1121 colliding with the accommodation member 11253. Therefore, in order to avoid collision of coil 1121 and ensure that the magnetic field may provide power to the diaphragm 1121, in some embodiments, a distance wt between coil 1122 and a side wall of magnet 11252 in the gap may be within a range of 0.1 mm-0.25 mm, and a distance ww between the coil 1122 and the peripheral inner wall of the accommodation member 11253 may be within a range of 0.1 mm-0.5 mm. In some embodiments, the distance wt between the coil 1122 and the side wall of the magnet 11252 may be within a range of 0.12 mm-0.24 mm, and the distance ww between the coil 1122 and the peripheral inner wall of the accommodation member 11253 may be within a range of 0.15 mm-0.3 mm. In some embodiments, in the gap, the distance wt between the coil 1122 and the side wall of the magnet 11252 may be within a range of 0.17 mm-0.21 mm, and the distance ww between the coil 1122 and the peripheral inner wall of the accommodation member 11253 may be within a range of 0.19 mm-0.23 mm. In some embodiments, the distance wt between the coil 1122 and the side wall of the magnet 11252 may be 0.2 mm, and the distance ww between the coil 1122 and the peripheral inner wall of the accommodation member 11253 may be 0.2 mm. If a distance $h_{31}$ between the coil 1122 and a bottom 11253*a* of the accommodation member 11253 is too short, a volume of the sound production component 11 may increase. Along the vibration direction of the diaphragm 1121, if the distance $h_{31}$ between the coil 1122 and the bottom 11253*a* of the accommodation member 11253 is too short, the coil 1121 may collide with the accommodation member 11253. Therefore, in order to avoid an excessive volume of the sound production component 11 and a collision of the coil 1121, in some embodiments, the distance $h_{31}$ (i.e., a distance between an end of the coil 1122 away from the diaphragm 1121 and the bottom wall of the accommodation member 11253) between the coil 1122 and the bottom 11253*a* of the accommodation member 11253 may be within a range of 0.2 mm-4 mm. In some embodiments, the distance $h_{31}$ between the coil 1122 and the bottom wall of the accommodation member 11253 may be within a range of 0.6 mm-3 mm. In some embodiments, the distance $h_{31}$ between the coil 1122 and the bottom wall of the accommodation member 11253 may be within a range of 1 mm-2 mm. In some embodiments, the distance $h_{31}$ between the coil 1122 and the bottom wall of the accommodation member 11253 may be within a range of 1.4 mm-1.6 mm.

In some embodiments, by adjusting an inclination angle β of the first inclined section 11211*a* with respect to the first connecting section 11211*b*, a relative position of coil 1122 and magnetic circuit component 1125 may be changed, so that a thrust on the coil 1122 may be generally consistent, and then a low-frequency distortion of the sound production component 11 may be adjusted to enrich a low-frequency listening experience. In addition, by adjusting the inclination angle β of the first inclined section 11211*a* with respect to the first connecting section 11211*b*, the coil 1122 overflowing adhesive to the folded-ring region 11212 may be prevented, thus preventing corrosion of the folded-ring region 11212 to affect the vibration of the folded-ring region 11212. The inclination angle β of the first inclined section 11211*a* with respect to the first connecting section 11211*b* refers to an angle between a direction of the first inclined section 11211*a* away from the first connecting section 11211*b* and a straight line where the first connecting section 11211*b* is located, which is shown in FIG. 19.

In some embodiments, in order to reduce the distortion of the sound production component 11 and avoid the folded-ring region 11212 being corroded to affect the vibration of the folded-ring region 11212, the inclination angle β of the first inclined section 11211*a* with respect to the first connecting section 11211*b* may be within a range of 5°-30°. In some embodiments, in order to further reduce the distortion of the sound production component 11, the inclination angle β of the first inclined section 11211*a* with respect to the first connecting section 11211*b* may be within a range of 10°-25°. For example, the inclination angle β of the first inclined section 11211*a* with respect to the first connecting section 11211*b* may be 15°. For example, the inclination angle β of the first inclined section 11211*a* with respect to the first connecting section 11211*b* may be 22°.

In some embodiments, a minimum distance between the coil 1122 and the first inclined section 11212*a* may not be less than 0.3 mm. That is, a distance between a connection point between the first inclined section 11212*a* and the first connecting section 11211*b*, and a connection region between the coil 1122 and the first connecting section 11211*b* may not be less than 0.3 mm, thus to maintain a safe distance between an arrangement position of the folded-ring region 11212 and the coil 1122, and prevent the adhesive for arranging the coil 1122 from overflowing into the folded-ring region 11212.

In some embodiments, the folded-ring region 11212 may include a second inclined section 11212*a*, and at least part of the second inclined section 11212*a* may be attached to the first inclined section 11211*a*. The main-body region 11211 and the folded-ring region 11212 may connected based on the first inclined section 11211*a* and the second inclined section 11212*a*. In some embodiments, in order to simplify an arrangement process, the first inclined section 11211*a* and the second inclined section 11212*a* may be connected by an adhesive. In some embodiments, in order to achieve the connection between the main-body region 11211 and the folded-ring region 11212, the second inclined section 11212*a* may be arranged on a side of the first inclined section 11211*a* near the coil 1122. In some embodiments, in order to achieve the connection between the main-body region 11211 and the folded-ring region 11212, and to further reduce a corrosion degree of the adhesive on the folded-ring region 11212 during a process of bonding the coil 1122, the second inclined section 11212*a* may be arranged on a side of the first inclined section 11211*a* away from the coil 1122.

Due to a large amplitude of the vibration of the diaphragm 1121 at a low frequency, if the folded-ring region 11212 is a planar structure, a deformation ability of the folded-region 11212 may be poor, which may affect the amplitude of vibration of the diaphragm 1121. Therefore, in order to ensure the good deformation ability of the diaphragm 1121, in some embodiments, the folded-ring region 11212 may include an arc-shaped segment 11212*c*.

In some embodiments, a ratio of a height $h_{11}$ of the arc-shaped segment 11212*c* to a span w1 of the arc-shaped segment 11212*c* may affect the deformation ability of the arc-shaped segment 11212*c*. The height of the arc-shaped segment 11212*c* refers to a distance between a highest point of the arc-shaped segment 11212*c* and a lowest point of the arc-shaped segment 11212*c* in the vibration direction of diaphragm 1121. As shown in FIG. 19, the height of the arc-shaped segment 11212*c* is designated as $h_{11}$. The span of arc-shaped segment 11212*c* refers to a maximum distance between upper two points of arc-shaped segment 11212*c*. As shown in FIG. 19, the span of arc segment 11212*c* is designated as w1. If the ratio of height $h_{11}$ to span w1 of arc-shaped segment 11212*c* is too small, a protrusion degree of arc-shaped segment 11212*c* is too small, and a shape of the arc-shaped segment 11212*c* may be close to a planar structure, resulting in poor deformation ability of the arc-shaped segment 11212*c*. If the ratio of height $h_{11}$ to span w1 of arc-shaped segment 11212*c* is too large, the protrusion degree of arc-shaped segment 11212*c* is too large, and the vibration of diaphragm 1121 is greatly hindered, thus affecting an output of the sound production component 11. Therefore, in some embodiments, in order to achieve the better output and lower distortion of the sound production component 11, the ratio of height $h_{11}$ to span w1 of the arc-shaped segment 11212*c* may be within a range of 0.35-0.4. In some embodiments, in order to further enhance the output of the sound production component 11, the ratio of height $h_{11}$ to span w1 of the arc-shaped segment 11212*c* may be within a range of within a range of 0.36 to 0.39. In some embodiments, in order to further reduce the distortion of the sound production component 11, the ratio of height $h_{11}$ to span w1 of the arc-shaped segment 11212*c* may be within a range of 0.37-0.38. For example, the ratio of height $h_{11}$ to span w1 of the arc-shaped segment 11212*c* may be 0.38.

In some embodiments, the height $h_{11}$ of the arc-shaped segment 11212*c* may be in a range of 0.5 mm-0.7 mm. For example, the height $h_{11}$ of the arc-shaped segment 11212*c* may be in a range of 0.55 mm-0.65 mm. In some embodiments, the height $h_{11}$ of the arc-shaped segment 11212*c* may be 0.6 mm. Taking an error in dimension into account, in some embodiments, the height $h_{11}$ of the arc-shaped segment 11212*c* may be 0.6 mm±0.05 mm. In some embodiments, the span (width) w2 of the arc-shaped segment 11212*c* of the folded-ring region 11212 may be less than twice of a curvature radius r1 of the arc-shaped segment 11212*c*. In some embodiments, the curvature radius r1 of the arc-shaped segment 11212*c* of the folded-ring region 11212 may be within a range of 0.7 mm-0.9 mm. In some embodiments, the curvature radius r1 of the arc-shaped segment 11212*c* of the folded-ring region 11212 may be within a range of 0.75 mm-0.88 mm. In some embodiments, the curvature radius r1 of the arc-shaped segment 11212*c* of the folded-ring region 11212 may be within a range of 0.8 mm-0.83 mm.

In some embodiments, the diaphragm 1121 may vibrate up and down through the deformation of the arc-shaped segment 11212*c* in the folded-ring region 11212. Because of the low stiffness of the arc-shaped segment 11212*c*, the circulation of air at the sound outlet 112 may affect the uniformity of the deformation of the arc-shaped segment 11212*c*. In order to prevent the circulation of air at the sound outlet 112 from affecting the uniformity of the deformation of the arc-shaped segment 11212*c*, and to reduce the distortion degree of the sound production component 11, the sound outlet 112 and the arc-shaped segment 11212*c* should be staggered along a direction perpendicular to the vibration direction of the diaphragm as much as possible. For example, a projection of the center O of the sound outlet 112 on the diaphragm 1121 along the vibration direction of the diaphragm 1121 may be located within an inner side of the arc-shaped segment 11212*c*. It should be noted that the inner side of the arc-shaped segment 11212*c* refers to a region on the diaphragm 1121 that is closer to a geometric center of the main-body region 11211 with respect to a part of the arc-shaped segment 11212*c* proximate to the main-body region 11211 (e.g., a position where the point N on a cross-section cutting along a short axis of the diaphragm is located, as shown in FIG. 19).

In some embodiments, in order to enable the sound outlet 112 to be close to the ear canal while wearing the open earphone 10 to increase a volume of a listening sound at a listening position, a distance from the center O of the sound outlet 112 to the lower side surface LS of the sound production component 11 may be in a range of 4.05 mm to 6.05 mm, and a distance from the center O of the sound outlet 112 to the rear side surface RS of the sound production component 11 may be in a range of 8.15 mm to 12.25 mm. Furthermore, in order to minimize the effect of the sound outlet 112 on the vibration of the diaphragm so as to reduce the distortion degree of the sound production component 11, a span of the folded-ring region 11212 should not be too large, so as to avoid or minimize the arc-shaped segment 11212*c* overlapping with the sound outlet 112 along the direction perpendicular to the vibration direction of the diaphragm. For example, the span w1 of the arc-shaped segment 11212*c* may be in a range of 1.2 mm-1.7 mm so that the projection of the center O of the sound outlet 112 on the diaphragm 1121 may be located at the inner side of the arc-shaped segment 11212*c*. In some embodiments, the span w1 of the arc-shaped segment 11212*c* of the folded-ring region 11212 may be within a range of 1.3 mm-1.65 mm. In some embodiments, the span w1 of the arc-shaped segment 11212*c* of the folded-ring region 11212 may be within a range of 1.5 mm-1.6 mm. In some embodiments, the curvature radius r1 of the arc-shaped segment 11212*c* of the folded-ring region 11212 may be 0.82 mm, and the span w1 of the arc-shaped segment 11212*c* of the folded-ring region 11212 may be 1.58 mm. Considering the error in the size of the arc-shaped segment 11212*c*, in some embodiments, the curvature radius r1 of the arc-shaped segment 11212*c* of the folded-ring region 11212 may be 0.82 mm±0.05 mm, and the span w1 of the arc-shaped segment 11212*c* in the folded-ring region 11212 may be 1.58 mm±0.1 mm.

In some embodiments, a dimension of the sound production component 11 may be related to a dimension of the diaphragm 1121 (e.g., a long-axis dimension and a short-axis dimension of the projection of the diaphragm 1121 on the sagittal plane). The larger the dimension of the diaphragm 1121 is, the larger the dimension of the sound production component 11 may be. In some embodiments, while ensuring that the sound outlet 112 is close to the ear canal when the open earphone 10 is in the wearing state, in order to minimize the effect of the sound outlet 112 on the vibration of the diaphragm to reduce the distortion degree of the sound production component 11, a ratio of the distance from the center O of the sound outlet 112 to the lower side surface LS to a short-axis dimension of the diaphragm 1121 is in a range of 0.3-0.5. In some embodiments, in order to enable the sound outlet 112 to better avoid the arc-shaped segment 11212*c* in the folded-ring region 11212 along the direction perpendicular to the vibration direction of the diaphragm 1121, the ratio of the distance from the center O of the sound outlet 112 to the lower side surface LS to the short-axis dimension of the diaphragm 1121 is in a range of 0.33-0.47. In some embodiments, in order to ensure that the sound outlet 112 has a sufficiently large short-axis dimension while avoiding the arc-shaped segment 11212*c* along the direction perpendicular to the vibration direction of the diaphragm, the ratio of the distance from the center O of the sound outlet 112 to the lower side surface LS to the short-axis dimension of the diaphragm 1121 is in a range of 0.35-0.45. In some embodiments, the ratio of the distance from the center O of the sound outlet 112 to the lower side surface LS to the short-axis dimension of the diaphragm 1121 is in a range of 0.38-0.42.

In some embodiments, the ratio of the span w1 of the arc-shaped segment 11212*c* to the short-axis dimension of the diaphragm 1121 may not be too large or too small. When the ratio is too large, in order to minimize the influence of the sound outlet 112 on the vibration of the diaphragm, it may make the sound outlet 112 farther away from the ear canal when the open earphone 10 is in the wearing state, which results in a lower listening volume at the listening position. Moreover, if the ratio is too large, it also leads to a small area of the main-body region 1121 of the diaphragm 1121, affecting an amount of air that the diaphragm 1121 may propel; and when the ratio is too small, it may make the amplitude of the vibration of the diaphragm smaller, affecting the sound production efficiency of the sound production component 11. In some embodiments, the ratio of the span w1 of the arc-shaped segment 11212*c* to the short-axis dimension of the diaphragm 1121 is in a range of 0.1-0.3. In some embodiments, the ratio of the span $w_1$ of the arc-shaped segment 11212*c* to the short-axis dimension of the diaphragm 1121 is in a range of 0.15-0.25. In some embodiments, the ratio of the span $w_1$ of the arc-shaped segment 11212*c* to the short-axis dimension of the diaphragm 1121 is in a range of 0.17-0.23. In some embodiments, the ratio of the span $w_1$ of the arc-shaped segment 11212*c* to the short-axis dimension of the diaphragm 1121 is in a range of 0.19-0.21.

Similarly, in some embodiments, while ensuring that the sound outlet 112 is close to the ear canal when the open earphone 10 is in the wearing state, in order to reduce the effect of the sound outlet 112 on the vibration of the diaphragm so as to reduce the distortion degree of the sound production component 11, a ratio of the distance from the center O of the sound outlet 112 to the rear side surface RS to a long-axis dimension of the diaphragm 1121 is in a range of 0.45-0.65. In some embodiments, in order to reduce the effect of the sound outlet 112 on the vibration of the diaphragm to reduce the distortion degree of the sound production component 11, the ratio of the distance from the center O of the sound outlet 112 to the rear side surface RS to the long-axis dimension of the diaphragm 1121 is in a range of 0.5-0.6. In some embodiments, in order to ensure that the sound outlet 112 has a sufficiently large long-axis dimension while avoiding the arc-shaped segment 11212*c* along the direction perpendicular to the vibration direction of the diaphragm, the ratio of the distance from the center O of the sound outlet 112 to the rear side surface RS to the long-axis dimension of the diaphragm 1121 is in a range of 0.52-0.58. In some embodiments, the ratio of the distance from the center O of the sound outlet 112 to the rear side surface RS to the long-axis dimension of the diaphragm 1121 is in a range of 0.54-0.56.

In some embodiments, a ratio of the span $w_1$ of the arc-shaped segment 11212*c* to the long-axis dimension of the diaphragm 1121 may not be too large or too small. When the ratio is too large, in order to minimize the influence of the sound outlet 112 on the vibration of the diaphragm, it may make the sound outlet 112 farther away from the ear canal when the open earphone 10 is in the wearing state, which results in a lower listening volume at the listening position. Moreover, if the ratio is too large, it may also lead to a small area of the main-body region 1121 of the diaphragm 1121, affecting the amount of air that the diaphragm 1121 may propel; and when the ratio is too small, it may make the amplitude of the vibration of the diaphragm smaller, affecting the sound production efficiency of the sound production component 11. In some embodiments, the ratio of the span $w_1$ of the arc-shaped segment 11212*c* to the long-axis dimension of the diaphragm 1121 is in a range of 0.065-0.1. In some embodiments, the ratio of the span $w_1$ of the arc-shaped segment 11212*c* to the long-axis dimension of the diaphragm 1121 is in a range of 0.075-0.095. In some embodiments, the ratio of the span $w_1$ of the arc-shaped segment 11212*c* to the long-axis dimension of the diaphragm 1121 is in a range of 0.08-0.09.

In some embodiments, in order to bring the sound outlet 112 close to the ear canal while reducing the effect of the sound outlet 112 on the vibration of the diaphragm so as to reduce the distortion degree of the sound production component 11, there is a first difference between the distance from the center O of the sound outlet 112 to the lower side surface LS and the span of the arc-shaped segment 11212*c*. In some embodiments, the first difference may be in a range of 2.75 mm-4.15 mm. In some embodiments, in order to further minimize the effect of the sound outlet 112 on the vibration of the diaphragm, the first difference may be in a range of 2.9 mm-4.0 mm. In some embodiments, the first difference may be in a range of 3.1 mm-3.8 mm. In some embodiments, the first difference may be in a range of 3.3 mm-3.6 mm. In some embodiments, in order to enable the sound outlet 112 to avoid the arc-shaped segment 11212*c* along the direction perpendicular to the vibration direction of the diaphragm and enable the diaphragm to have a sufficiently large short-axis dimension, a ratio of the first difference to the short-axis dimension of the diaphragm 1121 may be in a range of 0.3-0.7. In some embodiments, in order to further ensure that the diaphragm has a sufficiently large short-axis dimension and that the sound outlet 112 avoids the arc-shaped segment 11212*c* along the direction perpendicular to the vibration direction of the diaphragm, the ratio of the first difference to the short-axis dimension of the diaphragm 1121 may be in a range of 0.35-0.65. In some embodiments, the ratio of the first difference to the short-axis dimension of the diaphragm 1121 may be in a range of 0.45-0.55.

In some embodiments, in order to bring the sound outlet 112 close to the ear canal while reducing the effect of the sound outlet 112 on the vibration of the diaphragm so as to reduce the distortion degree of the sound production component 11, there is a second distance between the distance from the center O of the sound outlet 112 to the rear side surface RS and the span of the arc-shaped segment 11212*c*. In some embodiments, the second difference may be in a range of 6.8 mm-10.3 mm. In some embodiments, in order to further minimize the effect of the sound outlet 112 on the vibration of the vibration of the diaphragm, the second difference may be in a range of 7 mm-10 mm. In some embodiments, the second difference may be in a range of 7.5 mm-9.5 mm. In some embodiments, the second difference may be in a range of 8 mm-9 mm. In some embodiments, in order to enable the sound outlet 112 to avoid the arc-shaped segment 11212*c* along the direction perpendicular to the vibration direction of the diaphragm and enable the diaphragm to have a sufficiently large long-axis dimension, a ratio of the second difference to the long-axis dimension of the diaphragm 1121 is in a range of 0.40-0.55. In some embodiments, in order to further ensure that the diaphragm has a sufficiently large long-axis dimension and that the sound outlet 112 avoids the arc-shaped segment 11212*c* along the direction perpendicular to the vibration direction of the diaphragm, the ratio of the second difference to the long-axis dimension of the diaphragm 1121 is in a range of 0.45-0.5. In some embodiments, the ratio of the second difference to the long-axis dimension of the diaphragm 1121 is in a range of 0.47-0.49.

In some embodiments, the folded-ring region 11212 may also include a wavy structure composed of a plurality of arc-shaped sections 11212*c*, and any two adjacent arc-shaped sections 11212*c* may face opposite directions. The arrangement of the wavy structure may make resistance received by the diaphragm 1121 symmetrical when the diaphragm 1121 vibrates upwards and downwards, thus reducing the distortion of the sound production component 11 and improving the output of the sound production component 11 at a low frequency. In some embodiments, the ratio of height to span of each arc-shaped segment 11212*c* of the plurality of arc-shaped segment 11212*c* may be consistent with the ratio of height to span of a single arc-shaped segment 11212*c* mentioned above. In some embodiments, the ratio of height to span of each arc-shaped segment 11212*c* of the plurality of arc-shaped segments 11212*c* may be different. For example, in a radial direction of the diaphragm 1121, the height of each arc-shaped segment 11212*c* of the plurality of arc-shaped segments 11212*c* may gradually decrease from a center to an edge of the diaphragm 1121, and the span of each arc-shaped segment 11212*c* may be the same.

In order to constrain the diaphragm 1121 when the diaphragm is significantly vibrating and prevent the coil 1122 from attaching the magnetic circuit component 1125, in some embodiments, the main-body region 11211 may include an arch-shaped dome 11211*c* arranged at an end of the first connecting section 11211*b* far from the first inclined section 11211*a*, and an arching direction of the arch-shaped dome 11211*c* may be the same as an arching direction of the arc-shaped segment 11212*c*, that is, the arch-shaped dome 11211*c* may face towards a side away from the coil 1122. The arch-shaped dome 11211*c* may prevent the diaphragm 1121 from shaking during significant vibrations, ensuring that the coil 1122 does not collide with the magnetic component 1125. At the same time, a strength and a stiffness of the arch-shaped dome 11211*c* may be high, thus a split vibration of the main-body region 11211 may be suppressed to some extent, thereby improving the high-frequency vibration feature of the transducer 116. In the absence of a front cover, an aspect ratio (i.e., a ratio of a height of dome to a span of the dome) of the dome increases, resulting in an increase in high-frequency bandwidth. However, an excessively high aspect ratio of the dome may cause an increase in unevenness and overall size.

In some embodiments, a height $h_{21}$ of the dome 11211*c* may be related to a size of the dome 11211*c* in an extension direction (i.e., a size of the span w2 of the dome) of an arch of the dome. The height of the dome 11211*c* refers to a distance between a highest point of the dome 11211*c* and a lowest point of the dome 11211*c* (i.e., an endpoint connected to the first connecting section 11211*b*) in the vibration direction of the diaphragm 1121. As shown in FIG. 19, the height of the dome 11211*c* is designated as $h_{21}$. The span of the dome 11211*c* refers to a maximum distance between two points above the dome 11211*c*. As shown in FIG. 19, the span of the dome 11211*c* is designated as w2. When the span w2 of the dome 11211*c* is changed to lager, in order to maintain an arch structure of the dome 11211*c* (e.g., keeping a radian of the dome 11211*c* within a preset radian range), the height $h_{21}$ of the dome 11211*c* may also be higher, which may cause a thickness of the transducer 116 being too large. Taking the thickness and structural design of the transducer 116 into account, in some embodiments, the preset radian range of the dome 11211*c* of the main-body region 11211 of the diaphragm 1121 may be 0.5263 rad-3.1416 rad. In some embodiments, the preset radian range of the dome 11211*c* of the main-body region 11211 of the diaphragm 1121 may be 0.7869 rad-3.1416 rad. In some embodiments, the preset radian range of the dome 11211*c* of the main-body region 11211 of the diaphragm 1121 may be 1.0526 rad-3.1416 rad. In some embodiments, the preset radian range of the dome 11211*c* of the main-body region 11211 of the diaphragm 1121 may be 1.5789 rad-3.1416 rad. In some embodiments, the preset radian range of the dome 11211*c* of the main-body region 11211 of the diaphragm 1121 may be 2.1053 rad-3.1416 rad. In some embodiments, the preset radian range of the dome 11211*c* of the main-body region 11211 of the diaphragm 1121 may be 2.6316 rad-3.1416 rad. In some embodiments, the span w2 of the dome 11211*c* of the main-body region 11211 may be within a range of 2 mm-8 mm. In some embodiments, the span w2 of the dome 11211*c* of the main-body region 11211 may be within a range of 3 mm-7 mm. In some embodiments, the span w2 of the dome 11211*c* of the main-body region 11211 may be within a range of 4 mm-6 mm. In some embodiments, the span w2 of the dome 11211*c* of the main-body region 11211 may be 4.8 mm. In some embodiments, the height $h_{21}$ of the dome 11211*c* of the main-body region 11211 (i.e., the distance between the highest point and the lowest point of the dome 11211*c* in the vibration direction of the diaphragm) may be within a range of 0.7 mm-1.2 mm. In some embodiments, the height $h_{21}$ of the dome 11211*c* of the main-body region 11211 may be within a range of 0.9 mm-1.1 mm. In some embodiments, the height $h_{21}$ of the dome 11211*c* of the main-body region 11211 may be within a range of 1 mm-1.05 mm. In some embodiments, the height $h_{21}$ of the dome 11211*c* of the main-body region 11211 may be 0.8 mm. In some embodiments, due to a machining error, the height $h_{21}$ of the dome 11211*c* of the main-body region 11211 may be 0.8 mm±0.08 mm.

In some embodiments, the ratio of the height $h_{21}$ of the dome 11211*c* to the span w2 of the dome 11211*c* may affect a size of the sound production component 11 and the vibration of the diaphragm 1121. If the ratio of the height $h_{21}$ of the dome 11211*c* to the span w2 of the dome is too small, a protrusion of the dome 11211*c* may be too small, the shape of the dome 11211*c* may be close to a planar structure, and a strength and a stiffness of the dome 11211*c* may be low. The spilt vibration may be performed on the dome 11211*c*, leading to more peaks and valleys in a high-frequency region, affecting the high-frequency vibration feature of the transducer 116. If the ratio of the height $h_{21}$ of the dome 11211*c* to the span w2 of the dome is too large, the protrusion of the spherical top 11211*c* may be too large, and the thickness of the transducer 116 may be too large, resulting in an increase in unevenness and the size of the transducer 116. Therefore, in order to ensure the thickness and size of the sound production component 11, and improve the high-frequency vibration feature of the sound production component 11, the ratio of the height $h_{21}$ of the dome 11211*c* to the span w2 of the dome 11211*c* may be within a range of 0.1-0.6. In some embodiments, in order to further improve the high-frequency vibration feature of the transducer 116, the ratio of the height $h_{21}$ of the dome 11211*c* to the span w2 of the dome 11211*c* may be in a range of 0.1-0.4. In some embodiments, in order to further improve the high-frequency vibration feature of the transducer 116, the ratio of the height $h_{21}$ of the dome 11211*c* to the span w2 of the dome 11211*c* may be in a range of 0.1-0.3.

In some embodiments, taking into account a structural strength, a difficulty in process implementation, and a limitation of the thickness of the sound production component 11, while meeting the maximum amplitude of the diaphragm 1121, in order to prevent the diaphragm 1121 from colliding with the magnetic plate 11251 during the vibration process, a distance (a distance hd shown in FIG. 18) between the lowest point of the dome 11211*c* of the main-body region 11211 of the diaphragm 1121 and a top of the magnetic conductive plate 11251 of the magnetic circuit component 1125 may be greater than 0.8 mm. In some embodiments, the distance hd between the lowest point of the dome 11211*c* of the main-body region 11211 of the diaphragm 1121 and the top of the magnetic conductive plate 11251 in the magnetic circuit component 1125 may be within a range of 0.85 mm-0.95 mm, which may be 0.9 mm±0.05 mm. 0.9 mm may be a size of a structure, and 0.05 mm may be a size of an error range. In some embodiments, the distance hd between the lowest point of the dome 11211*c* of the main-body region 11211 of the diaphragm 1121 and the top of the magnetic conductive plate 11251 of the magnetic circuit component 1125 may be within a range of 0.86 mm-0.93 mm. In some embodiments, the distance hd between the lowest point of the dome 11211*c* of the main-body region 11211 of the diaphragm 1121 and the top of the magnetic conductive plate 11251 of the magnetic circuit component 1125 may be within a range of 0.88 mm-0.92 mm.

Continuing to refer to FIG. 16 and FIG. 18, in some embodiments, in order to improve the acoustic output (especially low frequency output) effect of the sound production component 11 and improve the ability of the diaphragm 1121 to push the air, a projection area of the diaphragm 1121 along the Z direction is as large as possible. However, too large the area of the diaphragm 1121 leads to too large a dimension of the transducer 116, which in turn causes too large the housing 111, thus easily causing the housing 111 to collide and rub against the ear, thereby affecting the wearing comfort of the sound production component 11. Therefore, the dimension of the housing 111 needs to be designed. Exemplarily, a dimension (e.g. 17 mm) of the cavum concha along the Y-direction may determine a width dimension of the housing 111 in the Y-direction, and then a suitable length-to-short ratio (i.e. a ratio of the dimension of the housing 111 in the Y-direction to a dimension of the housing 111 in the X-direction) is selected according to the wearing comfort, so as to determine the length dimension (e.g. 21.49 mm) of the housing 111 in the X-direction to match the dimension of the cavum concha along the Y-direction. It should be noted that the long-axis dimension of the sound production component 11 (or the housing 111) refers to a maximum dimension of the sound production component 11 (or the housing 111) along the Y-direction, and the short-axis dimension refers to a maximum dimension of the sound production component 11 (or housing 111) along the Z-direction.

In some embodiments, in order to enable most users to wear the open earphone 10 with the sound production component 11 at least partially inserted into the cavum concha to form a cavity structure with better acoustics, for example, such that the open earphone 10 forms the first leaking structure UC and the second leaking structure LC between the open earphone 10 and the user's ear when the open earphone 10 is worn to improve the acoustic performance of the earphone, the dimension of the housing 111 may take a value in a preset range. In some embodiments, depending on a width dimension range of the cavum concha along the Y-direction, the width dimension of the housing 111 along the Y-direction may be in a range of 11 mm-16 mm. In some embodiments, the width dimension of the housing 111 along the Y-direction may be in a range of 11 mm-15 mm. In some embodiments, the width dimension of the housing 111 along the Y-direction may be in a range of 13 mm-14 mm. In some embodiments, a ratio of the dimension of the housing 111 along the X-direction to the dimension of the housing 111 along the Y-direction may be in a range of 1.2-5. In some embodiments, the ratio of the dimension of the housing 111 along the X-direction to the dimension of the housing 111 along the Y-direction may be in a range of 1.4-4. In some embodiments, the ratio of the dimension of the housing 111 along the X-direction to the dimension of the housing 111 along the Y-direction may be in a range of 1.5-2. In some embodiments, the length dimension of the housing 111 along the X-direction may be in a range of 15 mm-30 mm. In some embodiments, the length dimension of the housing 111 along the X-direction may be in a range of 16 mm-28 mm. In some embodiments, the length dimension of the housing 111 along the X-direction may be in a range of 19 mm-24 mm. In some embodiments, in order to avoid the large volume of the housing 111 affecting the wearing comfort of the open earphone 10, a thickness dimension of the housing 111 along the Z-direction may be in a range of 5 mm-20 mm. In some embodiments, the thickness dimension of the housing 111 along the Z-direction may be in a range of 5.1 mm-18 mm. In some embodiments, the thickness dimension of the housing 111 along the Z-direction may be in a range of 6 mm-15 mm. In some embodiments, the thickness dimension of the housing 111 along the Z-direction may be in a range of 7 mm-10 mm. In some embodiments, an area of the inner side surface IS of the housing 111 (in the case where the inner side surface IS is rectangular, the area is equal to a product of the length dimension and the width dimension of the housing 111) may be 90 $mm^2$-560 $mm^2$. In some embodiments, the area of the inner side surface IS may be considered to approximate the projection area of the diaphragm 1121 along the Z-direction. For example, the area of the inner side surface IS may differ by less than or equal to 10% from the projection area of the diaphragm 1121 along the Z-direction. In some embodiments, the area of the inner side surface IS may be 150 $mm^2$-360 $mm^2$. In some embodiments, the area of the inner side surface IS may be 160 $mm^2$-240 $mm^2$. In some embodiments, the area of the inner side surface IS may be 180 $mm^2$-200 $mm^2$. Based on the principles described in FIG. 9 to FIG. 12, when the open earphone 10 is worn in the manner shown in FIG. 13, on the basis that the dimension of the open earphone 10 satisfies the wearing comfort, the acoustic performance of the open earphone 10 is superior to the existing open earphones, that is, the dimension of the open earphone 10 can be smaller than the existing open earphones while achieving the same excellent acoustic performance.

Referring to FIG. 16 and FIG. 18, in some embodiments, a distance from the center O of the sound outlet 112 along the Z-direction to a bottom surface of the magnetic circuit assembly 1125 may be related to a vibration range of the diaphragm 1121 and a thickness of the magnetic circuit assembly 1125. The vibration range of the diaphragm 1121 may affect the amount of air pushed by the transducer of the sound production component 11. The greater the vibration range of the diaphragm 1121 is, the greater the amount of air pushed by the transducer of the sound production component 11 is, and the higher the sound production efficiency of the sound production component is. The greater the thickness of the magnetic circuit assembly 1125 is, the greater the total weight of the sound production component 11 is, which affects the comfort of the user. In addition, when the thickness of the sound production component in the Z-direction is a constant, the smaller the distance from the center O of the sound outlet 112 along the Z-direction to the bottom surface of the magnetic circuit assembly 1125 is, the larger the volume of the rear cavity may be. At this time, according to the aforementioned equation (2), it is known that the smaller the resonance frequency of the rear cavity is, the resonance peak of the rear cavity moves to lower frequency, and a smaller range of the flat region of the frequency response curve is. In order to ensure that the sound production efficiency of the sound production component is sufficiently high, that the resonance frequency of the rear cavity is in a suitable frequency range (e.g., 1000 Hz-5000 Hz), and that the user is comfortable enough to wear, considering the structural strength, the difficulty of process implementation, and the overall thickness of the housing 111, the distance 11 from the center O of the sound outlet 112 along the Z-direction to the bottom surface of the magnetic circuit assembly 1125 (i.e., a side of the accommodation member 11253 along the Z-direction away from the sound outlet 112) is in a range of 5.65 mm to 8.35 mm. In some embodiments, the distance 11 from the center O of the sound outlet 112 along the Z-direction to the bottom surface of the magnetic circuit assembly 1125 is in a range of 6.00 mm to 8.00 mm. In some embodiments, the distance 11 from the center O of the sound outlet 112 along the Z-direction to the bottom surface of the magnetic circuit assembly 1125 is in a range of 6.35 mm to 7.65 mm. In some embodiments, the distance 11 from the center O of the sound outlet 112 along the Z-direction to the bottom surface of the magnetic circuit assembly 1125 is in a range of 6.70 mm to 7.30 mm. In some embodiments, the distance 11 from the center O of the sound outlet 112 along the Z-direction to the bottom surface of the magnetic circuit assembly 1125 is in a range of 6.95 mm to 7.05 mm.

In some embodiments, a distance from the center O of the sound outlet 112 to a long-axis center plane (e.g., a plane NN' oriented perpendicular to the paper and inward as shown in FIG. 13) of the magnetic circuit assembly 1125 is in a range of 1.45 mm to 2.15 mm. In the present disclosure, the long-axis center plane of the magnetic circuit assembly 1125 is a plane parallel to the lower side surface LS of the sound production component 11 and passing through the geometric center of the magnetic circuit assembly 1125. In other words, the long-axis center plane of the magnetic circuit assembly 1125 may divide the magnetic circuit assembly 1125 into two identical parts along the X-direction. The distance from the center O of the sound outlet 112 to the long-axis center plane of the magnetic circuit assembly 1125 is also a distance from the center O of the sound outlet 112 along the short-axis direction Y to the long-axis center plane. In some embodiments, the distance from the center O of the sound outlet 112 to the long-axis center plane is in a range of 1.55 mm to 2.05 mm. In some embodiments, the distance from the center O of the sound outlet 112 to the long-axis center plane is in a range of 1.65 mm to 1.95 mm. In some embodiments, the distance from the center O of the sound outlet 112 to the long-axis center plane is in a range of 1.75 mm to 1.85 mm. It should be noted that the distance from the center O of the sound outlet 112 to the long-axis center plane of the magnetic circuit assembly 1125 may be a shortest distance (i.e., a vertical distance) from the center O of the sound outlet 112 to the long-axis center plane of the magnetic circuit assembly 1125.

Figure 20A:
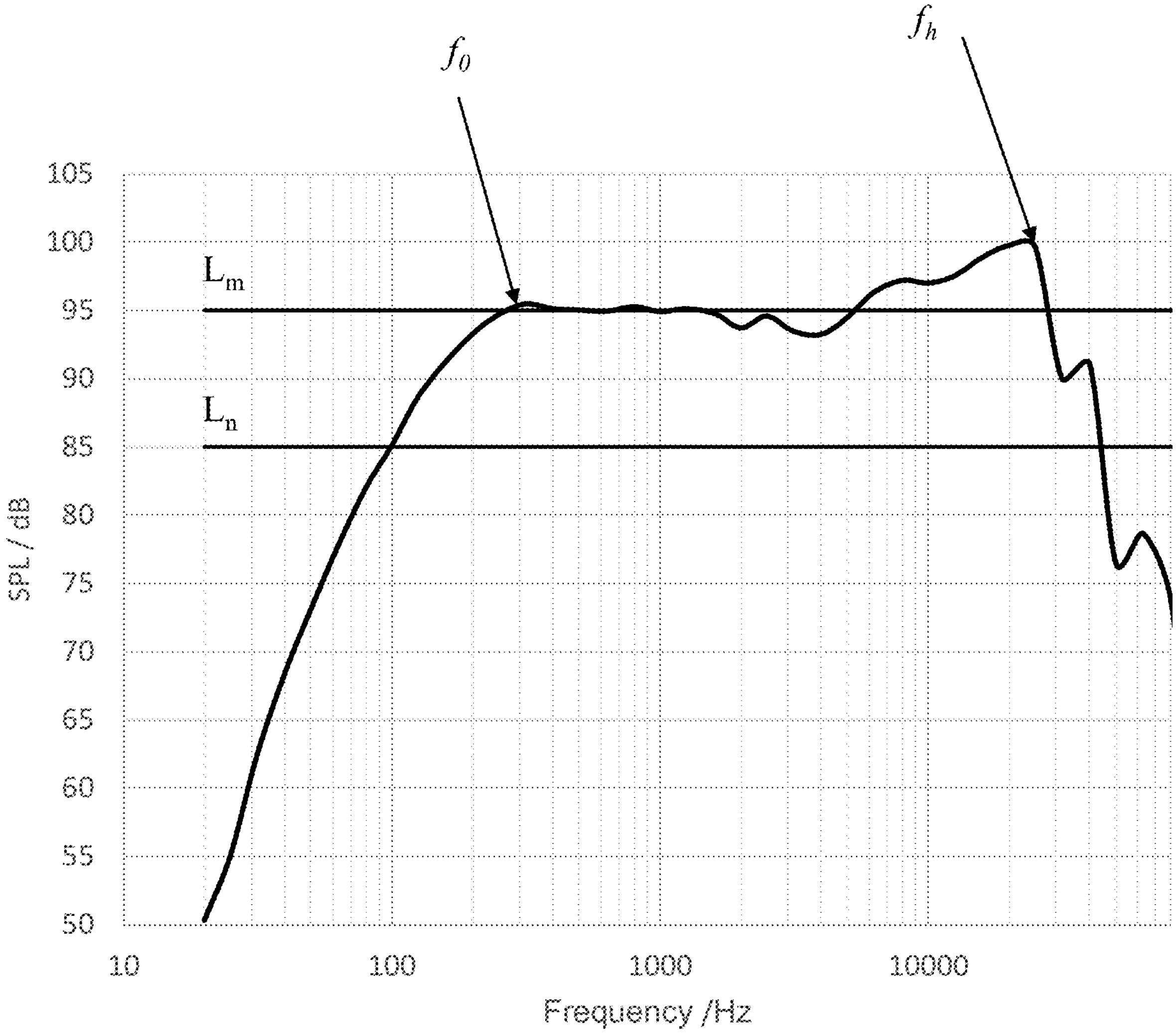
FIG. 20A is a schematic diagram illustrating a high frequency bandwidth of a sound production component according to some embodiments of the present disclosure.

FIG. 20A is a schematic diagram illustrating a high frequency bandwidth of a sound production component according to some embodiments of the present disclosure. As shown in FIG. 20A, there is a first inflection point $f_0$ in a low-frequency region of a frequency response curve of the sound production component 11, and a frequency corresponding to the first inflection point $f_0$ is approximately around 300 Hz. The first inflection point $f_0$ may be related to the softness, hardness of the folded-ring region 11212 of the diaphragm 1121, and a vibration weight (mainly a weight of the main-body region 11211). A frequency corresponding to a second inflection point $f_h$ is around 25 kHz, which may be determined based on an overall trend of the frequency response curve. When $f_h$=25 kHz, although there may be local small peaks on the frequency response curve, the overall trend may be in decreasing. Peak values of the frequency band between $f_0$ and $f_h$ (i.e., between 300 Hz-25 kHz) may be filtered to obtain an average value of the peak values to form a first reference line $L_m$, as shown in the upper straight line in FIG. 20A. A second straight line $L_n$ (as shown in the lower straight line in FIG. 20A) may be determined by decreasing the reference line $L_m$ with 10 dB, that is, a bandwidth is determined within a range of 100 Hz-45 kHz In some embodiments, a frequency of a high-frequency spilt vibration of the diaphragm 1121 may be proportional to E/ρ. E represents a Young's modulus of the diaphragm 1121. ρ represents an equivalent density of the diaphragm 1121. Therefore, E/ρ determines a high frequency bandwidth. When E is a fixed value, the less the mass of the diaphragm 1121 is, the less the equivalent density ρ of the diaphragm 1121 is, the greater the value of the E/ρ is, and the wider the high-frequency bandwidth is. When ρ is a fixed value, the greater the Young's modulus E of the diaphragm 1121 is, the greater the value of the E/ρ is, the greater a frequency of a high-frequency spilt vibration of the diaphragm 1121 is, and the wider the high-frequency bandwidth is.

In some embodiments, a region of the high-frequency spilt vibration of the sound production component 11 refers to a region where the frequency response curve reaches a peak, and the frequency response sharply decreases and alternates between peak and valley values. As shown in FIG. 20A, after the frequency response curve reaches the peak (i.e., a sound pressure level corresponding to a point of $f_h$), a region of right the point of $f_h$ where the frequency response sharply decreases and alternates between peak and valley values may be the region of the high-frequency spilt vibration. A frequency corresponding to a point at which the curve reaches the peak may be a frequency at which the high-frequency spilt vibration occurs (i.e., a point of $f_h$ as shown in FIG. 20A). In some embodiments, in order to avoid a significant difference in vibrations between different parts of the main-body region 11211, resulting in poor high-frequency performance, the frequency of high-frequency spilt vibration in the main-body region 11211 (the dome 11211*c*) may be adjusted to have a wide high-frequency bandwidth of the diaphragm 1121 while reducing the occurrence of high-frequency spilt vibrations within a bandwidth region. In some embodiments, a frequency of the high-frequency spilt vibration of the dome 11211*c* may be no less than 20 kHz. For example, the frequency of the high-frequency spilt vibration of the dome 11211*c* may be no less than 25 kHz. In some embodiments, in order to ensure that the output of the main-body region 11211 is high within an effective frequency band, a mass of the main-body region 11211 may need to be small to reduce a vibration difficulty of the main-body region 11211 within the effective frequency band. Therefore, a material and a structure with lower density and higher strength may be used for making the main-body region 11211. Therefore, the Young's modulus of the dome 11211*c* may be no less than 6 GPa. In some embodiments, the Young's modulus of the dome 11211*c* may be within a range of 6 GPa-7 GPa. For example, the Young's modulus of the dome 11211*c* may be 6.5 GPa. The Young's modulus of the dome 11211*c* may be measured by a static or a dynamic method (e.g., a pulse excitation method, an acoustic resonance method, a sound velocity method, etc.).

Figure 20B:
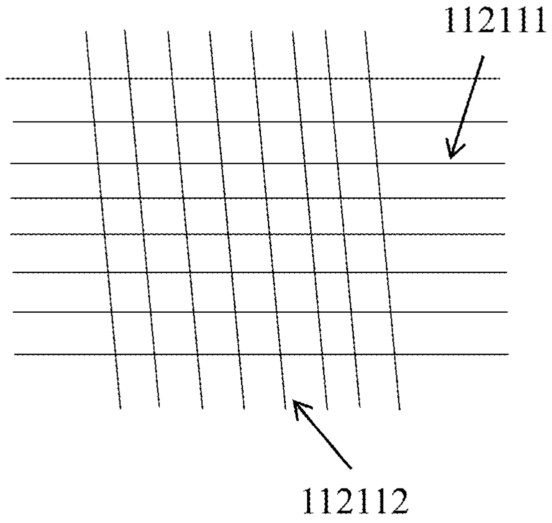
FIG. 20B is a schematic diagram illustrating an interlaced structure of carbon fibers according to some embodiments of the present disclosure.

In some embodiments, the main-body region 11211 may be made of a material of carbon fiber. FIG. 20B is a schematic diagram illustrating an interlaced structure of carbon fibers according to some embodiments of the present disclosure. The performances of the low density and high strength of the carbon fiber are beneficial for weakening a higher-order mode of the sound production component 11. In some embodiments, in order to further increase the strength of the main-body region 11211 and reduce the equivalent density of the main-body region 11211, the main-body region 11211 may be formed by carbon fibers arranged in an interlacing arrangement, and at least a portion of the carbon fibers may be interlaced at a first angle. In some embodiments, the first angle may be within a range of 45°-90°. For example, a plurality of independent carbon fibers may be interlaced at an angle such as 45°, 60°, 90°, etc. As shown in FIG. 20B, the plurality of carbon fibers 112111 and 112112 may be interlaced at an angle close to 90°. In some embodiments, due to a fine nature of carbon fibers, the plurality of carbon fibers 112111 and 112112 may be laid at an angle close to 90° and be connected based on an adhesive bonding. In some embodiments, the main-body region 11211 may include the interlacing arrangement structure with a plurality of layers (e.g., 2 layers, 3 layers, etc.) of carbon fibers. In order to facilitate the interlacing arrangement of carbon fibers, in some embodiments, a length of a single carbon fiber may not be less than 5 mm. In some embodiments, the length of the single carbon fiber may be within a range of 5 mm-10 mm. For example, the length of a single carbon fiber may be 7 mm. Due to the fine size of a single carbon fiber, it may be difficult to interlace the carbon fiber one by one, making it difficult to achieve the interlacing arrangement. In some embodiments, the plurality of carbon fibers may be interlaced and connected (e.g., through the adhesive bonding, etc.) to form a plurality of sets of carbon fibers, which may interlace in warp and weft.

In some embodiments, in order to reduce the weight of the main-body region 11211, a thickness of the main-body region 11211 may be adjusted using a super-aligned carbon fiber structure to obtain a specific high-frequency bandwidth. In some embodiments, the thickness of the main-body region 11211 may be less than 80 μm. In some embodiments, the thickness of the main-body region 11211 may be within a range of 10 μm-60 μm. In some embodiments, the thickness of the main-body region 11211 may be 25 μm.

Figure 21:
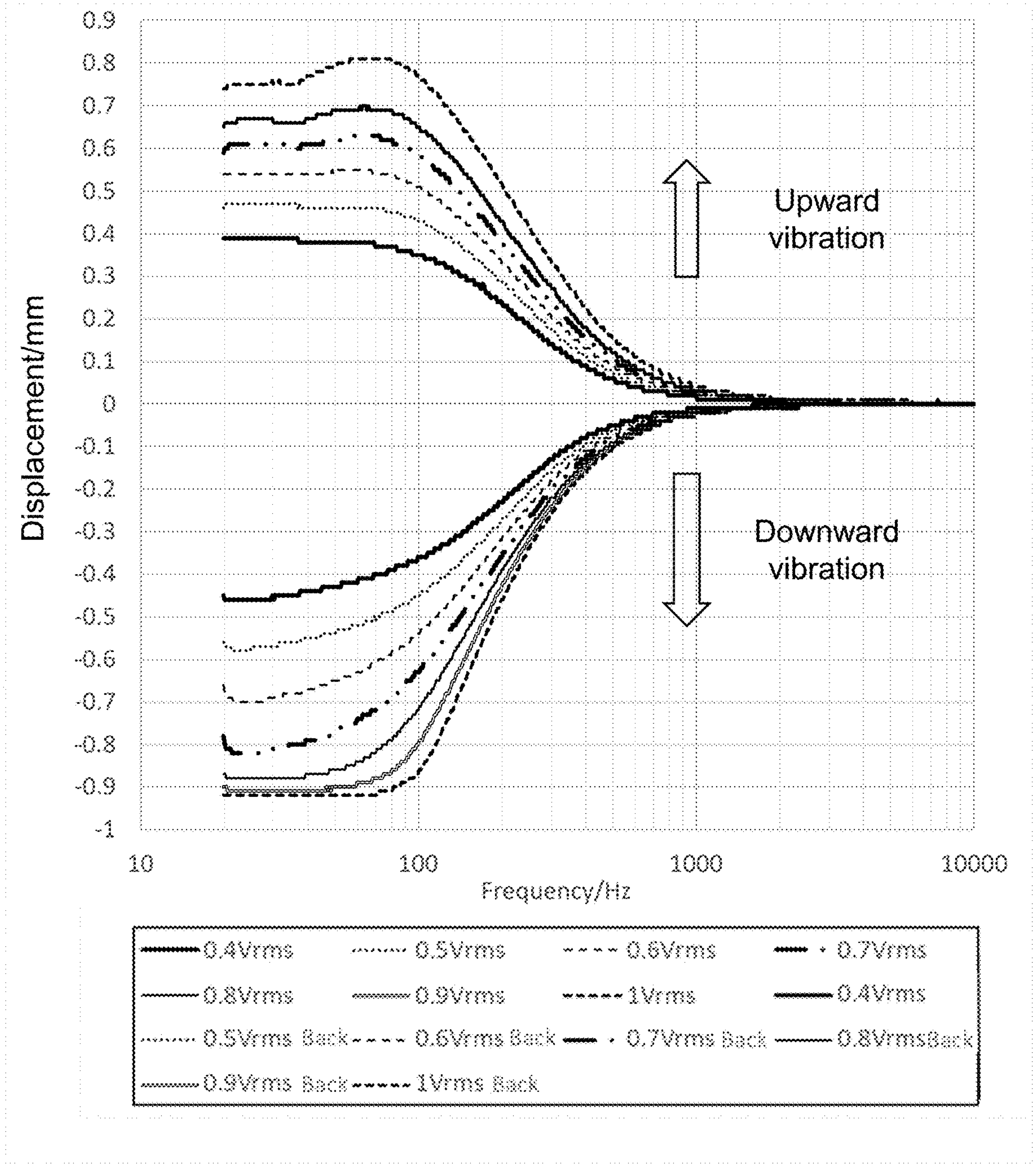
FIG. 21 is a schematic diagram illustrating amplitudes of a sound production component under different driving voltages according to some embodiments of the present disclosure.

FIG. 21 is a schematic diagram illustrating amplitudes of a sound production component under different driving voltages according to some embodiments of the present disclosure. As shown in FIG. 21, under the same voltage, an amplitude of the vibration of the diaphragm 1121 of the transducer 116 may be different in two opposite directions (as shown in a positive direction and a negative direction of a thickness direction Z in FIG. 16, i.e., the positive direction and the negative direction of a longitudinal axis in FIG. 21), which may be caused by an asymmetry of the diaphragm 1121. As shown in FIG. 21, a unit Vrms represents an effective voltage value of a sinusoidal AC signal. For example, 0.7 Vrms represents an effective voltage value of an input sinusoidal AC signal being 0.7V. As shown in FIG. 21, within a range of 0.4V-0.7V of the input voltage, an amplitude (about 0.8 mm) of the vibration of the diaphragm 1121 when the diaphragm 1121 vibrates downwards (towards a negative direction of the longitudinal axis) is greater than an amplitude (about 0.6 mm) of the vibration of the diaphragm 1121 when the diaphragm 1121 vibrates upwards (towards a positive direction of the longitudinal axis). The diaphragm 1121 vibrating upwards refers to the vibration of the diaphragm 1121 towards the front cavity 114, and the diaphragm 1121 vibrating downwards refers to the vibration of diaphragm 1121 towards the rear cavity 115 (towards the magnetic circuit component 1125). As shown in FIG. 21, as the input voltage continues to increase (e.g., from 0.7V to 1V), a change of the amplitude of the diaphragm 1121 may gradually decrease and eventually approach a threshold. The amplitude of diaphragm 1121 when the diaphragm 1121 vibrates upwards may approach a first threshold (about 0.9 mm), and the amplitude of the vibration of the diaphragm when the diaphragm 1121 vibrates upwards may approach a second threshold (about 0.8 mm). Due to the fact that the amplitude of the vibration of the diaphragm 1121 when the diaphragm 1121 vibrates downwards is greater than the amplitude of the vibration of the diaphragm 1121 when the diaphragm 1121 vibrates upwards, the amplitude of diaphragm 1121 mentioned in the present disclosure refers to the amplitude of the vibration of the diaphragm 1121 when the diaphragm 1121 vibrates downwards. In some embodiments, in order to avoid collision between the coil 1122 and the magnetic circuit component 1125 during vibration of the diaphragm 1121, a maximum amplitude of the diaphragm 1121 may not be exceed 0.8 mm. That is, the amplitude of the diaphragm 1121 may be within a range of 0 mm-0.8 mm. In some embodiments, the amplitude of diaphragm 1121 may be in a range of 0 mm-0.75 mm. In some embodiments, the amplitude of diaphragm 1121 may be within a range of 0 mm-0.7 mm.

In some embodiments, within the range of 0 mm-0.8 mm of the amplitude, a difference between two amplitudes of the diaphragm 1121 vibrating in two opposite directions (i.e., vibrating upwards and downwards) may be less than 0.05 mm to reduce the distortion of the transducer 116. In some embodiments, in order to further reduce the distortion of the transducer 116, the difference between the two amplitudes of the diaphragm 1121 vibrating in two opposite directions (i.e., vibrating upwards and downwards) may be less than 0.04 mm. In some embodiments, in order to further reduce the distortion of the transducer 116, the difference between the two amplitudes of the diaphragm 1121 vibrating in two opposite directions (i.e., vibrating upwards and downwards) may be less than 0.03 mm.

Referring to FIG. 17B with FIG. 18, in some embodiments, the bracket 1123 may be arranged around the magnetic circuit component 1125. As shown in FIG. 18, along the vibration direction of the diaphragm, the bracket 1123 may include the first part 112311, a second part 11232, and a third part 11233. The first part 112311 refers to a part along the vibration direction of the diaphragm 1121, from a highest point D of a region connecting the bracket 1123 and the diaphragm 1121 to the highest point of a region connecting the bracket 1123 and the accommodation member 11253. The second part 11232 refers to a region on the bracket 1123 where the air hole is opened. As shown in FIG. 18, the second part 11232 refers to a part along the vibration direction of the diaphragm 1121, from the highest point of the region connecting the bracket 1123 and the accommodation member 11253 to a side wall (i.e., side towards the bottom 11253*a* of the accommodating member 11253) where a bottom of the air hole on the bracket 1123 is located. The third part 11233 refers to a part between a side wall where the bottom of the air hole on the bracket 1123 is located and the bottom of the bracket 1123 near the magnetic circuit component 1125 (i.e., the bottom 11253*a* near the accommodation member 11253). As shown in FIG. 19, a second connecting section 11212*b* is provided at one end of the folded-ring region 11212 away from the main-body region 11211 for connecting the bracket 1123. The second connecting section 11212*b* may be arranged parallel to the short-axis direction Y and perpendicular to the vibration direction of the diaphragm. In some embodiments, the first part 112311 of the bracket 1123 may be connected to the second connecting section 11212*b* of the folded-ring region 11212. In some embodiments, the second connecting section 11212*b* of the folded-ring region 11212 may be connected to the first part 112311 of the bracket 1123 via a fixed ring 1155 to achieve a fixation of the diaphragm 1121 and the bracket 1123.

Figure 22:
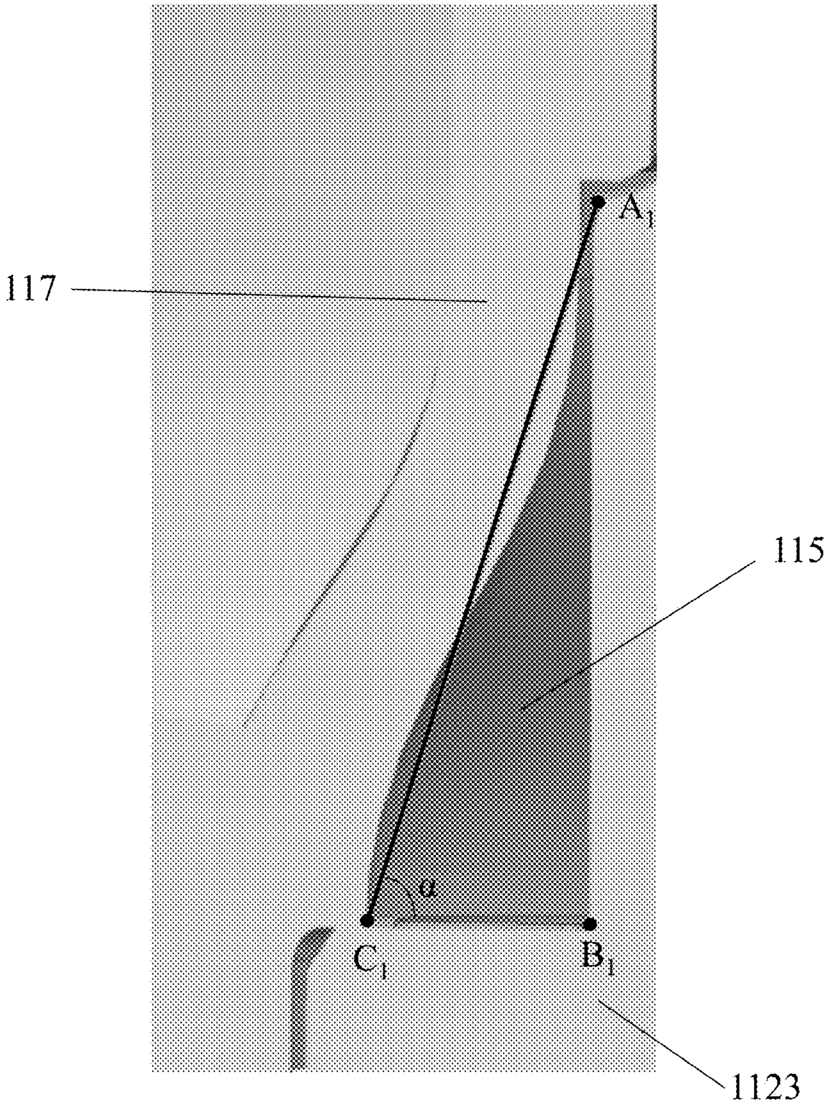
FIG. 22 is a structural diagram illustrating an exemplary structure of a part of a rear cavity according to some embodiments of the present disclosure.

FIG. 22 is a structural diagram illustrating an exemplary structure of a part of a rear cavity according to some embodiments of the present disclosure. Referring to FIG. 16 and FIG. 22, in some embodiments, the connecting bracket 117 may be provided in the housing 111, and a second acoustic cavity may be formed between the connecting bracket 117 and the bracket 1123 of the transducer 116, and the second acoustic cavity may serve as the rear cavity 115. The rear cavity 115 is spaced apart from other structures (e.g., a main control circuit board, etc.) in the housing 111, which is beneficial for improving the acoustic performance of the sound production component 11. The housing 111 is provided with a pressure relief hole (e.g., the first pressure relief hole 1131 and/or the second pressure relief hole 1132), and the connecting bracket 117 is provided with an acoustic channel 1151 connecting the pressure relief hole and the rear cavity 115, so as to facilitate the communication between the rear cavity 115 and the outside environment, i.e., air may freely flow in and out of the rear cavity 115, thereby reducing a resistance of the diaphragm 1121 of the transducer 116 during a vibration process.

In some embodiments, a cross-section of the rear cavity 115 may be composed of two vertical edges and a curved edge. When two endpoints of the curved edge are connected by a straight line, the cross-section (e.g., a cross-section $A_1B_1C_1$) may be designated as a triangle. The inclined edge $A_1C_1$ is a line connecting two endpoints formed by a curved surface on the connecting bracket 117 contacting with two straight edges of the bracket 1123. In some embodiments, a thickness $h_{41}$ of the first part 112311 of the bracket 1123 along the vibration direction of the diaphragm 1121 may affect a volume of the rear cavity 115. An increase in the thickness $h_{41}$ of the first part 112311 decreases the volume of the rear cavity 115 under a condition that an entire volume of the sound production component 11 remains unchanged. Correspondingly, with a decrease in the thickness $h_{41}$ of the first part 112311, the volume of the rear cavity 115 increases. In some embodiments, the thickness of the first part 112311 of the bracket 1123 may affect the volume of the rear cavity 115, and thus affecting a resonance frequency of the rear cavity 115. In some embodiments, the rear cavity 115 refers to a cavity formed by a rear side of the diaphragm. At this time, if the thickness $h_{41}$ of the first part 112311 of the bracket 1123 increases, the volume of the rear cavity 115 increases under a condition that the entire volume of the sound production component 11 remains unchanged. Accordingly, if the thickness $h_{41}$ of the first part 112311 decreases, the volume of the rear cavity 115 decreases.

Figure 23:
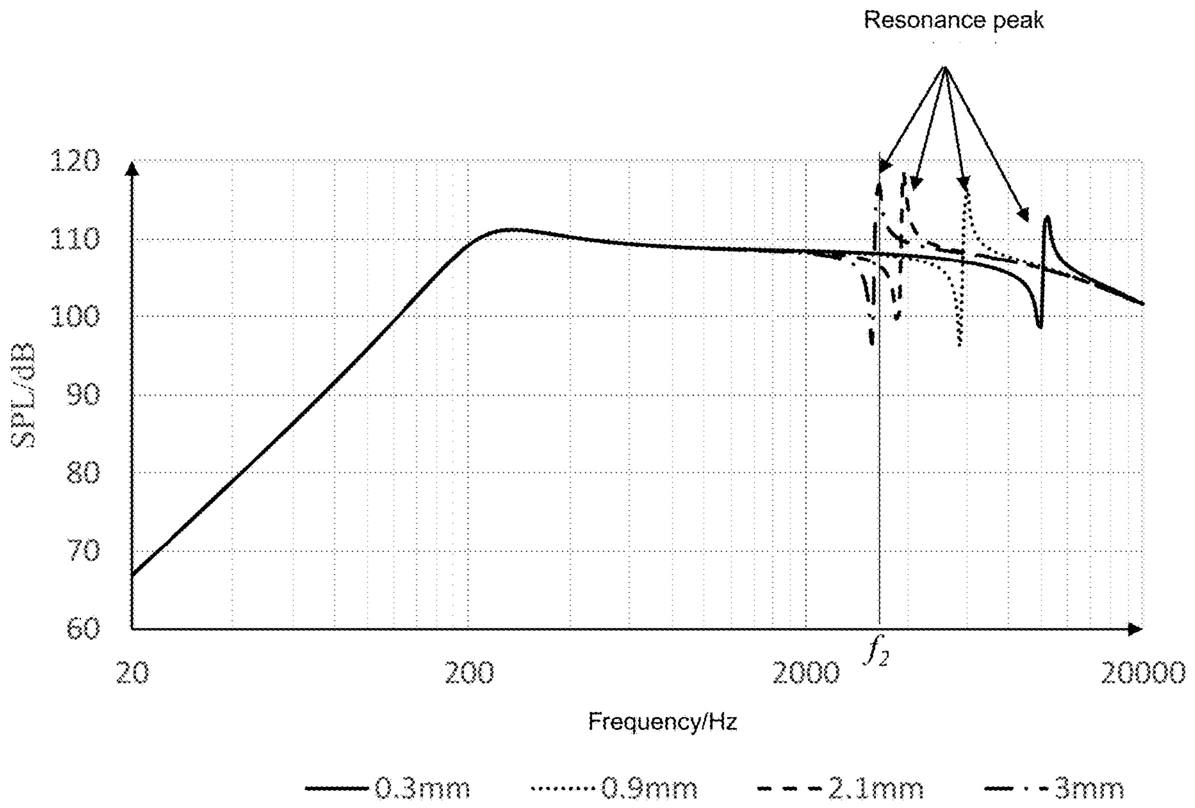
FIG. 23 is a schematic diagram illustrating a frequency response curve of rear cavities corresponding to different thicknesses of first parts according to some embodiments of the present disclosure.

FIG. 23 is a schematic diagram illustrating a frequency response curve of rear cavities corresponding to different thicknesses of first parts according to some embodiments of the present disclosure. As shown in FIG. 23, since the thickness $h_{41}$ of the first part 112311 of the bracket 1123 gradually increases from 0.3 mm to 3 mm, the volume of the rear cavity 115 gradually increases, and the resonance peak of the rear cavity 115 gradually moves towards the low frequency, reducing a flat range of the frequency response curve and affecting the output performance of the sound production component 11.

If the thickness $h_{41}$ of the first part 112311 is too small, the amplitude of the diaphragm 1121 may be limited by the bracket 1123. If the thickness $h_{41}$ of the first part 112311 is too large, a size of the sound production component 11 may be too large, thus causing the resonance peak of the rear cavity 115 to shift towards the low frequency, reducing the flat range of the frequency response curve of the rear cavity 115, affecting the sound quality of the sound production component 11. The thickness of the first part 112311 refers to a minimum distance between a connection region of the bracket 1123 and the folded-ring region 11212 and an attaching region of the bracket directly attaching to the magnetic circuit component 1125 in a vibration direction of the diaphragm.

In some embodiments, in order to achieve a high low-frequency output of the sound production component 11 and a wide range of flat range in the frequency response curve of the rear cavity 115, the thickness $h_{41}$ of the first part 112311 of the bracket 1123 may be within a range of 0.3 mm-3 mm. In some embodiments, in order to further enhance the low-frequency output of the transducer 116, the thickness $h_{41}$ of the first part 112311 of the bracket 1123 may be within a range of 0.5 mm-2 mm. In some embodiments, in order to further increase the flat area of the frequency response curve of the rear cavity 115, the thickness $h_{41}$ of the first part 112311 of the bracket 1123 may be within a range of 0.8 mm-1 mm. In some embodiments, the thickness $h_{41}$ of the first part 112311 of the bracket 1123 may be 0.9 mm, and the resonance peak of the rear cavity 115 may be around 6.1 kHz, and at this time, the sound production component 11 may have a good low-frequency output, and the frequency response curve of the rear cavity 115 may have a wide flat range.

In some embodiments, the weight of the transducer 116 may be mainly related to the bracket 1123 and the magnetic circuit component 1125, with magnetic circuit component

1125 accounting for a relatively large weight. In some embodiments, when the weight of bracket 1123 increases, while the material of bracket 1123 remains unchanged, a size of bracket 1123 may increase, and an area of the diaphragm 1121 may increase correspondingly. In some embodiments, the increase in the weight of the magnetic circuit assembly 1125 may increase a magnetic flux density near the coil 1122 and a driving force on the coil, thus making the amplitude of the vibration of the diaphragm 1121 great, and making the transducer 116 have a good sensitivity and a good low-frequency effect. However, if the weight of the transducer 116 is too large, the weight of the sound production component 11 may be too large, affecting the stability and comfort of the open headphone 10.

Combining the above two wearing situations in which at least a part of the sound production component 11 shown in FIG. 7 covers the antihelix and in which a whole or the part of the sound production component 11 shown in FIG. 13 extends into the cavum concha, a volume of sound that may be heard in the ear 100 is increased (equivalent to a higher speaking efficiency). Therefore, the weight of the transducer 116 may be reduced by reducing the size of the diaphragm 1121 or the weight of the magnetic circuit component 1125, thus providing the high sensitivity and the low-frequency output of the transducer 116, while making the open headphone 10 have the high wearing stability and comfort. In some embodiments, the weight of the transducer 116 may be within a range of 1.1 g-3.3 g. In some embodiments, in order to further improve the sensitivity and low-frequency output of the transducer 116, the weight of the transducer 116 may be within a range of 1.5 g-3 g. In some embodiments, in order to further improve the wearing stability and comfort of the open headphone 10, the weight of the transducer 116 may be within a range of 2 g-2.5 g. In some embodiments, the weight of the transducer 116 may be 2.2 g.

Figure 24:
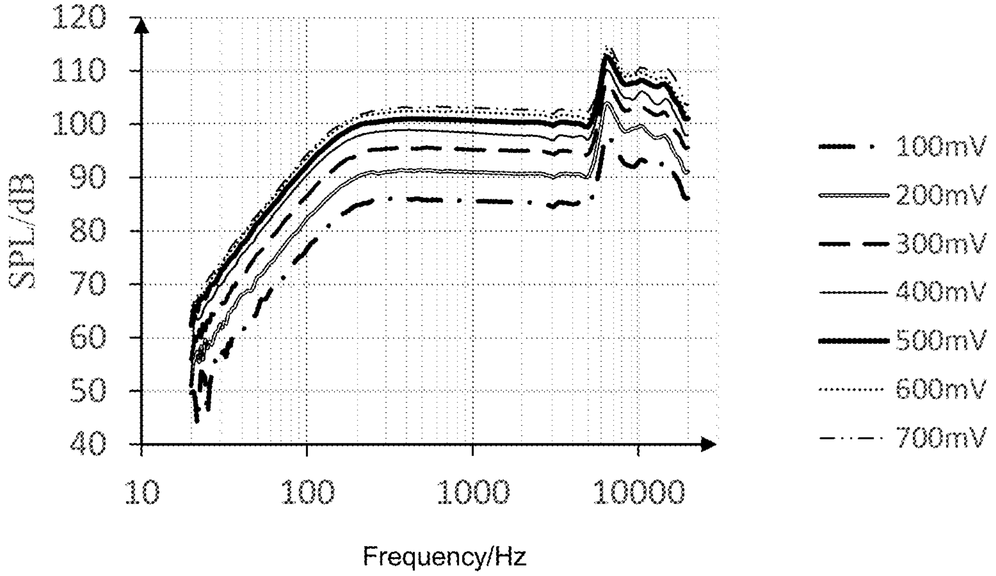
FIG. 24 is a schematic diagram illustrating a frequency response curve of a sound production component under different driving voltages according to some embodiments of the present disclosure.

FIG. 24 is a schematic diagram illustrating a frequency response curve of a sound production component under different driving voltages according to some embodiments of the present disclosure. If placing a diaphragm surface of the transducer 116 facing a test microphone with a distance of 4 mm, applying a voltage within a range of 0.1V-0.7V to the transducer 116, and setting a test frequency range within 20 Hz-2000 Hz, a frequency response curve (as shown in FIG. 24) of the transducer 116 under different driving voltages may be obtained. In combination of FIG. 21 and FIG. 24, the amplitude of diaphragm 1121 may be within a range of 0 mm-0.8 mm when the input voltage is within a range of 0.1V-0.7V and the frequency is within a range of 20 Hz-6.1 kHz. At this point, in order to prevent the vibration of coil 1122 from contacting the bottom 11253*a* of the accommodation member, a distance $h_{31}$ (as shown in FIG. 18) between the bottom of coil 1122 and the bottom 11253*a* of the accommodation member may be greater than 0.8 mm. In some embodiments, in order to reduce the size of the sound production component 11 and improve user comfort during wearing, the distance $h_{31}$ (as shown in FIG. 18) between the bottom of the coil 1122 and the bottom of the accommodation member 11253*a* may not exceed 0.9 mm. Therefore, with an input voltage of 0.1 V-0.7V and a frequency within a range of 20 Hz-6.1 kHz, the distance $h_{31}$ (as shown in FIG. 18) between the bottom of the coil 1122 and the bottom of the accommodation member 11253*a* may be within a range of 0.8 mm-0.9 mm.

As shown in FIG. 24, since the input voltage gradually increases from 100 mV to 700 mV, the output of the sound production component 11 may gradually increase, and the sensitivity may also gradually increase. However, a frequency of the resonance peak may remain basically unchanged, which may be located near 6.1 kHz. Taking into account the two wearing situations where at least a portion of the sound production component 11 shown in FIG. 7 covers the antihelix and the overall or a portion of the sound production component 11 extends into the cavum concha as shown in FIG. 13, by controlling the distance $h_{31}$ (as shown in FIG. 18) between the bottom of the coil 1122 and the bottom of the accommodation member 11253*a* within a range of 0.8 mm-0.9 mm, the sensitivity of the sound production component 11 may be relatively high. As shown in FIG. 24, when the input voltage is within a range of 100 mV-700 mV, a sound pressure level (SPL) of the sound production component 11 may be within a range of 85 dB-103 dB at a frequency of 1 kHz.

In some embodiments, as described above, the thickness $h_{41}$ of the first part 112311 of bracket 1123 may be within a range of 0.3 mm-3 mm. When the thickness $h_{41}$ of the first part 112311 increases to 3 mm, the resonance frequency f2 of the rear cavity 115 may decrease to 3.3 kHz, thus reducing the flat range and affecting the sound quality. In some embodiments, in order to increase the flat range and improve the sound quality of the sound production component 11, the thickness $h_{41}$ of the first part 112311 may be less than 3 mm, and the resonance frequency f2 of the rear cavity 115 may be no less than 3.3 kHz. In some embodiments, in order to further improve the sound quality of the sound production component 11, the resonance frequency f2 of the rear cavity 115 may be no less than 3.5 kHz. In some embodiments, in order to further improve the sound quality of the sound production component 11, the resonance frequency f2 of the rear cavity 115 may be no less than 4 kHz. In some embodiments, in order to further improve the sound quality of the sound production component 11, the resonance frequency f2 of the rear cavity 115 may be no less than 6 kHz.

In some embodiments, in order to enable a second leakage sound formed by the pressure relief hole 113 to better cancel each other out with a first leakage sound formed by the sound outlet 112 in a far field, the resonance frequency f2 of the rear cavity may be close to or equal to a resonance frequency $f_1$ of the front cavity 114. In some embodiments, a difference between the resonance frequency of the rear cavity and the resonance frequency of the front cavity is less than 300 Hz. In some embodiments, the difference between the resonance frequency of the rear cavity and the resonance frequency of the front cavity is less than 200 Hz. In some embodiments, the difference between the resonance frequency of the rear cavity and the resonance frequency of the front cavity is less than 100 Hz. In some embodiments, the difference between the resonance frequency of the rear cavity and the resonance frequency of the front cavity is less than 80 Hz. In some embodiments, the difference between the resonance frequency of the rear cavity and the resonance frequency of the front cavity is less than 40 Hz. In some embodiments, the difference between the resonance frequency of the rear cavity and the resonance frequency of the front cavity is less than 20 Hz.

In some embodiments, according to Equation (2), the volume of the rear cavity 115 may affect the resonance frequency $f_2$ of the rear cavity 115. And the volume of the rear cavity 115 may be affected by the thickness $h_{41}$ of the first part 112311 of the bracket 1123. A range of the volume of the rear cavity 115 may be determined by a range of the thickness $h_{41}$ of the first part 112311 and the resonance frequency $f_2$ of the rear cavity 115. In some embodiments, the volume of the rear cavity 115 may be within a range of 60 $mm^3$-110 $mm^3$.

Figure 25:
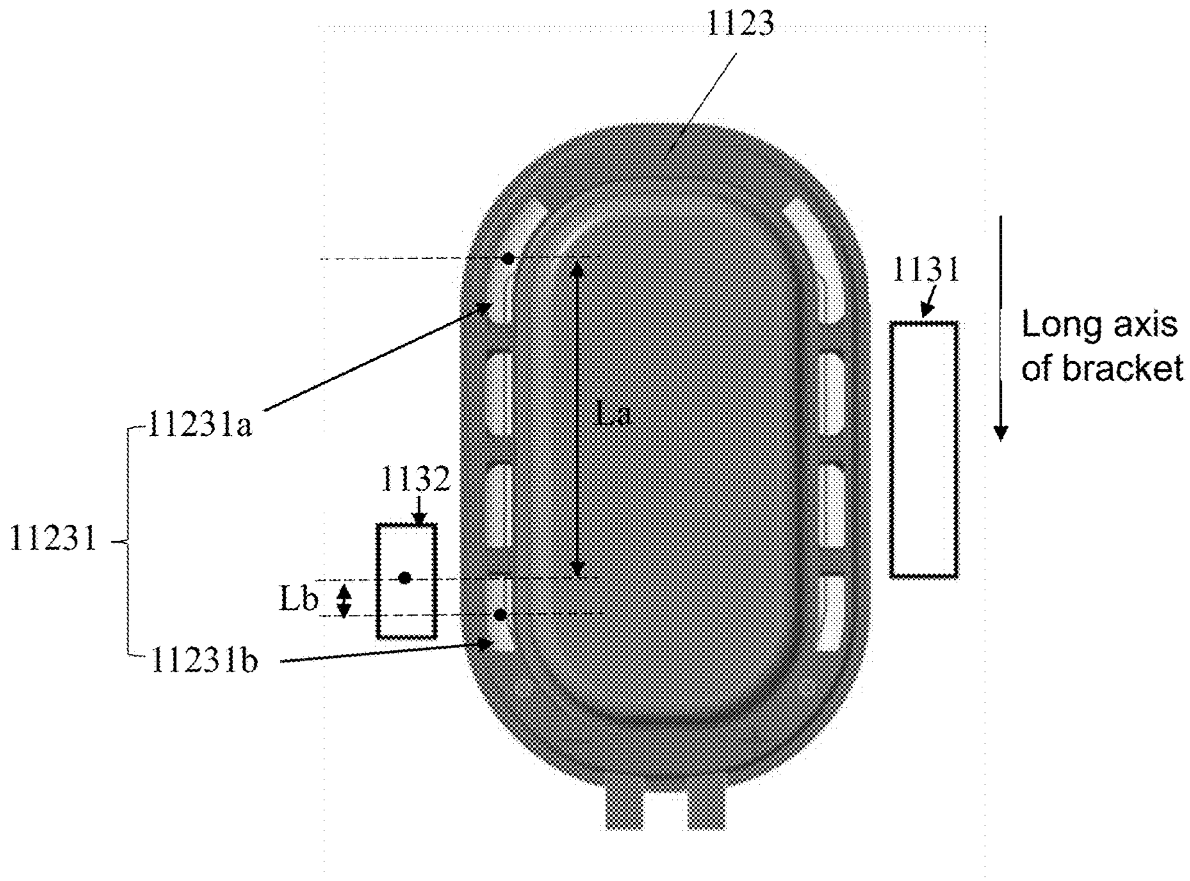
FIG. 25 is a schematic diagram illustrating positions of a bracket, a first pressure relief hole, and a second pressure relief hole according to some embodiments of the present disclosure.

FIG. 25 is a schematic diagram illustrating positions of a bracket, a first pressure relief hole, and a second pressure relief hole according to some embodiments of the present disclosure. As shown in FIG. 25, in some embodiments, the bracket 1123 may be provided with a plurality of air holes 11231. The arrangement of the plurality of air holes 11231 may allow sound on a back surface of the diaphragm 1121 to be transmitted to the rear cavity 115 and the at least one pressure relief hole based on the plurality of air holes 11231, thus providing a good channel for radiating sound on both sides of the diaphragm 1121.

In some embodiments, in order to better balance an airflow and balance an air pressure in the rear cavity 115, the plurality of air holes 11231 may be arranged asymmetrically. For example, with a short axis of the bracket 1123 as a center, the plurality of air holes 11231 may be arranged asymmetrically. Specifically, the bracket 1123 may be provided with a first air hoe 11231*a* and a second air hole 11231*b*. As shown in FIG. 25, a distance La from a center of the first air hole 11231*a* to a center of the second pressure relief hole 1132 may be greater than a distance Lb from a center of the second air hole 11231*b* to a center of the second pressure relief hole 1132. In some embodiments, the air pressure in a position farther than a position of the second pressure relief hole 1132 in the rear cavity 115 may be relatively high. Therefore, in order to balance the air pressure in the rear cavity 115, an area of the first air hole 11231*a* may be greater than an area of the second air hole 11231*b*. That is, in order to balance the air pressure inside the rear cavity 115, an area of an air hole closer to the second pressure relief hole 1132 (or the first pressure relief hole 1131) may be smaller, and an area of an air hole farther away from the second pressure relief hole 1132 (or first pressure relief hole 1131) may be greater. The distance from the air hole 11231 to the pressure relief hole refers to a distance between a center of the air hole 11231 and a center of a pressure relief hole. The center of the air hole or the pressure relief hole in the present disclosure refers to a centroid of a porous structure.

In the rear cavity 115, the air pressure in a position farther than a position of the first pressure relief hole 1131 and/or the second pressure relief hole 1132 in the rear cavity 115 may be relatively high, so the area of the air hole 11231 may be greater. With a position closer to the first pressure relief hole 1131 and/or the second pressure relief hole 1132, the air pressure may lower, so the area of the air hole 11231 may be less. If the area of the plurality of air holes 11231 is the same, the position far from the first pressure relief hole 1131 and/or the second pressure relief hole 1132 in the rear cavity 115 may result in higher air pressure. Due to the small area of the plurality of air holes 11231, the air pressure in the rear cavity 115 cannot be well balanced, which may cause a great air resistance to the vibration of the diaphragm 1121. Similarly, in the position near the first pressure relief hole 1131 and/or the second pressure relief hole 1132 in the rear cavity 115, the diaphragm 1121 may be applied less resistance during vibration. As a result, the force on diaphragm 1121 is uneven, making the vibration of diaphragm 1121 unstable. Therefore, by adjusting the area of the plurality of air holes 11231, the low-frequency vibration of the sound production component 11 may be smooth.

In some embodiments, due to the fact that the air hole 11231 may balance the air pressure in the rear cavity 115, the uniformity of the air resistance experienced by the diaphragm 1121 during vibration may be affected. Therefore, a total area of the plurality of air holes 11231 may affect the output performance of the sound production component 11. A ratio of the total area of the plurality of air holes 11231 to an area of a projection of the diaphragm 1121 in a vibration direction of the diaphragm may affect the air resistance of the diaphragm 1121 during vibration. If the ratio of the total area of the plurality of air holes 11231 to the area of the projection of the diaphragm 1121 in a vibration direction of the diaphragm is too small, the air pressure in the rear cavity 115 may be high, and the diaphragm 1121 may experience greater air resistance during vibration, thus affecting the low-frequency output performance of the diaphragm 1121. If the ratio of the total area of the plurality of air holes 11231 to the area of the projection of the diaphragm 1121 in a vibration direction of the diaphragm reaches a certain threshold, increasing the ratio may weaken an influence of the air in the rear cavity 115 on the vibration of the diaphragm 1121, and also affect a structural strength of the bracket. Therefore, in some embodiments, in order to make the diaphragm 1121 to be experienced a uniform and small air resistance during vibration, and ensure the good output performance of the sound production component 11, the ratio of the total area of the plurality of air holes 11231 to the area of the projection of the diaphragm 1121 in a vibration direction of the diaphragm may be in a range of 0.008-0.3. In some embodiments, in order to further reduce the air resistance experienced by the diaphragm 1121 during vibration, the ratio of the total area of the plurality of air holes 11231 to the area of the projection of the diaphragm 1121 in a vibration direction of the diaphragm may be in a range of 0.1 to 0.25. In some embodiments, in order to further reduce the air resistance experienced by the diaphragm 1121 during vibration, the ratio of the total area of the plurality of air holes 11231 to the area of the projection of the diaphragm 1121 in a vibration direction of the diaphragm may be in a range of 0.11 to 0.23.

Figure 26:
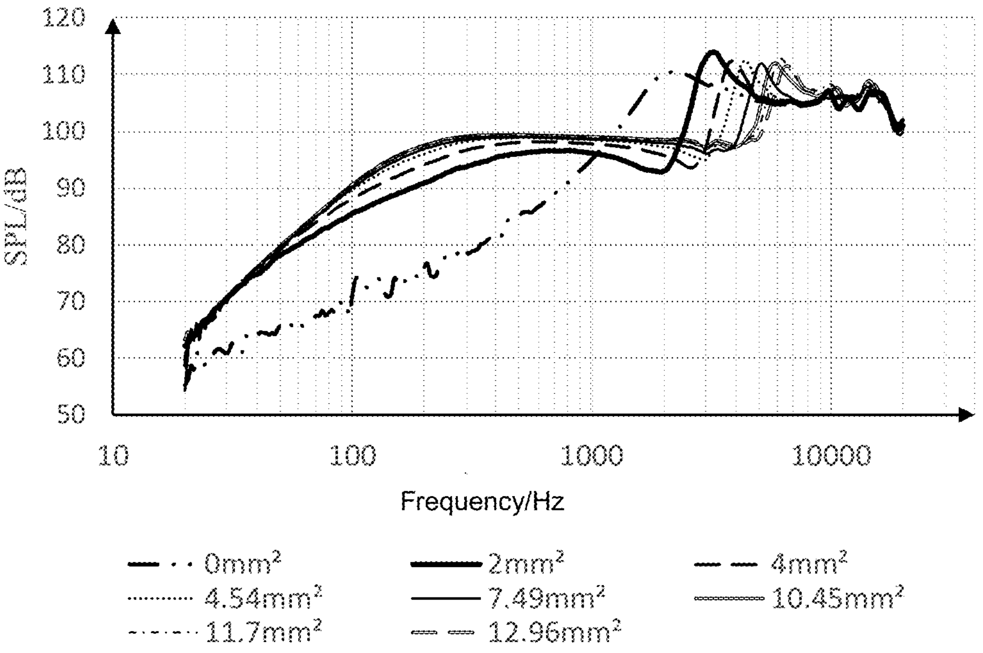
FIG. 26 is a schematic diagram illustrating a frequency response curve of rear cavities corresponding to different total areas of a plurality of air holes according to some embodiments of the present disclosure.

FIG. 26 is a schematic diagram illustrating a frequency response curve of rear cavities corresponding to different total areas of a plurality of air holes according to some embodiments of the present disclosure. The different total areas of the plurality of air holes 11231 may be achieved by using plasticine to block a portion of the plurality of air holes 11231. Placing the diaphragm of the transducer 116 facing the test microphone with a distance of 4 mm, applying a voltage of 0.4V to the transducer 116, and setting a test frequency range within 20 Hz-2000 Hz, the frequency response curve (as shown in FIG. 26) of the transducer 116 under different total areas of a plurality of air holes may be obtained. 0 $mm^2$ refers to that the plurality of air holes 11231 are completely blocked. That is, there are no holes on the bracket. As shown in FIG. 26, as the total area of the plurality of air holes 11231 gradually increases from 0 $mm^2$ to 4.54 $mm^2$, the frequency response curve of the rear cavity 115 may gradually move up in the low-frequency region (e.g., 100 Hz to 1000 Hz), indicating that the low-frequency response of the rear cavity 115 may gradually increase. When the total area of the plurality of air holes 11231 gradually increases from 4.54 $mm^2$ to 12.96 $mm^2$, the low-frequency response of the rear cavity 115 may not change significantly, because when the total area of the plurality of air holes 11231 increases to a certain value (e.g., 4.54 $mm^2$), the influence of the air in the rear cavity 115 on the vibration of the diaphragm 1121 may gradually weaken under the low-frequency vibration. Therefore, even if the total area of the plurality of air holes 11231 still increases, the effect on the frequency response curve of the low-frequency region of the rear cavity 115 may not be significant.

As shown in FIG. 26, as the total area of the plurality of air holes 11231 gradually increases from 0 $mm^2$ to 12.96 $mm^2$, the resonance peak of the rear cavity 115 may gradually shift towards high frequency, and the frequency response curve in the low frequency region (e.g., 100 Hz-1000 Hz) may gradually flatten. In some embodiments, in order to achieve the good low-frequency response in the rear cavity 115, the total area of the plurality of air holes 11231 may be in a range of 4.54 $mm^2$-12.96 $mm^2$. In some embodiments, in order to achieve the good low-frequency response in the rear cavity 115, the total area of the plurality of air holes 11231 may be in a range of 5 $mm^2$ to 11 $mm^2$. In some embodiments, in order to achieve the good low-frequency response in the rear cavity 115, the total area of the plurality of air holes 11231 may be in a range of 7 $mm^2$-10 $mm^2$. In some embodiments, in order to achieve good low-frequency response in the rear cavity 115, the total area of the plurality of air holes 11231 may be in a range of 8 $mm^2$-10 $mm^2$.

In some embodiments, in order to maintain uniformity of sound pressure at the front and rear sides of the diaphragm, a ratio of the total area of the plurality of air holes 11231 to a cross-sectional area of the sound outlet 112 may be in a range of 0.25-1.60. In some embodiments, the ratio of the total area of the plurality of air holes 11231 to the cross-sectional area of the sound outlet 112 is in a range of 0.38-1.48. In some embodiments, the ratio of the total area of the plurality of air holes 11231 to the cross-sectional area of the sound outlet 112 is in a range of 0.58-1.28. In some embodiments, the ratio of the total area of the plurality of air holes 11231 to the cross-sectional area of the sound outlet 112 is in a range of 0.78-0.98.

In some embodiments, in order to improve the structural strength, the bracket 1123 may be provided with the plurality of air holes 11231, and a connecting part between the plurality of air holes 11231 may be provided a reinforcing rib. In some embodiments, in order to simplify the opening process while meeting a requirement of the total area of the plurality of air holes 11231, a count of the plurality of air holes 11231 may be one.

In some embodiments, the bottom **11253*a* or the side wall 11253*b* of the accommodation member 11253 of the magnetic circuit component 1125 may also have a plurality of air holes. The sound on the back surface of the diaphragm 1121 may be transmitted to the rear cavity 115 and the at least one pressure relief hole based on the plurality of air holes, which may provide a good channel for radiating sound on both sides of diaphragm 1121**.

In some embodiments, the area of the projection of the diaphragm 1121 in the vibration direction of the diaphragm 1121 may affect an amount of air pushed by the diaphragm 1121 during vibration, thereby affecting the efficiency of the diaphragm 1121 in producing sound during vibration and affecting the acoustic output effect of the sound production component 11. If the area of the projection of the diaphragm 1121 in the vibration direction of diaphragm 1121 is too small, less air may be pushed by the vibration of diaphragm 1121, and the acoustic output effect of the sound production component 11 may be poor. If the area of the projection of the diaphragm 1121 in the vibration direction of diaphragm 1121 is too large, a size of the bracket 1123 may be too large, resulting in an increase in the weight of the bracket 1123, making the weight of the sound production component 11 great, affecting the structure and weight of the sound production component 11, and affecting wearing comfort and stability. Combining the two wearing situations where at least a portion of the sound production component 11 shown in FIG. 7 covers the antihelix and the overall or a portion of the sound production component 11 extends into the cavum concha as shown in FIG. 13, the audible volume of the ear 100 may increase (equivalent to the higher vocal efficiency), so the size of the diaphragm 1121 may not need to be too large. In some embodiments, the sound outlet 112 may be arranged on a side wall of the housing 111 of the sound production component 11 close to the ear of the user, while the sound outlet 112 may be arranged on a front side of the diaphragm 1121 and connected with the front cavity 114. The vibration direction of the diaphragm 1121 may be or may approximately be equal to the thickness direction Z of the sound production component 11. The area of the projection of the diaphragm 1121 in the vibration direction may be or may approximately be equal to an area of a projection of the diaphragm 1121 in the sagittal plane. The area of the projection of the diaphragm 1121 in the vibration direction of the diaphragm 1121 may affect the area of the projection of the sound production component 11 on the sagittal plane of the user. An overlap ratio of the area of the projection of the sound production component 11 on the sagittal plane to an area of a projection of the cavum concha of the user on the sagittal plane may affect the cavity-like structure formed by the sound production component 11 extending into the cavum concha, thus affecting the acoustic output effect of the sound production component 11. Further, a size of a long axis and a size of a short axis of the diaphragm 1121 may affect a size of a long axis and a size of a short axis of the projection of the sound production component 11 on the sagittal plane.

In some embodiments, considering the two wearing situations where at least a portion of the sound production component 11 shown in FIG. 7 covers the antihelix and the overall or a portion of the sound production component 11 extends into the cavum concha as shown in FIG. 13, in order to enable the sound production component 11 to have a good acoustic output effect, and the area the projection of the sound production component 11 on the sagittal plane or the thickness of the sound production component 11 is appropriate, the area of the projection of diaphragm 1121 in the vibration direction of the diaphragm 1121 may be within a range of 90 $mm^2$-560 $mm^2$. Preferably, the area of the projection of diaphragm 1121 in the vibration direction of the diaphragm 1121 may be within a range of 120 $mm^2$-300 $mm^2$. Preferably, the area of the projection of diaphragm 1121 in the vibration direction of the diaphragm 1121 may be within a range of 150 $mm^2$-200 $mm^2$.

In some embodiments, the larger the projection area of the diaphragm 1121 along the direction of vibration, the larger the volume of the front cavity 114 may be. According to Equation (2), the resonance frequency $f_1$ of the front cavity is positively correlated with the cross-sectional area of the sound outlet 112, and the resonance frequency $f_1$ of the front cavity is negatively correlated with the volume of the front cavity. Thus, in some embodiments, in order to enable the overall frequency response curve of the sound production component to have a wide flat region, the resonance frequency $f_1$ of the front cavity needs to be in a relatively high frequency range (e.g., greater than 3 kHz), and the ratio of the cross-sectional area of the sound outlet 112 to the projection area of the diaphragm 1121 along the vibration direction may be in a range of 0.08-0.32. In some embodiments, the ratio of the cross-sectional area of the sound outlet 112 to the projection area of the diaphragm 1121 along the vibration direction may be in a range of 0.15-0.25. In some embodiments, the ratio of the cross-sectional area of the sound outlet 112 to the projection area of the diaphragm 1121 along the vibration direction may be in a range of 0.17-0.22.

Considering the two wearing situations where at least a portion of the sound production component 11 shown in FIG. 7 covers the antihelix and the overall or a portion of the sound production component 11 extends into the cavum concha as shown in FIG. 13, in order to maximize the area of the diaphragm 1121 within a limited size of the sound production component 11 and enhance the acoustic output performance of the sound production component 11, in some embodiments, when the vibration direction of the diaphragm 1121 is parallel to the thickness direction Z of the sound production component 11, the ratio of the area of the projection of the diaphragm 1121 in the vibration direction of the diaphragm (i.e., the area of the projection of the diaphragm 1121 on the sagittal plane) to an area of a projection of the housing 111 in the vibration direction of the diaphragm (i.e., an area of a projection of the housing 111 on the sagittal plane) may not be less than 0.5. In some embodiments, in order to maximize the area of the diaphragm 1121 within the limited size of the sound production component 11, thereby enhancing the acoustic output performance of the sound production component 11, the ratio of the area of the projection of the diaphragm 1121 in the vibration direction of the diaphragm to an area of a projection of the housing 111 in the vibration direction of the diaphragm may not be less than 0.8. In some embodiments, in order to maximize the area of the diaphragm 1121 within the limited size of the sound production component 11, thereby enhancing the acoustic output performance of the sound production component 11, the ratio of the area of the projection of the diaphragm 1121 in the vibration direction of the diaphragm to an area of a projection of the housing 111 in the vibration direction of the diaphragm may be within a range of 0.8-0.95.

In some embodiments, combined with the wearing situation where at least a portion of the sound production component 11 shown in FIG. 7 covers the antihelix, the size of the long axis of the diaphragm 1121 may be within a range of 13 mm-25 mm, and the size of the short axis of the diaphragm may be within a range of 4 mm-13 mm. In combination with the wearing situation where the overall or a portion of the sound production component 11 extends into the cavum concha as shown in FIG. 13, in order to facilitate the overall or a portion of the sound production component 11 extending into the cavum concha to form an effective cavity-like structure, the size of the short axis of the diaphragm 1121 may be within a range of 4 mm-13 mm. Based on the size of the short axis mentioned above, and based on the area of the projection of the diaphragm 1121 in the vibration direction of the diaphragm (e.g., the area of the projection of the diaphragm 1121 in the vibration direction being within a range of 52 $mm^2$-325 $mm^2$), the size of the long axis of the diaphragm 1121 may further be determined to be within a range of 13 mm-25 mm. For example, the size of the long axis of diaphragm 1121 may be within a range of 15 mm-20 mm, and the size of the short axis of the diaphragm may be within a range of 5 mm-10 mm. For example, the size of the long axis of the diaphragm 1121 may be within a range of 17 mm-18 mm, and the size of the short axis of the diaphragm may be within a range of 7 mm-8 mm.

Figure 27A:
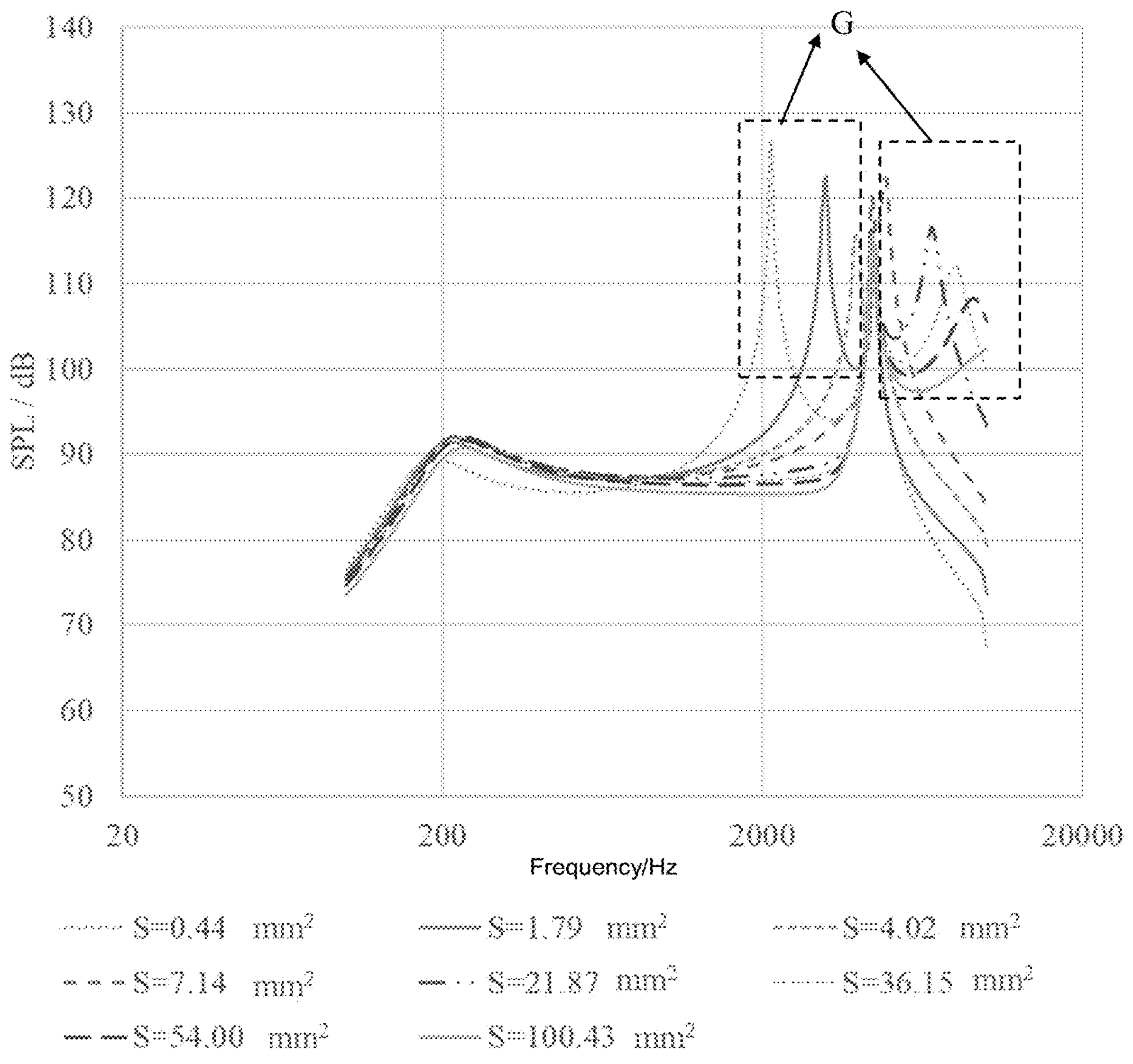
FIG. 27A is a frequency response curve diagram of an open earphone corresponding to sound outlets of different cross-sectional areas at a certain aspect ratio according to some embodiments of the present disclosure.

FIG. 27A is a frequency response curve diagram of an open earphone corresponding to sound outlets of different cross-sectional areas at a certain aspect ratio according to some embodiments of the present disclosure. FIG. 27A illustrates frequency response curves corresponding to the open earphone 10 when the other structures (e.g., the pressure relief hole 113, the volume of the rear cavity, etc.) are fixed and when the aspect ratio of the sound outlet is fixed, and when the cross-sectional area of the sound outlet is in a range of 0.44 $mm^2$ to 100.43 $mm^2$. As can be seen from FIG. 27A, under the above conditions, as the cross-sectional area S of the sound outlet 112 gradually increases, the resonance frequency f1 (i.e., a frequency corresponding to the resonance peak in the dotted circle G) corresponding to the front cavity in the frequency response curve of the open earphone 10 gradually shifts to high frequency, and then the resonance frequency corresponding to the rear cavity remains at about 4.5 kHz. Specifically, as the cross-sectional area S of the sound outlet 112 increases, the resonance peak of the front cavity gradually moves to high frequency. When the resonance peak of the front cavity moves to about 4.5 kHz, the resonance frequencies of the front cavity and the rear cavity may be basically equal, and during this process, the peak value of the resonance peak remains basically unchanged. After the resonance peak of the front cavity moves to 4.5 kHz, if the cross-sectional area S of the sound outlet 112 continues to be increased, the peak value of the resonance peak of the front cavity shows a clear tendency to gradually decrease. Therefore, in some embodiments, in order to make the frequency response curve of the open earphone 10 have a wide flat region, the cross-sectional area S of the sound outlet 112 may be larger than 2.87 $mm^2$. Preferably, in order to make the frequency response curve of the open earphone 10 flat in a range of 100 Hz to 2.3 kHz, the cross-sectional area S of the sound outlet 112 may be larger than 4.0 $mm^2$. Preferably, in order to make the frequency response curve of the open earphone 10 flat in a range from 100 Hz to 3.3 kHz, the cross-sectional area S of the sound outlet 112 may be larger than 7.0 $mm^2$.

Further, within a certain cross-sectional area S of the sound outlet 112, as the cross-sectional area S of the sound outlet 112 increases, the resonance peak of the front cavity gradually decreases while moving to high frequency. Therefore, in some embodiments, in order to improve the sound quality of the open earphone 10 as well as to facilitate the adjustment of EQ, the frequency response of the open earphone 10 in a high frequency range (e.g., 4.5 kHz to 9 kHz) needs to be sufficient, thus the cross-sectional area S of the sound outlet 112 may be less than 54 $mm^2$. Preferably, in order to make the frequency response curve of the open earphone 10 sufficient in a range of 4.5 kHz-8 kHz, the cross-sectional area S of the sound outlet 112 may be smaller than 36.15 $mm^2$. More preferably, in order to make the frequency response curve of the open earphone 10 sufficient in a range from 4.5 kHz to 6.5 kHz, the cross-sectional area S of the sound outlet 112 may be less than 21.87 $mm^2$. In the present disclosure, for ease of description, the cross-sectional area S of the sound outlet 112 may refer to an area of an outer opening of the sound outlet 112 (i.e., an opening area of the sound outlet 112 on the inner side surface). It should be known that in some other embodiments, the cross-sectional area S of the sound outlet 112 may also refer to an area of an inner opening of the sound outlet 112, or an average of the area of the inner opening and the area of the outer opening of the sound outlet 112.

Figure 27B:
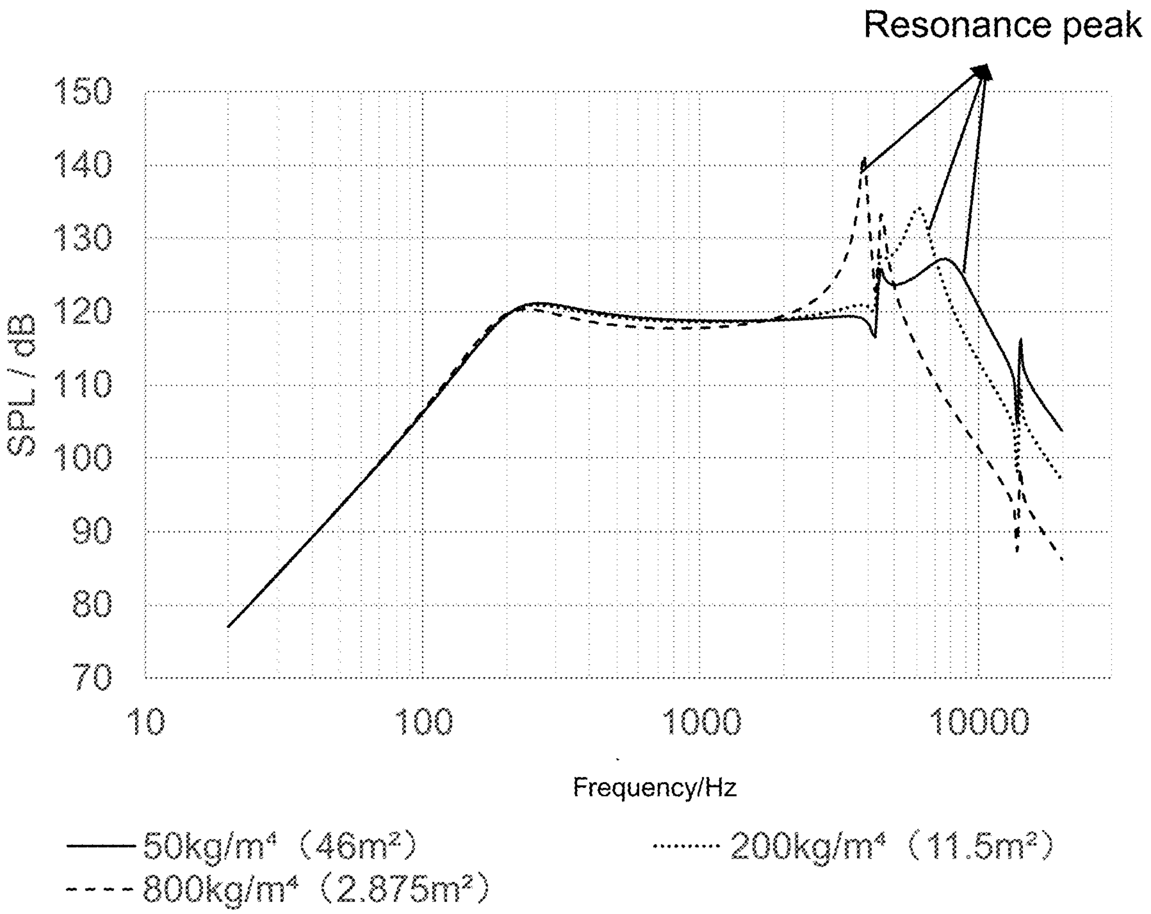
FIG. 27B is a frequency response curve diagram of a front cavity corresponding to different cross-sectional areas of sound outlets according to some embodiments of the present disclosure.

FIG. 27B is a frequency response curve diagram of a front cavity corresponding to different cross-sectional areas of sound outlets according to some embodiments of the present disclosure. As shown in FIG. 27B, when the cross-sectional area S of the sound outlet 112 increases from 2.875 $mm^2$ to 46.10 $mm^2$, the sound mass Ma of the sound outlet 112 decreases from 800 $kg/m^4$ to 50 $kg/m^4$, and the resonance frequency f1 of the front cavity gradually increases from about 4 kHz to about 8 kHz. It should be noted that the parameters, such as 200 $kg/m^4$ and 800 $kg/m^4$ shown in FIG. 27B represent only a theoretical sound mass of the sound outlet 112, and there may be an error with an actual sound mass of the sound outlet 112.

In order to improve the acoustic output of the open earphone 10, while increasing the resonance frequency f1 of the front cavity and ensuring that the sound mass Ma of the sound outlet 112 is large enough, the cross-sectional area S of the sound outlet 112 needs to have a suitable range of values. In addition, in the actual design, if the cross-sectional area of the sound outlet 112 is too large, it may have a certain impact on the appearance, structural strength, water and dust resistance and other aspects of the open earphone 10. In some embodiments, the cross-sectional area S of the sound outlet 112 may be in a range of 2.87 $mm^2$ to 46.10 $mm^2$. In some embodiments, the cross-sectional area S of the sound outlet 112 may be in a range of 2.875 $mm^2$-46 $mm^2$. In some embodiments, the cross-sectional area S of the sound outlet 112 may be in a range of 10 $mm^2$-30 $mm^2$. In some embodiments, the cross-sectional area S of the sound outlet 112 may be 25.29 $mm^2$. In some embodiments, the cross-sectional area S of the sound outlet 112 may be in a range of 25 $mm^2$-26 $mm^2$.

In some embodiments, in order to increase the wearing stability of the open earphone 10, the area of the inner side surface IS of the sound production component 11 needs to be adapted to the dimension of the human inferior concha. In addition, when the sound production component 11 is worn by inserting it into the inferior concha, since the inner side surface IS and a side wall of the cavum concha form a cavity structure, the sound production efficiency of the sound production component 11 is high compared to a conventional wearing manner (e.g., placing the sound production component 11 on a front side of the tragus). At this time, the overall dimension of the sound production component may be designed to be smaller. Therefore, a ratio of the area of the sound outlet 112 to the area of the inner side surface IS may be designed to be relatively large. At the same time, the area of the sound outlet should not be too large, otherwise, it may affect the waterproof and dustproof structure at the sound outlet and the stability of the support structure. The area of the inner side surface IS should not be too small, otherwise, it may affect the area of the transducer to push the air. In some embodiments, the ratio of the cross-sectional area S of the sound outlet 112 to the area of the inner side surface IS may be in a range of 0.015 to 0.25. In some embodiments, the ratio of the cross-sectional area S of the sound outlet 112 to the area of the inner side surface IS may be in a range of 0.02 to 0.2. In some embodiments, the ratio of the cross-sectional area S of the sound outlet 112 to the area of the inner side surface IS may be in a range of 0.06 to 0.16. In some embodiments, the ratio of the cross-sectional area S of the sound outlet 112 to the area of the inner side surface IS may be in a range of 0.1 to 0.12.

In some embodiments, consisting that the inner side surface IS may need to be in contact with the ear (e.g., the inferior concha), in order to improve the wearing comfort, the inner side surface IS may be designed as a non-planar structure. For example, an edge region of the inner side surface IS has a certain curvature relative to a central region, or a region on the inner side surface IS near the free end FE is provided with a convex structure to better abut against with the ear region, etc. In this case, in order to better reflect the influence of the cross-sectional area of the sound outlet 112 on the wearing stability and sound production efficiency of the open earphone 10, the ratio of the cross-sectional area S of the sound outlet 112 to the area of the inner side surface IS may be replaced with a ratio of the cross-sectional area S of the sound outlet 112 to the projection area of the inner side surface IS in the vibration direction of the diaphragm (i.e., the Z-direction in FIG. 16). In some embodiments, a ratio of the cross-sectional area S of the sound outlet 112 to a projection area of the inner side surface IS along the vibration direction of the diaphragm may be in a range of 0.016 to 0.255. Preferably, the ratio of the cross-sectional area S of the sound outlet 112 to a projection area of the inner side surface IS along the vibration direction of the diaphragm may be in a range of 0.022 to 0.21

In some embodiments, a projection area of the diaphragm of the transducer in its vibration direction may be equal to or slightly less than the projection area of the inner side surface IS along the vibration direction of the diaphragm. In this case, a ratio of the cross-sectional area S of the sound outlet 112 to the projection area of the diaphragm in its vibration direction may be in a range of 0.016 to 0.261. Preferably, the ratio of the cross-sectional area S of the sound outlet 112 to a projection area of the inner side surface IS along the vibration direction of the diaphragm may be in a range of 0.023 to 0.23.

In some embodiments, the shape of the sound outlet 112 also has an effect on an acoustic resistance of the sound outlet 112. The narrower and longer the sound outlet 112 is, the higher the acoustic resistance of the sound outlet 112 is, which is not conducive to the acoustic output of the front cavity 114. Therefore, in order to ensure that the sound outlet 112 has a suitable acoustic resistance, a ratio of the long-axis dimension to the short-axis dimension of the sound outlet 112 (also called an aspect ratio of the sound outlet 112) needs to be within a preset appropriate range.

In some embodiments, the shape of the sound outlet 112 may include, but is not limited to, a circle, an oval, a runway shape, etc. For the sake of description, the following exemplary illustration is provided with the sound outlet 112 in a runway shape as an example. In some embodiments, as shown in FIG. 14, the sound outlet 112 may adopt the runway shape, wherein the ends of the runway shape may be minor arced or semicircular. In this case, the long-axis dimension of the sound outlet 112 may be a maximum dimension (e.g., the long-axis dimension d as shown in FIG. 14) of the sound outlet 112 along the X-direction, and the short-axis dimension (e.g., the short-axis dimension h as shown in FIG. 14) of the sound outlet 112 may be a maximum dimension of the sound outlet 112 along the Y-direction.

Figure 28A:
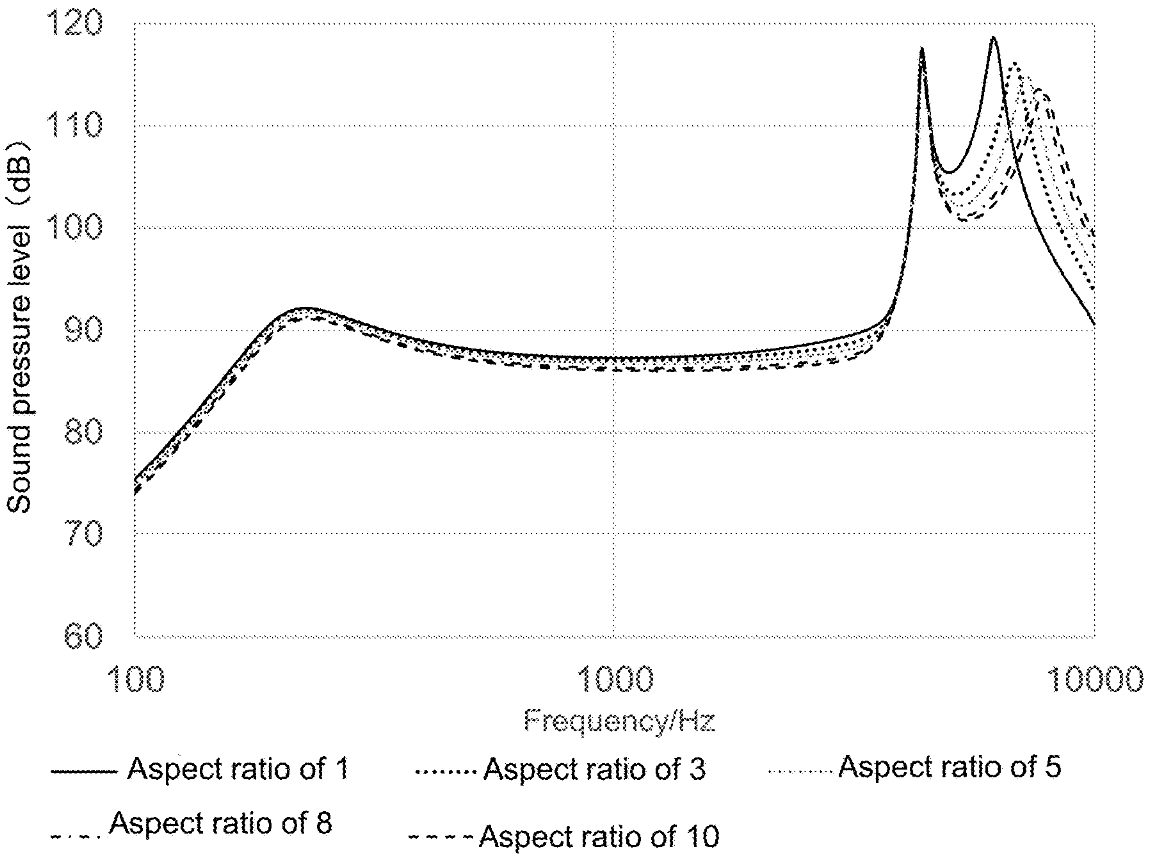
FIG. 28A is a frequency response curve diagram of an open earphone corresponding to different aspect ratios of sound outlets according to some embodiments of the present disclosure.

FIG. 28A is a frequency response curve diagram of an open earphone corresponding to different aspect ratios of sound outlets according to some embodiments of the present disclosure. FIG. 28A illustrates a frequency response curve of the open earphone corresponding to a sound outlet with aspect ratios of 1, 3, 5, 8, and 10, respectively when the other structures (e.g., the pressure relief hole 113, the volume of the rear cavity, etc.) are fixed and the area of the sound outlet is a constant.

As can be seen from FIG. 28A, when the cross-sectional area of the sound outlet 112 is a constant, as the aspect ratio of the sound outlet 112 increases, the resonance frequency f1 of the resonance peak of the front cavity 114 gradually moves toward high frequency, and the intensity of the resonance peak gradually decreases. Therefore, when the cross-sectional area of the sound outlet 112 is a constant, in order to ensure that the intensity of the resonance peak of the front cavity is strong enough, the ratio of the long-axis dimension of the sound outlet 112 to the short-axis dimension of the sound outlet 112 may be in a range from 1 to 10. In some embodiments, the ratio of the long-axis dimension of the sound outlet 112 to the short-axis dimension of the sound outlet 112 may be in a range from 2 to 8. In some embodiments, the ratio of the long-axis dimension of the sound outlet 112 to the short-axis dimension of the sound outlet 112 may be in a range from 2 to 4. In some embodiments, the long-axis dimension of the sound outlet 112 may be 7.67 mm and the short-axis dimension of the sound outlet 112 may be 3.62 mm.

Figure 28B:
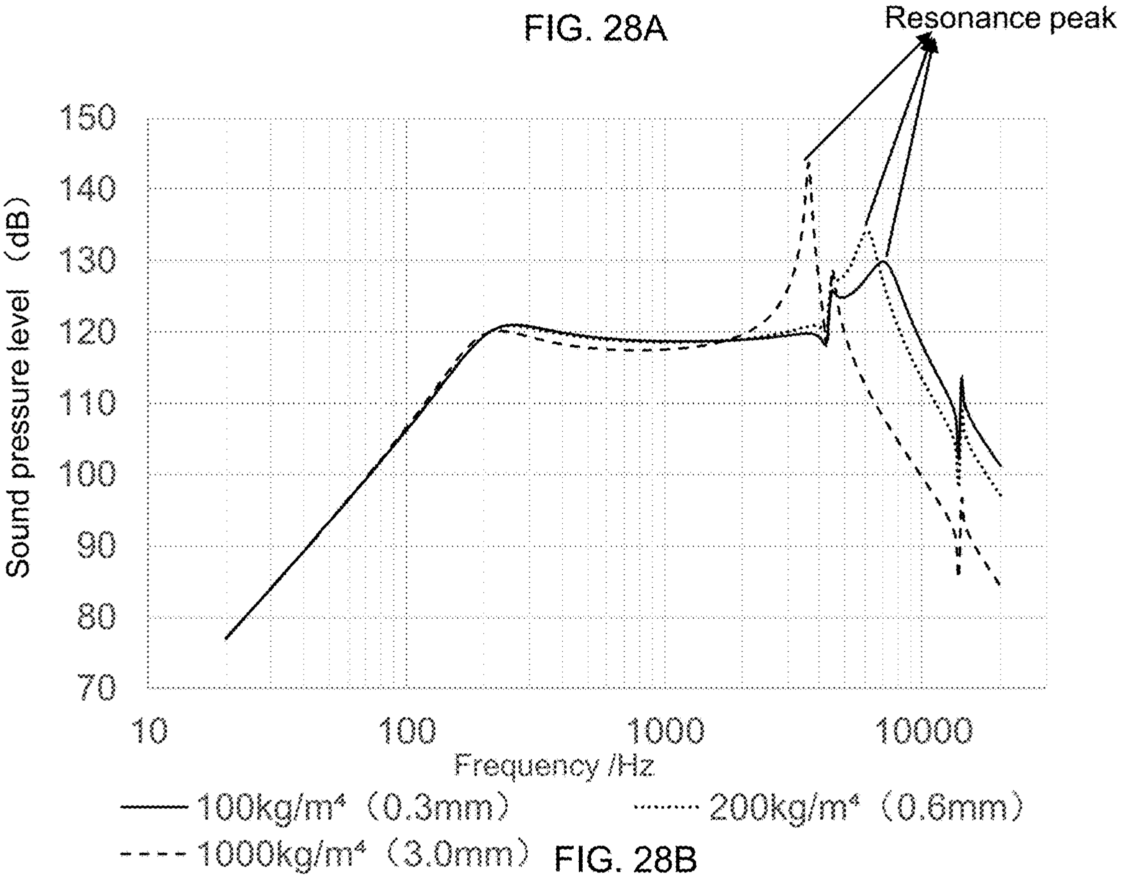
FIG. 28B is a frequency response curve diagram of a front cavity corresponding to different depths of sound outlets according to some embodiments of the present disclosure.

FIG. 28B is a frequency response curve diagram of a front cavity corresponding to different depths of sound outlets according to some embodiments of the present disclosure. As shown in FIG. 28B, when the depth L of the sound outlet 112 increases from 0.3 mm to 3 mm, the sound mass Ma of the sound outlet 112 increases from 100 kg/m$^4$ to 1000 kg/m$^4$, and the resonance frequency f1 of the front cavity decreases from about 7 kHz to about 3.7 kHz.

In order to ensure that the front cavity has a sufficiently large resonance frequency, according to equation (2), the depth L of the sound outlet 112 is taken to be as small as possible. However, since the sound outlet 112 is set on the housing 111, the depth of the sound outlet 112 is the thickness of the side wall of the housing 111. When the thickness of the housing 111 is too small, the structural strength of the open earphone 10 may be affected, and the corresponding manufacturing process is more difficult. In some embodiments, the depth L of the sound outlet 112 may be in a range of 0.3 mm-3 mm. In some embodiments, the depth L of the sound outlet 112 may be in a range of 0.3 mm-2 mm. In some embodiments, the depth L of the sound outlet 112 may be 0.3 mm. In some embodiments, the depth L of the sound outlet 112 may be 0.6 mm.

In some embodiments, according to equation (2), in the case where the volume of the front cavity is not easily changed, the larger the ratio $S/L^2$ of the cross-sectional area S of the sound outlet 112 to the square of the depth L is, the higher the resonance frequency of the front cavity is and the better the sound emitted from the sound outlet is in the low and middle frequency range. However, since the cross-sectional area S of the sound outlet 112 should not be too large, and the depth L (the thickness of the housing 111) should not be too small, in some embodiments, the ratio $S/L^2$ of the cross-sectional area S of the sound outlet 112 to the square of the depth L may be in a range of 0.31 to 512.2. In some embodiments, the ratio $S/L^2$ of the cross-sectional area S of the sound outlet 112 to the square of the depth L may be in a range of 1-400. In some embodiments, the ratio $S/L^2$ of the cross-sectional area S of the sound outlet 112 to the square of the depth L may be in a range of 3-300. In some embodiments, the ratio $S/L^2$ of the cross-sectional area S of the sound outlet 112 to the square of the depth L may be in a range of 5-200. In some embodiments, the ratio $S/L^2$ of the cross-sectional area S of the sound outlet 112 to the square of the depth L may be in a range of 10-50.

The basic concepts have been described above, apparently, in detail, as will be described above, and do not constitute limitations of the present disclosure. Although there is no clear explanation here, those skilled in the art may make various modifications, improvements, and modifications to the present disclosure. This type of modification, improvement, and corrections are recommended in the present disclosure, so the modification, improvement, and amendment remain in the spirit and scope of the exemplary embodiment of the present disclosure.

The specific embodiments documented in the present disclosure are merely exemplary, and one or more of the technical features in the specific embodiments are optional or additional, and are not the necessary technical features constituting the inventive conception of the present disclosure. In other words, the scope of protection of the present application encompasses and is much larger than the specific embodiments.

What is claimed is:

1. A sound production component, comprising:

a diaphragm;

a magnetic circuit assembly;

a coil, the coil being connected to the diaphragm and at least partially disposed in a magnetic gap formed by the magnetic circuit assembly, the coil driving the diaphragm to vibrate to produce a sound after being energized; and a housing, the housing having a sound outlet opened on an inner side surface for directing a sound generated at a front side of the diaphragm out of the housing, wherein:

the diaphragm comprises a main body region and a folded ring region surrounding the main body region, the folded ring region comprising an arc-shaped segment and a connecting segment connected to the main body region, and a projection of a center of the sound outlet along a vibration direction of the diaphragm on the diaphragm is located on an inner side of the arc-shaped segment;

wherein a ratio of a span of the arc-shaped segment to a short-axis dimension of the diaphragm is in a range of 0.1-0.3, and a ratio of a distance from the center of the sound outlet to a lower side surface of the housing to the short-axis dimension of the diaphragm is in a range of 0.3-0.5.

2. The sound production component according to claim 1, wherein the span of the arc-shaped segment is in a range of 1.2 mm-1.7 mm, and/or the distance from the center of the sound outlet to the lower side surface of the housing ranges from 4.05 mm to 6.05 mm.

3. The sound production component according to claim 1, wherein a difference between the distance from the center of the sound outlet to the lower side surface of the housing and the span of the arc-shaped segment is a first difference, the first difference being in a range of 2.75 mm-4.15 mm.

4. The sound production component according to claim 3, wherein a ratio of the first difference to the short-axis dimension of the diaphragm is in a range of 0.3-0.7.

5. The sound production component according to claim 1, wherein the span of the arc-shaped segment is in a range of 1.2 mm-1.7 mm, and/or a distance from the center of the sound outlet to a rear side surface of the housing is in a range of 8.15 mm-12.25 mm.

6. The sound production component according to claim 1, wherein a ratio of the span of the arc-shaped segment to a long-axis dimension of the diaphragm is in a range of 0.065-0.1, and/or a ratio of a distance from the center of the sound outlet to a rear side surface of the housing to the long-axis dimension of the diaphragm is in a range of 0.45-0.65.

7. The sound production component according to claim 1, wherein a difference between a distance from the center of the sound outlet to a rear side surface of the housing and the span of the arc-shaped segment is a second difference, the second difference being in a range of 6.8 mm-10.3 mm.

8. The sound production component according to claim 7, wherein a ratio of the second difference to a long-axis dimension of the diaphragm is between 0.40-0.55.

9. The sound production component according to claim 1, wherein a long-axis dimension of the diaphragm is in a range of 13 mm-25 mm, and/or the short-axis dimension of the diaphragm is in a range of 4 mm-13 mm.

10. The sound production component according to claim 1, wherein a ratio of a height of the arc-shaped segment to the span of the arc-shaped segment is in a range of 0.35-0.4.

11. The sound production component according to claim 1, wherein a ratio of a cross-sectional area of the sound outlet to a projection area of the diaphragm along the vibration direction of the diaphragm is in a range of 0.08-0.32.

12. The sound production component according to claim 1, wherein, in the vibration direction of the diaphragm, a projection area of the diaphragm is in a range of 90 $mm^2$-560 $mm^2$, and/or a cross-sectional area of the sound outlet is in a range of 2.87 $mm^2$-46.10 $mm^2$.

13. The sound production component according to claim 1, wherein a ratio of a cross-sectional area of the sound outlet to a square of a depth of the sound outlet is in a range of 0.31-512.2.

14. The sound production component according to claim 1, wherein a front cavity is formed between the sound outlet and the front side of the diaphragm, a pressure relief hole is provided on another side surface of the housing, a rear cavity is formed between the pressure relief hole and a back side of the diaphragm, a resonance frequency of the front cavity is not less than 3 kHz, and/or a resonance frequency of the rear cavity is not less than 3.3 kHz.

15. The sound production component according to claim 14, wherein a difference between the resonance frequency of the rear cavity and the resonance frequency of the front cavity is less than 300 Hz.

16. The sound production component according to claim 14, further comprising:

a bracket disposed around the magnetic circuit assembly, the bracket being coupled to a portion of the folded ring region away from the main body region, wherein:

the bracket is provided with a plurality of air holes, a sound from the back side of the diaphragm is transmitted through the plurality of air holes to the pressure relief hole, and a ratio of a total area of the plurality of air holes to a cross-sectional area of the sound outlet is in a range of 0.25-1.60.

17. The sound production component according to claim 16, wherein the total area of the plurality of air holes is in a range of 4.54 $mm^2$-12.96 $mm^2$.

18. The sound production component according to claim 16, wherein the plurality of air holes at least comprises a first air hole and a second air hole, wherein a distance between a center of the first air hole and a center of the pressure relief hole is greater than a distance between a center of the second air hole and the center of the pressure relief hole, and an area of the first air hole is greater than an area of the second air hole.

19. The sound production component according to claim 1, wherein in the vibration direction of the diaphragm, a distance between a bottom of the coil and a bottom surface of the magnetic circuit assembly is in a range of 0.2 mm-4 mm, and/or a distance between the center of the sound outlet and the bottom surface of the magnetic circuit assembly in a range of 5.65 mm-8.35 mm.

20. A sound production component, comprising:

a diaphragm;

a magnetic circuit assembly;

a coil, the coil being connected to the diaphragm and at least partially disposed in a magnetic gap formed by the magnetic circuit assembly, the coil driving the diaphragm to vibrate to produce a sound after being energized; and a housing, the housing having a sound outlet opened on an inner side surface for directing a sound generated at a front side of the diaphragm out of the housing, wherein:

the diaphragm comprises a main body region and a folded ring region surrounding the main body region, the folded ring region comprising an arc-shaped segment and a connecting segment connected to the main body region, and a projection of a center of the sound outlet along a vibration direction of the diaphragm on the diaphragm is located on an inner side of the arc-shaped segment;

wherein a ratio of a span of the arc-shaped segment to a long-axis dimension of the diaphragm is in a range of 0.065-0.1, and a ratio of a distance from the center of the sound outlet to a rear side surface of the housing to the long-axis dimension of the diaphragm is in a range of 0.45-0.65.

* * * * *